United States Patent
Yamamoto et al.

(10) Patent No.: US 8,001,384 B2
(45) Date of Patent: Aug. 16, 2011

(54) AUTHENTICATION SYSTEM, AUTHENTICATION METHOD, ATTESTING DEVICE, VERIFICATION DEVICE, THEIR PROGRAMS, AND RECORDING MEDIUM

(75) Inventors: Go Yamamoto, Yokosuka (JP); Eiichiro Fujisaki, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 955 days.

(21) Appl. No.: 11/792,305

(22) PCT Filed: Jul. 13, 2006

(86) PCT No.: PCT/JP2006/313970
§ 371 (c)(1),
(2), (4) Date: Jun. 5, 2007

(87) PCT Pub. No.: WO2007/007836
PCT Pub. Date: Jan. 18, 2007

(65) Prior Publication Data
US 2008/0133912 A1    Jun. 5, 2008

(30) Foreign Application Priority Data
Jul. 13, 2005   (JP) .............................. 2005-204954

(51) Int. Cl.
*H04L 9/30* (2006.01)
(52) U.S. Cl. ............ 713/174; 713/168; 380/28; 380/29; 380/30
(58) Field of Classification Search .................. 713/168, 713/170, 180; 380/255, 28–30
See application file for complete search history.

(56) References Cited

U.S. PATENT DOCUMENTS

| | | | | |
|---|---|---|---|---|
| 5,497,423 A | * | 3/1996 | Miyaji | ............................ 380/30 |
| 6,076,163 A | * | 6/2000 | Hoffstein et al. | ............. 713/168 |
| 6,480,605 B1 | * | 11/2002 | Uchiyama et al. | .............. 380/30 |

(Continued)

FOREIGN PATENT DOCUMENTS
JP    06-188874    7/1994
(Continued)

OTHER PUBLICATIONS

A. Menezes, et al.,"Identification and Entity Authentication", Handbook of Applied Cryptography, XP-002262234, Jan. 1, 1997, pp. 385-424.

(Continued)

*Primary Examiner* — Edan Orgad
*Assistant Examiner* — Yin-Chen Shaw
(74) *Attorney, Agent, or Firm* — Oblon, Spivak, McClelland, Maier & Neustadt, L.L.P.

(57) ABSTRACT

A verification device stores verification information and first random information in a storage. The verification information depends upon contents of comparative information, and not upon an information volume of the comparative information. The verification device generates an authentication information generation factor using the first random information and transmits the factor to a proving device, which generates authentication information using the authentication information generation factor and held information and transmits the authentication information to the verification device. The authentication information depends upon contents of the authentication information generation factor and the held information, and not upon the information volume of the held information. A decision section of the verification device decides whether a predetermined relationship is established between the authentication information and the verification information and the first random information. Thereby, the verification device verifies the held information stored in the proving device is the same as the comparative information.

33 Claims, 44 Drawing Sheets

U.S. PATENT DOCUMENTS

| | | | |
|---|---|---|---|
| 6,567,916 B1* | 5/2003 | Terao et al. | 713/176 |
| 6,666,381 B1* | 12/2003 | Kaminaga et al. | 235/492 |
| 2005/0114662 A1* | 5/2005 | Meyer et al. | 713/168 |
| 2005/0117751 A1* | 6/2005 | Furukawa | 380/255 |

FOREIGN PATENT DOCUMENTS

| | | |
|---|---|---|
| JP | 07-281595 | 10/1995 |

OTHER PUBLICATIONS

A. Menezes, et al., "Handbook of Applied Cryptography, passage", Handbook of Applied Cryptography, XP-002326542, Jan. 1, 1997, pp. 425-488.

David Pointcheval, "The Composite Discrete Logarithm and Secure Authentication", Lecture Notes in Computer Science, vol. 1751, pp. 113-128, 1 Cover page.

Go Yamamoto, et al., "An Efficiently-Verifiable Zero-Knowledge Argument for Proofs of Knowledge", IEICE Technical Report, vol. 105, No. 194, Jul. 2005 pp. 41-45.

Tetsu Iwata, et al., "OMAC: One-Key CBC MAC", LNCS 2887, 2003, pp. 129-153.

Gary Miller, "Riemann's Hypothesis and Tests for Primality", Journal of Computer Systems Science, vol. 13, 1976, pp. 234-239.

Joy Algesheimer, et al., "Efficient Computation Modulo A Shared Secret With Application to the Generation of Shared Safe-Prime Products", Crypto 2002, 2002, pp. 417-432.

H. Anton, et al., "Elementary Linear Algebra With Applications", John Wiley and Sons, 2005, pp. 211-217.

O. Goldreich, "Foundations of Cryptography", Cambridge University Press, vol. 1, 2001, pp. 262-267.

Ronald Cramer, "Modular Design of Secure Yet Practical Cryptographic Protocols", CWI and University of Amsterdam, Nov. 1996, pp. 1-187.

Mihir Bellare, et al., "The Knowledge-of-Exponent Assumptions and 3-Round Zero-Knowledge Protocols", Advances in Cryptology . . . Crypto 2004, 2004, pp. 273-289.

Uriel Feige, et al., "Zero-Knowledge Proofs of Identity", Journal of Cryptology, vol. 1, 1988, pp. 77-94.

Satoshi Hada, et al., "On the Existence of 3-Round Zero-Knowledge Protocols", Advances in Cryptology '98, 1998, pp. 408-423.

Dan Boneh, et al., "Efficient Generation of Shared RSA Keys", Crypto '97, vol. 1294, 1997, pp. 425-439.

Ivan Damgard, et al., "A Statistically-Hiding Integer Commitment Scheme Based on Groups With Hidden Order", Asiacrypt 2002, vol. 2501, 2002, pp. 125-142.

Eiichiro Fujisaki, et al., Statistical Zero Knowledge Protocols to Prove Modular Polynominal Relations, Advances in Cryptology '97, 1997, pp. 16-30.

Guillaume Poupard, et al., "Generation of Shared RSA Keys by Two Parties", Asiacyrpt '98, vol. 1514, 1998, pp. 11-24.

C.P. Schnorr, "Efficient Signature Generation by Smart Cards", Journal of Cryptology, vol. 4, 1991, pp. 161-175.

Go Yamamoto, et al., "Efficient Protocols for Verification of Massive Secret Data and Their Application", SCIS 2006, Jan. 2006, 27 pages, (with full English Translation).

Josh Benaloh, et al. "One-Way Acumulators: A Decentralized Alternative to Digital Signatures". In Advances In Cryptology-Eurocrypt '93, vol. 765 of Lecture Notes in Computer Science, pp. 274-285, 1993.

Michael T. Goodrich, et al. "An Efficient Dynamic and Dsitributed Cryptographic Accumulator". In Information Security, vol. 2433 of Lecture Notes in Computer Science, pp. 372-388, 2002.

Jan Camenisch, et al. "Dynamic Accumulators and Application to Efficient Revocation of Anonymous Credentials". In Advances in Cryptology-Crypto 2002, vol. 2442 of Lecture Notes in Computer Science, pp. 61-76, 2002.

* cited by examiner

AUTHENTICATION SYSTEM, AUTHENTICATION METHOD, ATTESTING DEVICE, VERIFICATION DEVICE, THEIR PROGRAMS, AND RECORDING MEDIUM

TECHNICAL FIELD

The present invention relates to a message authentication technology, and specifically relates to a technique for proving and verifying that predetermined information is stored in a specified or unspecified device.

BACKGROUND ART

A technology for authenticating that predetermined information is stored in a specified or unspecified device (for example, in a storage such as a hard disc) is called message authentication technology. This technology is characterized in that a traffic volume required for an authentication process does not depend on an amount of information (an information volume) to be proved to be stored.

The outline of a conventional message authentication technology will be described below. A proving device and a verification device share a secret key k beforehand. Next, the proving device calculates a message authentication code M(s, k) having a fixed length for held information s and sends the message authentication code M(s,k) to the verification device. The verification device has a copy of the information s and verifies the correctness of the message authentication code M(s,k) having been sent from the proving device.

A message authentication code is designed by mainly using a technique related to common key cryptography and a hash function. Non-patent literature 1 describes an example of the configuration method of a message authentication code.

Non-patent literature 1: Tetsu Iwata, Kaoru Kurosawa, "OMAC: One-Key CBC MAC", LNCS 2887 (2003), pp 129-153, Springer-Verlag.

DISCLOSURE OF THE INVENTION

Problems to be Solved by the Invention

In a system using a message authentication code, in order to verify the correctness of the authentication code, a verification device has to store a copy of the information s to be verified. Thus in this system, a problem arises in the efficiency of the storage capacity of the verification device. Further, in this system, a proving device and a verification device have to share a secret key k before message authentication. If the secret key k is leaked to the outside, the system cannot be kept safe. Therefore, in the distribution of the secret key k to the proving device and the verification device and in management of the secret key k in the proving device and the verification device, a complicated technique and configuration are necessary to prevent a leak of the secret key k to a third party. In other words, the system using a message authentication code also suffers problems with regard to convenience and safety.

The present invention is designed in consideration of this point. An object of the present invention is to effectively use the storage capacity of a verification device and improve convenience and safety, in a technique in which the verification device verifies that predetermined information is stored in a proving device.

Means to Solve Problems

In the present invention, a verification device connected to a proving device so as to communicate with the proving device verifies equality of the held information and given comparative information, the held information being stored in the verification device (the "comparative information" and the "held information" are bit information). Thus, the verification device first stores, in a first storage part, verification information which has contents depending upon the contents of the comparative information and has an information volume not depending upon an information volume of the comparative information, and first random information. Further, the verification device generates an authentication information generation factor for generating authentication information in the proving device, by using the first random information stored in the first storage part, and the verification device transmits the generated authentication information generation factor to the proving device.

The proving device receives the authentication information generation factor and generates, by using the authentication information generation factor and the held information stored in a second storage part, authentication information which has contents depending upon the contents of the authentication information generation factor and the held information and has an information volume not depending upon the information volume of the held information. Next, the proving device transmits the authentication information to the verification device.

The verification device receives the authentication information transmitted from the proving device, and a decision section of the verification device decides whether a predetermined relationship is established between the authentication information and the verification information and first random information which are stored in the first storage part. In this way, the verification device verifies that the held information stored in the proving device is the same as the comparative information.

In this case, for the verification, the verification device of the present invention has to store the verification information having an information volume not depending upon the information volume of the comparative information and does not have to store the comparative information. Thus even when the held information to be verified is stored in the proving device and has a large information volume and the comparative information also has a large information volume, a storage capacity required for the verification device does not considerably increase. Further, since the present invention does not share a secret key between the proving device and the verification device, it is possible to achieve a high level of convenience and safety.

In the present invention, it is preferable that the verification information is an arithmetic result of an exponentiation whose base is an element of a finite set in which an operation constituting a communicative semigroup is defined, and whose exponent is the comparative information, the exponentiation being defined on the semigroup; the authentication information generation factor is an arithmetic result of an exponentiation whose base is the element of the finite group, and whose exponent is the first random information, the exponentiation being defined on the semigroup; the authentication information is an arithmetic result of an exponentiation whose base is the authentication information generation factor, and whose exponent is the held information, the exponentiation being defined on the semigroup; and the decision section decides whether the authentication information is equal to an arithmetic result of an exponentiation whose base is the verification information, and whose exponent is the first random information, the exponentiation being defined on the semigroup.

The verification information of this configuration is an arithmetic result of an exponentiation whose base is the element of a finite set in which an operation constituting a communicative semigroup is defined, and whose exponent is the comparative information, the exponentiation being defined on the semigroup. The verification information is necessarily the element of the finite set defined on the semigroup. Thus the information volume of the verification information is equal to the information volume of any one of the element of the finite set regardless of the information volume of the corresponding comparative information. For this reason, it is possible to reduce a storage capacity required for storing the verification information in the verification device. Further, since it is not necessary to share the secret key between the proving device and the verification device in this configuration, it is possible to achieve a high level of convenience and safety.

Also in the preferable configuration of the present invention, the verification device and the proving device have to share the information for specifying the semigroup and the element of the finite set. However, above information is not necessarily secret information. Even if above information is leaked to an attacker, the safety of an authentication system can be secured. Thus problems of convenience and safety do not arise, due to the sharing of above information between the proving device and the verification device.

It is more preferable that regarding the semigroup, the order of the finite set defined on the semigroup is difficult to calculate. This is because when an attacker can calculate the order of the finite set defined on the semigroup, the attacker can use the calculated order as information for illicitly generating authentication information passing verification. In other words, an arithmetic result of an exponentiation whose base is the authentication information generation factor, and whose exponent is the held information, and which is defined on the semigroup is equal to (collision) an arithmetic result of an exponentiation whose base is the authentication information generation factor, whose exponent is the held information+a given integer×the order, and which is defined on the semigroup. This means that an attacker who knows the order recognizes that the authentication information passing verification in the verification device can be generated by finding one of "the held information"+"a given integer"×"the order" without finding out the held information. This information acts as information enabling an attacker to efficiently make a search for authentication information passing verification. Thus when the order is known to an attacker, the present invention becomes less safe. For this reason, it is desirable that the order of the semigroup be difficult to calculate.

Further, in the present invention, it is preferable that the verification information is a result $C(s')$ of modular exponentiation whose modulus is a constant N, and whose base is a value g smaller than N (preferably the value g is not smaller than 2 and smaller than N), and whose exponent is the comparative information $s'$; the authentication information generation factor is a result R of modular exponentiation whose modulus is a constant N, and, whose base is the value g, and whose exponent is the first random information r; the authentication information is a result $R(s)$ of modular exponentiation whose modulus is N, and whose base is the authentication information generation factor R, and whose exponent is the held information s; and the decision section decides whether or not a result of modular exponentiation whose modulus is N, and whose base is the verification information $C(s')$, and whose exponent is the first random information r is equal to the authentication information $R(s)$.

The verification information of this configuration is the modular exponentiation result $C(s')$ whose modulus is N, whose base is the value g smaller than N, and whose exponent is the comparative information $s'$. In this case, the verification information is necessarily an integer not smaller than 0 and not larger than N−1 regardless of the information volume of the comparative information $s'$. This means that it is possible suppress a storage capacity required for storing the verification information in the verification device. Also in this configuration, it is not necessary to share a secret key between the proving device and the verification device, therefore it is possible to achieve a high level of convenience and safety. Further, also in this configuration, information about the constant N and the value g has to be shared by the verification device and the proving device. However, even if above information is leaked to an attacker, the safety of the authentication system can be secured. Therefore, problems of convenience and safety do not arise due to the sharing of above information between the proving device and the verification device.

It is more preferable that the constant N is a natural number other than numbers which can be decided to be prime numbers and it is difficult to factorize N into prime factors. When the constant N is a prime number, the order for the multiplication of a residue class ring whose modulus is N $(Z/NZ)^*$ can be easily determined by the calculation of N−1. Thus it is desirable that the constant N be a number other than numbers which can be decided to be prime numbers. When the constant N is a composite number (N=p·q, p and q are sufficiently large prime numbers), the residue class ring whose modulus is N is a multiplicative cyclic group having an order of p·q−p−q+1. Thus when it is easy to factorize the constant N into prime factors, the order for the multiplication of the residue class ring whose modulus is N can be determined based on p and q satisfying N=p·q. Conversely, it is known that when the order is determined and the modular exponentiation result can be collided, it is possible to factorize the constant N into prime factors by using above information (for example, see G. Miller. Riemanann's hypothesis and tests for primality. Journal of Computer Systems Science, Vol. 13, pages 300-317, 1976. and so on). In other words, when the constant N is a composite number, the determination of the order is more difficult than the prime factorization of N (when N is a composite number of the product of two prime numbers, the difficulty is the same).

Thus it is desirable that N is a natural number other than numbers which can be decided to be prime numbers and it is difficult to factorize N into prime factors. In this case, "numbers which can be decided to be prime numbers" means numbers which can be decided to be "prime numbers" by using a primarity test method publicly known upon the filing of the present application and means numbers publicly known as "prime numbers" upon the filing of the present application.

Further, in the present invention, the constant N may be a composite number of the product of three or more prime numbers. In this case, even if an attacker can factorize the constant N into prime factors, the attacker cannot easily calculate the order for the multiplication of the residue class ring whose modulus is N. From the viewpoint of operation efficiency, it is desirable that N is a natural number other than numbers which can be decided to be prime numbers and it is difficult to factorize N into prime factors (when N is a composite number, N=p·q is established and p and q are sufficiently large prime numbers).

Moreover, in the present invention, it is preferable that the first random information r has a value randomly selected from the range of $0 \leq r \leq N \cdot 2^v - 1$ where v represents a predetermined natural number. When the first random information r is randomly selected from this range, it can be proved that the result of modular exponentiation whose modulus is N, whose base is the value g, whose exponent is the first random information r has a distribution that is indistinguishable from a distribution of value [ϵ(Z/NZ)*] which is randomly selected from the element of a multiplicative cyclic group of the residue class ring whose modulus is N. This means that the determination of the first random information r from the result of modular exponentiation whose modulus is N, whose base is the value g, and whose exponent is the first random information r is as difficult as the solving of a discrete logarithm problem of a value randomly selected from the element of the multiplicative cyclic group. In other words, as long the first random information r is a value randomly selected from the range of $0 \leq r \leq N \cdot 2^v - 1$, it is sufficiently difficult to specify the first random information r from the modular exponentiation operation result. Also when the first random information r is selected from a range with a higher upper limit, the safety is not improved and the arithmetic cost of the exponentiation operation increases.

Further, in the present invention, it is preferable that the verification information is generated for each first divided information obtained by dividing the comparative information into a plurality of pieces, the each verification information is generated by using each first divided information, and the authentication information is generated by using the authentication information generation factor and all the pieces of second divided information obtained by dividing held information stored in the proving device into a plurality of pieces.

In this case, the authentication information is generated by using all the pieces of the second divided information obtained by dividing the held information stored in the proving device into a plurality of pieces. Thus as compared with the generation of the authentication information by using the held information itself, various arithmetic methods can be used. Thus in some of the used arithmetic methods, the authentication information can be generated at high speed.

In this case, it is preferable that the verification information is an arithmetic result of an exponentiation whose base is an element of a finite set in which an operation constituting a communicative semigroup is defined, and whose exponent is the first divided information, the exponentiation being defined on the semigroup; the authentication information generation factor is an arithmetic result of an exponentiation whose base is the element of the finite group, and whose exponent is the first random information, the exponentiation being defined on the semigroup; the authentication information is an arithmetic result of an exponentiation whose base is the authentication information generation factor, and whose exponent is a value which is calculated using all the pieces of the second divided information and has a smaller information volume than the held information, the exponentiation being defined on the semigroup; and the decision section decides whether or not the authentication information is equal to an arithmetic result of an exponentiation whose base is the value obtained by calculating all the pieces of the verification information, and whose exponent is the first random information, the exponentiation being defined on the semigroup.

The authentication information is an arithmetic result of an exponentiation whose base is the authentication information generation factor, and whose exponent is a value which is calculated using all the pieces of the second divided information and has a smaller information volume than the held information, the exponentiation being defined on the semigroup. The arithmetic cost of the exponentiation rapidly increases with the value of the exponent. Thus by reducing the value of the exponent, the arithmetic cost can be remarkably reduced. Since the exponent has a value which is calculated using all the pieces of the second divided information and has a smaller information volume than the held information, it is possible to considerably reduce the cost of the exponentiation for calculating authentication information.

Further, in the present invention, it is preferable that the authentication information is an arithmetic result of an exponentiation whose exponent is a value calculated by using all the pieces of the second divided information and information which corresponds to a bit position of the second divided information in the held information and is difficult to prepare beforehand, the value having a smaller information volume than the held information, and whose base is the authentication information generation factor, and the exponentiation being defined on the semigroup.

The authentication information is generated by using, as an exponent, a value calculated by using all the pieces of the second divided information and information which corresponds to a bit position of the second divided information in the held information and is difficult to prepare beforehand. Thus it is possible to prevent an attacker who has no held information and does not know the bit position of each second divided information in the held information but knows only each divided information from forging authentication information passing the verification of the verification device.

Further, in the present invention, it is preferable that the verification information is a result $C_i(s')$ of modular exponentiation whose modulus is N, and whose base is a value g smaller than N, and whose exponent is the first divided information $s_i'$; the authentication information generation factor is a result R of modular exponentiation whose modulus is N, and whose base is the value g, and whose exponent is the first random information r; the authentication information is a result $R(s)$ of modular exponentiation whose exponent is a value obtained by summing, for all i, products of the second divided information $s_i$ and information H whose value is dependent upon i corresponding to the second divided information $s_i$ and some kind of information transmitted from the verification device, and whose base is the authentication information generation factor R, and whose modulus is N; and the decision section decides whether or not the authentication information $R(s)$ is equal to a result of modular exponentiation whose base is a product of values which are, corresponding to all i, the verification information $C_i(s')$ raised to the power of the information H each corresponding to $C_i(s')$, and whose exponent is the first random information r, and whose modulus is N. In this case, i represents an index indicating the bit position of the first divided information $s_i'$ in the comparative information and the bit position of the second divided information $s_i$ in the held information.

The authentication information is a result $R(s)$ of modular exponentiation whose exponent is a value obtained by summing, for all i, products of the second divided information $s_i$ and information H whose value is dependent upon i corresponding to the second divided information $s_i$ and some kind of information transmitted from the verification device, and whose base is the authentication information generation factor R, and whose modulus is N. In this case, it is possible to prevent an attacker who has no held information and does not know the position of each second divided information in the held information but knows only each divided information from forging authentication information passing in verification in the verification device.

It is more preferable that the information H is a one-way function value which is dependent upon i corresponding to the second divided information $s_i$ and some kind of information transmitted from the verification device.

In this case, it is possible to prevent two or more H which each corresponds to two or more types of the pair of "some kind of information transmitted from the verification device" and "i" from being the same value (collision). As a result, it is possible to prevent authentication information passing verification in the verification device from being generated from the pair of incorrect "some kind of information transmitted from the verification device" and an incorrect "i". Thus the reliability and safety of verification are improved.

Further, in the present invention, the verification device may prove to the proving device, by interactive proof, that the authentication information generation factor is correctly generated by using the first random information stored in the verification device. In this case, the verification device proves to the proving device, by interactive proof with the proving device, that the authentication information generation factor received by the proving device is generated by using the first random information stored in the verification device. The proving device verifies, by interactive proof with the verification device, that the authentication information generation factor is generated by using the first random information stored in the verification device. Further, the proving device transmits the authentication information to the verification device when the proving device can confirm that the authentication information generation factor is generated by using the first random information stored in the verification device.

With this configuration, unless an attacker's device intervenes in the process of the interactive proof, it is possible to prevent an attacker's device which intervenes between an authorized proving device and an authorized verification device from masquerading as a proving device to the authorized verification device, masquerading as a verification device to the authorized proving device, and from illicitly causing the verification device to erroneously recognize the storage of the held information. In other words, when such a configuration is not used, an attacker's device which intervenes between an authorized proving device and an authorized verification device can masquerade as a proving device and receive an authentication information generation factor from the authorized verification device, and the attacker's device can masquerade as a verification device and transmit the authentication information generation factor to the authorized proving device, so that the attacker's device can receive authentication information transmitted from the authorized proving device. Moreover, by transmitting the authentication information to the authorized verification device, the attacker's device can cause the verification device to erroneously recognize that the attacker's device is a device where held information is retained. In contrast, in a configuration in which the proving device transmits authentication information to the verification device only when the proving device can confirm that the authentication information generation factor is generated by using the first random information stored in the verification device, it is difficult for an attacker's device to masquerade as a verification device and receive authentication information from an authorized proving device, unless the attacker's device intervenes in the process of the interactive proof. As a result, it is possible to prevent an attacker's device which intervenes between an authorized proving device and an authorized verification device from illicitly causing the verification device to erroneously recognize that the attacker's device retains held information.

Further, this configuration makes it possible to prevent an authorized verification device from generating unauthorized first random information and prevent some kind of illicit action (for example, generation of a false verification log).

Furthermore, in this configuration, the target of interactive proof is not comparative information but the first random information. Thus even when the held information to be verified has a large amount of data and comparative information has a large amount of data, it is possible to suppress arithmetic cost required for interactive proof and an amount of communication data.

Further, processing including this interactive proof is preferably performed as follows:

First, the proving device generates an arithmetic value A obtained by an exponentiation whose base is an element g of a finite set in which an operation constituting a communicative semigroup is defined, and whose exponent is second random information a, the exponentiation defined on the semigroup. The proving device transmits the arithmetic value A to the verification device. The verification device receives the arithmetic value A and generates an authentication information generation factor R by an exponentiation whose base is the element g of the finite set, and whose exponent is the first random information r, the exponentiation being defined on the semigroup. Moreover, the verification device generates an arithmetic value B by an exponentiation whose base is the arithmetic value A, and whose exponent is the first random information r, the exponentiation being defined on the semigroup. The verification device transmits the authentication information generation factor R and the arithmetic value B to the proving device. The proving device receives the authentication information generation factor R and the arithmetic value B and decides whether the arithmetic value B is equal to an arithmetic result obtained by an exponentiation whose base is the authentication information generation factor R received by a second receiving section, whose exponent is the second random information a, the exponentiation being defined on the semigroup. When the arithmetic result and the arithmetic value B are equal to each other, the proving device transmits authentication information to the verification device.

This configuration makes it possible to prevent an attacker's device which intervenes between an authorized proving device and an authorized verification device from illicitly causing the verification device to erroneously recognize that the attacker's device retains held information, unless the attacker's device intervenes in the process of the interactive proof. Moreover, in this configuration, the target of interactive proof is the first random information r, thereby suppressing arithmetic cost required for interactive proof and an amount of communication data.

Further, this configuration also makes it possible to prevent an authorized verification device from generating unauthorized first random information and a false verification log.

Furthermore, in this configuration, the target of interactive proof is not comparative information but the first random information. Thus even when held information to be verified has a large amount of data and comparative information has a large amount of data, it is possible to suppress arithmetic cost required for interactive proof and an amount of communication data.

In this configuration, it is more preferable that the proving device further transmits the second random information a to the verification device when it is confirmed that the arithmetic value B is equal to an arithmetic result obtained by an exponentiation whose base is the authentication information generation factor R, and whose exponent is the second random information a, the exponentiation being defined on the semigroup. The verification device receives the second random information a and decides whether the arithmetic value A is equal to an arithmetic result obtained by an exponentiation whose base is the element g of a finite set, and whose exponent is the second random information a, the exponentiation being defined on the semigroup.

By adding such processing, it is possible to prevent fraud conducted by an attacker who does not know held information s but capable of determining A and knows L and m satisfying $C(s)=g^L A^m$ on the semigroup. In other words, when such processing is not performed, a device of an attacker who does not know held information s or comparative information s' but capable of determining A and knows L and m satisfying $C(s')=g^L A^m$ (an operation defined on the semigroup) can receive the authentication information generation factor R and the arithmetic value B from the verification device, calculate $R^L B^m$ (an operation defined on the semigroup), and transmit $R^L B^m$ as authentication information to the verification device. In this case, since $R^L B^m = g^{rL} A^{rm} = (g^L A^m)^r = C(s')$ is satisfied, the attacker's device can cause the verification device to erroneously recognize that the attacker's device retains the held information s. On the other hand, such an attacker does not know the second random information a satisfying $A=g^a$ (an operation defined on the semigroup). If such an attacker knows the second random information a, the attacker can calculate $C(s)=g^L A^m=g^{L+a \cdot m}=g^{s'}$, which is contradictory to the fact that the attacker does not know the held information s and the comparative information s'. For this reason, as described above, by adding processing for deciding whether $A=g^a$ (an operation defined on the semigroup) is satisfied or not by using the second random information a received by the verification device, fraud of such an attacker can be prevented.

It is desirable that each exponentiation of this processing be performed on a remainder operation defined by a semigroup in which the order of a finite set is difficult to calculate. This is because when an attacker can calculate the order of a finite set defined on the semigroup, the attacker can use the calculated order as information for making a search for the second random information a satisfying $A=g^a$.

Further, in the present invention, the arithmetic value A is a result of modular exponentiation whose operation modulus is a constant N, whose base is the value g smaller than N, and whose exponent is the second random information a, the authentication information generation factor R is a result of modular exponentiation whose modulus is N, whose base is the value g, whose exponent is the first random information r, and the arithmetic value B is a result of modular exponentiation whose modulus is N, whose base is the arithmetic value A, whose exponent is the first random information r. Moreover, the arithmetic result of an exponentiation whose base is the authentication information generation factor R received by the second receiving section, and whose exponent is the second random information a, and which is defined on the semigroup is a result of modular exponentiation whose modulus is N, and whose base is the authentication information generation factor R, and whose exponent is the second random information a. It is desirable that the constant N is a natural number other than numbers which can be decided to be prime numbers and it is difficult to factorize N into prime factors. Further, the constant N may be composite number of the product of three or more prime numbers.

Further, it is more preferable that the arithmetic result of an exponentiation whose base is the element g of a finite set, and whose exponent is the second random information a, and which is defined by a semigroup is a result of modular exponentiation whose modulus is N, and whose base is the element g of a finite set, and whose exponent is the second random information a.

Furthermore, it is more preferable that the second random information a has a value randomly selected from the range of $0 \leq a \leq N \cdot 2^v - 1$ where v represents a predetermined natural number. When the second random information a is selected thus, it can be proved that the result of modular exponentiation whose modulus is N, and whose base is the value g, and whose exponent is the second random information a has a distribution that is indistinguishable from a distribution of value $[\epsilon(Z/NZ)^*]$ which is randomly selected from the element of a multiplicative cyclic group of a residue class ring whose modulus is N. This means that the determination of the second random information a from the result of modular exponentiation whose modulus is N, and whose base is the value g, and whose exponent is the second random information a is as difficult as the solving of a discrete logarithm problem of a value randomly selected from the multiplicative cyclic group of the residue class ring whose modulus is N. In other words, as long the second random information a is a value randomly selected from the range of $0 \leq a \leq N \cdot 2^v - 1$, it is sufficiently difficult to specify the second random information a from said modular exponentiation result. Also when the second random information a is selected from a range with a higher upper limit, the safety is not improved and the arithmetic cost of the exponentiation operation increases.

EFFECTS OF THE INVENTION

According to the present invention, it is possible to effectively use the storage capacity of a verification device and improve convenience and safety in a technique in which the verification device verifies that predetermined information is stored in a proving device.

DESCRIPTION OF SYMBOLS

Figure 1:
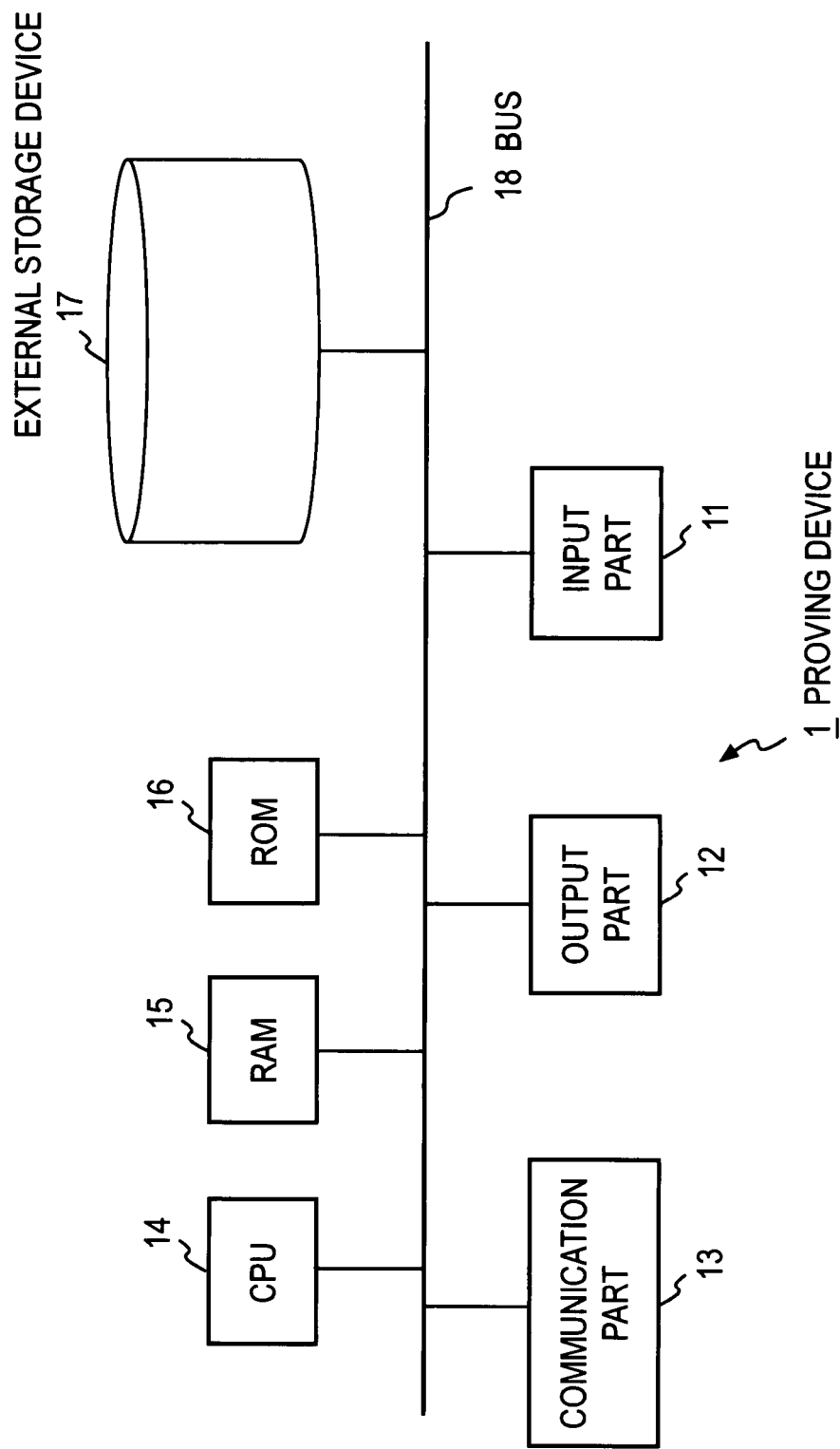
FIG. 1 is a structural block diagram illustrating a hardware configuration of a proving device (1) according to First Embodiment.

1 proving device
2 verification device
3 third party device
141 authentication information generation section
142 c^ generation section
143 random number generation section
145 authentication decision section
148 A generation section
160 first decision section
241 verification information generation section
242 random number generation section
243 authentication information generation factor generation section
244 decision section
247 W generation section
248 z generation section
249 B generation section
250 interaction decision section
260 second decision section
340 N generation section
341 g generation section
342 verification information generation section

BEST MODE FOR CARRYING OUT THE INVENTION

First Embodiment

The best mode for carrying out the invention will now be described with reference to the accompanying drawings.
[Proving Device]
A proving device of First Embodiment will be described below.

FIG. 1 is a structural block diagram illustrating a hardware configuration of a proving device (1) according to First Embodiment.

As shown in FIG. 1, the proving device (1) includes an input part (11) to which an input device such as a keyboard and a mouse can be connected, an output part (12) to which an output device such as a liquid crystal display can be connected, a communication part (13) to which a communication device (for example, a communication cable, a LAN card, a hub, a router, a modem and the like) capable of communicating with the outside of the proving device (1) can be connected, a CPU (Central Processing Unit) (14) [may include a cache memory], a RAM (15) serving as a memory, a ROM (16), an external storage device (17) such as a hard disc, an optical disc, and a semiconductor memory, and a bus (18) which connects the input part (11), the output part (12), the communication part (13), the CPU (14), the RAM (15), the ROM (16), and the external storage device (17) so that data can be exchanged thereamong. The proving device (1) may include, as needed, a device (drive) capable of reading/writing on a storage medium such as a CD-ROM (Compact Disc Read Only Memory) and a DVD (Digital Versatile Disc).

The external storage device (17) of the proving device (1) stores a program [proving device program] necessary for proving the storage of predetermined information s [held information] to be proved, and stores data and the like required in the processing of the program. Further, data and the like obtained by the processing of these programs is stored in a RAM, an external storage device, and so on.

To be specific, the external storage device (17) [or a ROM and the like] of the proving device (1) stores a program for generating authentication information and data and the like (information s and so on) required for the processing of these programs. Additionally, a control program for controlling processing based on these programs is also stored in the external storage device (17) and so on.

For convenience of explanation, the information s to be proved includes bit strings in the present specification. Needless to say, particularly when the proving device (1), a verification device, and a third party device (the verification device and the third party device will be described later) are realized by a computer, any kind of information (for example, text information understandable by persons) is stored as binary bit strings in the external storage device.

In the proving device (1), programs stored in the external storage device (17) [or the ROM and the like] and data required for the processing of the programs are read in the RAM (15). The CPU (14) executes the programs and processes the data. As a result, the CPU (14) realizes predetermined functions (an authentication information generation section and a control section).

[Verification Device]

A verification device of First Embodiment will be described below.

Figure 2:
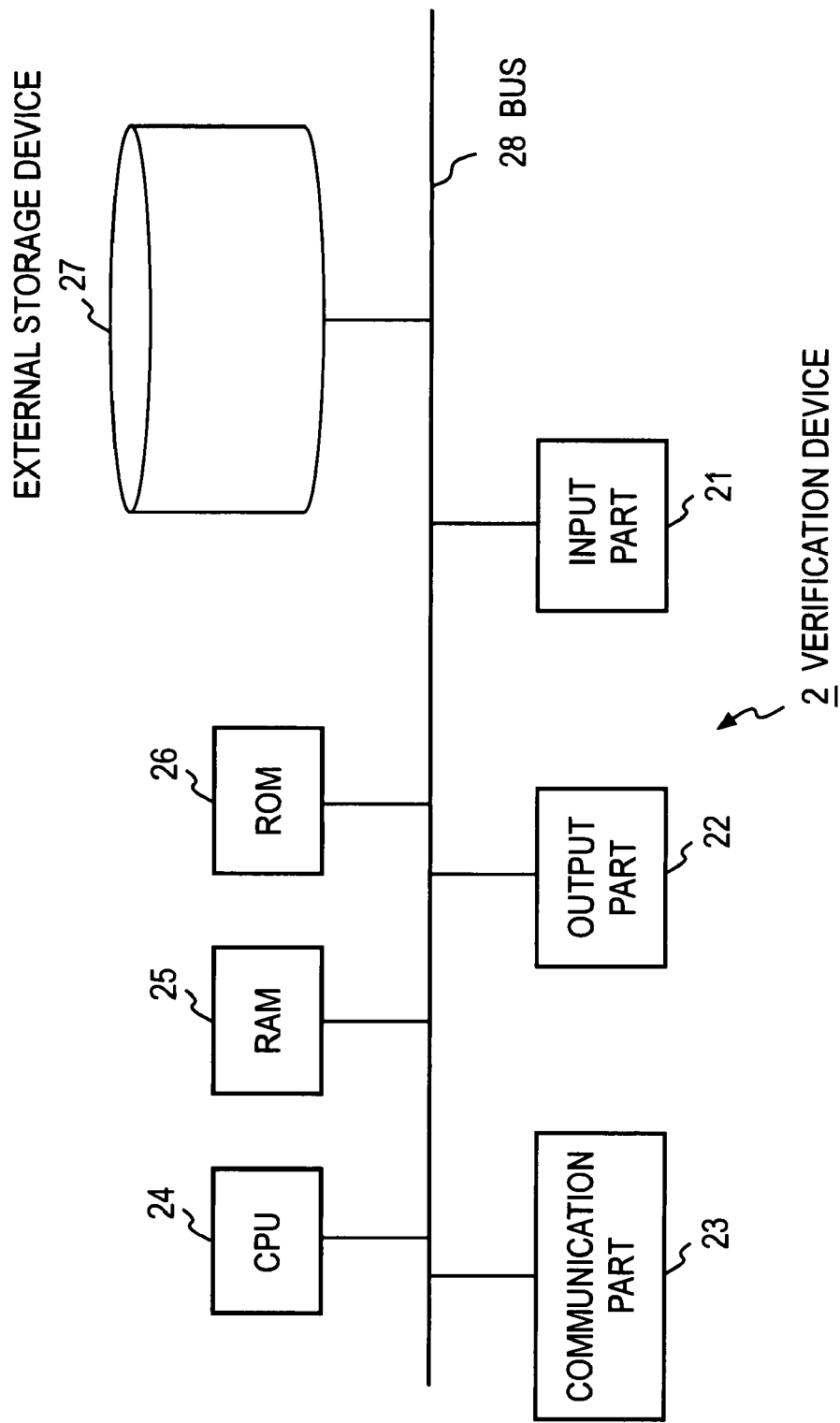
FIG. 2 is a structural block diagram illustrating a hardware configuration of a verification device (2) according to First Embodiment.

FIG. 2 is a structural block diagram illustrating a hardware configuration of a verification device (2) according to First Embodiment.

As shown in FIG. 2, the verification device (2) includes an input part (21) to which an input device such as a keyboard and a mouse can be connected, an output part (22) to which an output device such as a liquid crystal display can be connected, a communication part (23) to which a communication device (for example, a communication cable, a LAN card, a hub, a router, a modem and the like) capable of communicating with the outside of the verification device (2) can be connected, a CPU (Central Processing Unit) (24) [may include a cache memory], a RAM (25) serving as a memory, a ROM (26), an external storage device (27) such as a hard disc, an optical disc, and a semiconductor memory, and a bus (28) which connects the input part (21), the output part (22), the communication part (23), the CPU (24), the RAM (25), the ROM (26), and the external storage device (27) so that data can be exchanged thereamong. The verification device (2) may include, as needed, a device (drive) capable of reading/writing on a storage medium such as a CD-ROM and a DVD.

The external storage device (27) of the verification device (2) stores a program [verification device program] necessary for verifying that information s [held information] is stored in the proving device (1), and stores data and the like required in the processing of the program. Further, data obtained by the processing of these programs is stored in a RAM, an external storage device, and so on.

To be specific, the external storage device (27) [or a ROM and the like] of the verification device (2) stores a program for generating verification information, a program for generating an authentication information generation factor, a program for generating random numbers, a program for deciding whether information received from the proving device matches information stored in the verification device, and data and the like required for the processing of these programs. Additionally, a control program for controlling processing based on these programs is also stored in the external storage device (27) and so on.

In the verification device (2), the programs stored in the external storage device (27) [or the ROM and the like] and data required for the processing of the programs are read in the RAM (25) as needed. The CPU (24) executes these programs and processes the data. As a result, the CPU (24) realizes predetermined functions (a verification information generation section, an authentication information generation factor generation section, a random number generation section, a decision section, and a control section).

[Network Configuration]

A network configuration of an authentication system of First Embodiment will be described below.

Figure 3:
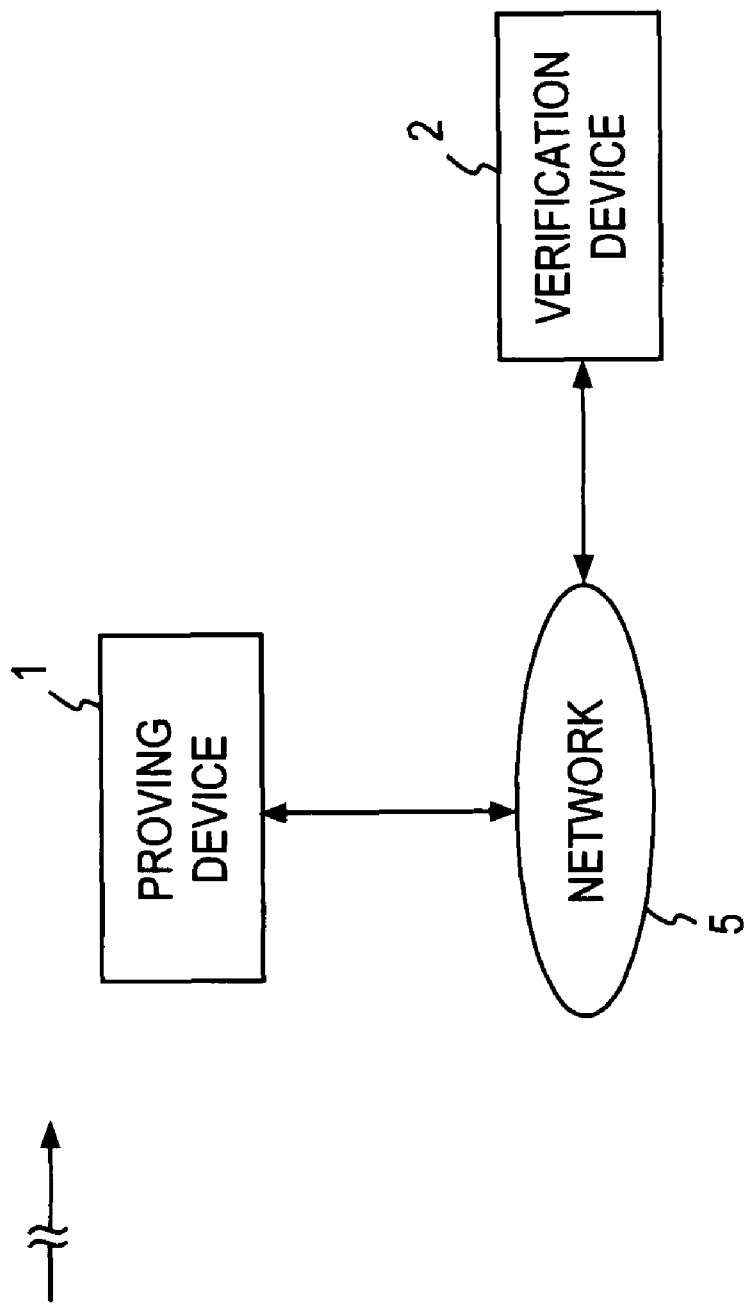
FIG. 3 shows an example of a network configuration of First Embodiment.

FIG. 3 shows the network configuration of the authentication system of First Embodiment.

As shown in FIG. 3, in First Embodiment, the single proving device (1) and the single verification device (2) are connected via a network (5) so as to communicate with each other. As a matter of course, although the single proving device (1) and the single verification device (2) are connected via the network (5) so as to communicate with each other, the number of proving devices (1) and the number of verification devices (2) are not limited to one. Two or more proving devices (1) and two or more verification devices (2) may be connected via the network (5) so as to communicate with each other. However, generally the number of verification devices (2) is one (in other words, the single verification device (2) is enough in many cases). The configuration of the network (5) is not particularly limited and thus any network may be used including the Internet, a LAN (Local Area Network), and a Peer-to-Peer network.

In the network configuration of First Embodiment, it is not always necessary to guarantee the confidentiality of communications between the proving device (1) and the verification device (2). For example, the probability of wiretapping and the like is not deniable (the same in the following embodiments).

[Authentication]

First Embodiment of the authentication system/method of the present invention illustrates a basic embodiment and can be expanded to various embodiments without departing from the gist of the present invention. The following explanation refers to FIGS. 4 to 7. In FIGS. 4 to 7 showing the functional blocks of the devices, functional parts indicated by the same reference numeral in the different functional blocks are not different parts. The same functional part is shown in the different functional blocks just for the sake of explanation. The functional blocks of the other embodiments are illustrated in a same manner.

It is assumed that the external storage device (17) of the proving device (1) stores the information s [held information] to be proved to be stored. Further, it is assumed that the external storage device (27) of the verification device (2) also stores information s [comparative information s'] beforehand. For convenience of explanation, the comparative information s' will be referred to as "s" in the embodiments. However, "s" does not mean that the comparative information and the held information are always identical to each other.

Moreover, it is assumed that as shared parameters in the authentication system of First Embodiment, a sufficiently large number N and a number g smaller than N (preferably a number g not smaller than 2 and smaller than N) are stored in the external storage device (17) of the proving device (1) and the external storage device (27) of the verification device (2). As described above, when the order for the multiplication of a residue class ring whose modulus is N is known to a third party, the authentication system becomes less safe. Further, as described above, when N is clearly a prime number, it is easy to determine the order for the multiplication of the residue class ring whose modulus is N. When N is a composite number, the determination of the order for the multiplication of the residue class ring whose modulus is N is more difficult than the prime factorization of N (when N is a composite number of the product of two prime numbers, the difficulty is the same). Therefore, in view of safety, it is desirable that N is a natural number other than numbers which can be decided to be prime numbers and it is difficult to factorize N into prime factors. For example, N is an RSA modulus [N=p·q (p and q are prime numbers), (p−1)/2 and (q−1)/2 are also prime numbers] which is a composite number whose factorization into prime factors is difficult, or N is a natural number which cannot be decided to be a prime number or not. Further, N may be a number close to a power of 2, for example, a number (Mersenne number) represented as $2^m-1$. In case that such N is used as modulus, the remainder can be calculated by replacing, for example, $2^m$ with 1. Such a calculation can be performed by a shift operation or a rearrangement of bits in an ordinary CPU. Therefore, it is possible to achieve high-speed calculation of the remainder. Such N can be efficiently generated also by a probabilistic algorithm. Since a table of numbers whose prime factorization are difficult is publicly known, N close to a power of 2 may be selected from the table.

Further, it is desirable that g is coprime to N. This is because when g isn't coprime to N and this information is known to an attacker, the attacker may use information about g as information for the prime factorization of N (for example, attempts to confirm whether a divisor of g is equal to a divisor of N or not).

Moreover, it is assumed that a predetermined natural number v (security parameter) is stored in the external storage device (27) of the verification device (2).

Figure 4:
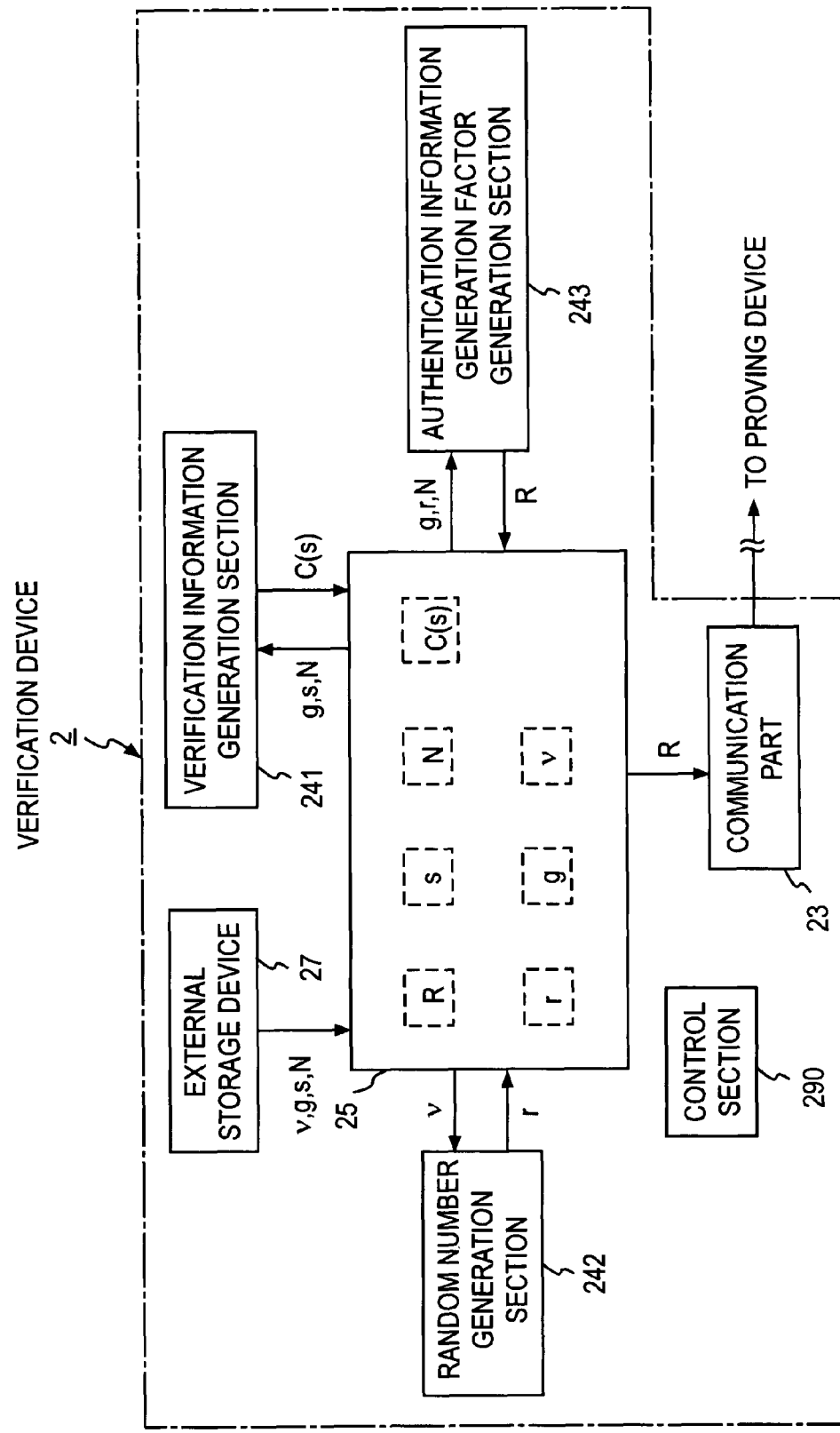
FIG. 4 is a functional block diagram (1) of the verification device (2) according to First Embodiment.

First, a control section (290) of the verification device (2) reads N, g, v, and the information s from the external storage device (27) and stores them in the respective predetermined storage areas of the RAM (25) [see FIG. 4]. Hereinafter, ". . . is read from the RAM" means that " . . . is read from the predetermined storage area where . . . has been stored in the RAM".

A verification information generation section (241) of the verification device (2) reads g, N, and the information s from the RAM (25), performs an operation according to Formula (1), and stores an arithmetic result C(s) [verification information] in a predetermined storage area of the RAM (25) (step S1) [see FIG. 4]. In this case, the information s of bit strings is equated with the binary notation of natural numbers.

[Formula 1]

$$C(s)=g^s \bmod N \qquad (1)$$

Next, the control section (290) of the verification device (2) deletes the information s stored in the external storage device (27) (step S2) [see FIG. 4]. In this case, the deletion means that a storage area where target information is stored is opened, for example, overwriting is allowed in the storage area (that is, new information is stored) or the storage area is overwritten with a Null value.

After that, a random number generation section (242) of the verification device (2) reads v from the RAM (25), generates a random number r [first random information] not more than $2^{2v}$, and stores the random number r in a predetermined storage area of the RAM (25) (step S3) [see FIG. 4]. The random number generation section (242) may generate the random number r from the range of $0 \leq r \leq N \cdot 2^v - 1$. This is because, as described above, the configuration for selecting the random number r from this range is desirable in view of compatibility of safety and arithmetic cost. Further, r does not always have to be a random number as long as the value can be selected at random. Although the random number generation section (242) generates the random number r as the first random information in First Embodiment, a predetermined value may be stored as the first random information in the external storage device (27) and the value may be read from the external storage device (27). In this case, the predetermined value has to be concealed from the outside of the verification device (2) in view of safety.

Next, an authentication information generation factor generation section (243) of the verification device (2) reads g, N, and r from the RAM (25), performs an operation according to Formula (2), and stores an arithmetic result R [authentication information generation factor] in a predetermined storage area of the RAM (25) (step S4) [see FIG. 4].

[Formula 2]

$$R=g^r \bmod N \qquad (2)$$

After that, according to the control of the control section (290) of the verification device (2), the communication part (23) transmits, to the proving device (1), the authentication information generation factor R which is obtained in step S4 and read from the RAM (25) (step S5) [see FIG. 4].

The verification information C(s), the random number r, and the authentication information generation factor R which are obtained in steps S1, S3 and S4 are stored in the external storage device (27) under the control of the control section (290) of the verification device (2).

Figure 5:
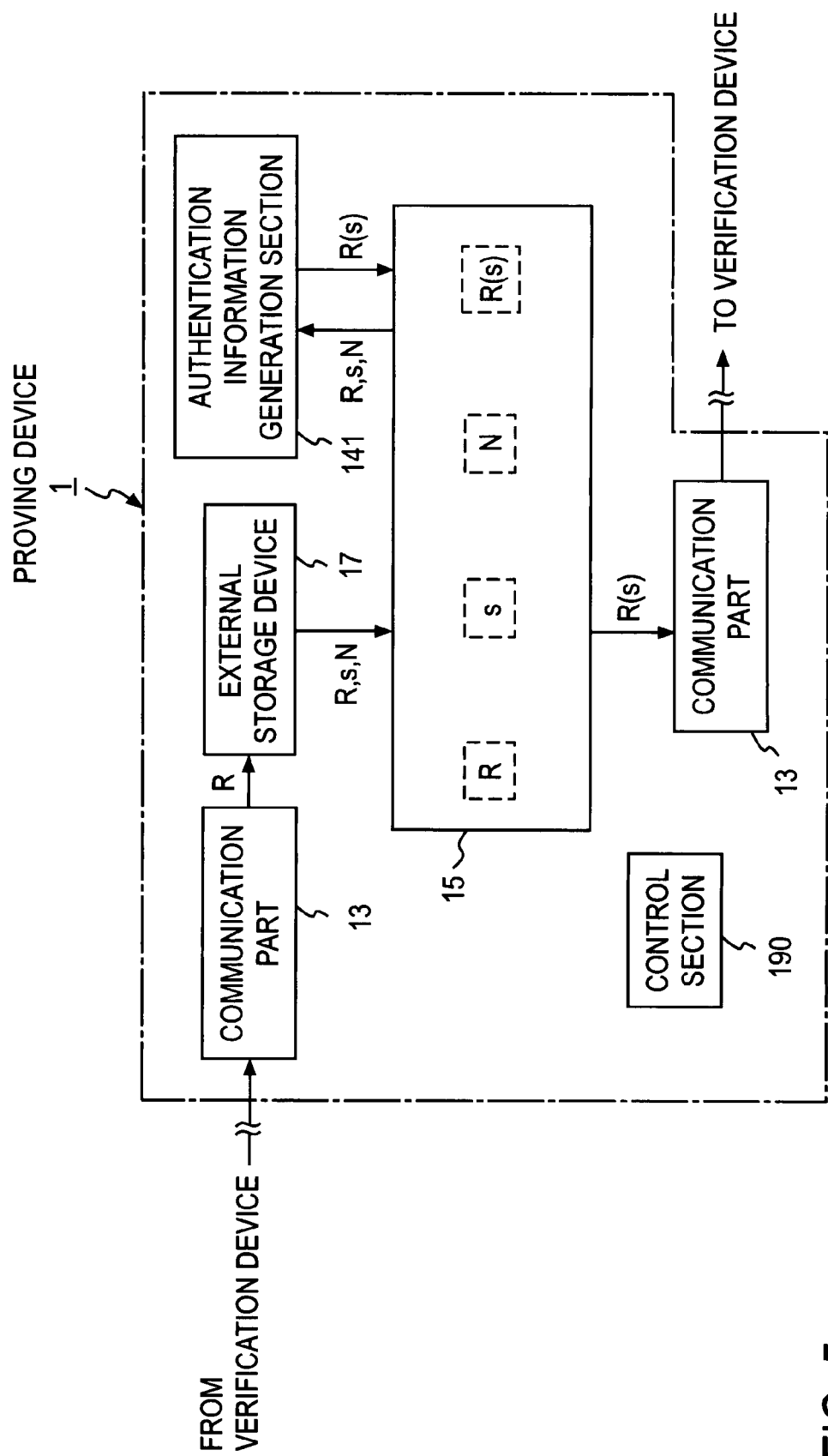
FIG. 5 is a functional block diagram of the proving device (1) according to First Embodiment.

Next, according to the control of a control section (190) of the proving device (1), the communication part (13) receives the authentication information generation factor R transmitted in step S5, and the control section (190) stores the authentication information generation factor R in the external storage device (17) (step S6) [see FIG. 5].

After that, the control section (190) of the proving device (1) reads N, the information s, and the authentication information generation factor R from the external storage device (17) and stores them in the respective predetermined storage areas of the RAM (15) [see FIG. 5].

Next, an authentication information generation section (141) of the proving device (1) reads N, the information s, and the authentication information generation factor R from the RAM (15), performs an operation according to Formula (3), and stores an arithmetic result R(s) [authentication information] in a predetermined storage area of the RAM (15) (step S7) [see FIG. 5].

[Formula 3]

$$R(s)=R^s \bmod N \qquad (3)$$

After that, according to the control of the control section (190) of the proving device (1), the communication part (13) transmits, to the verification device (2), the authentication information R(s) read from the RAM (15) (obtained in step S7) (step S8) [see FIG. 5].

Figure 6:
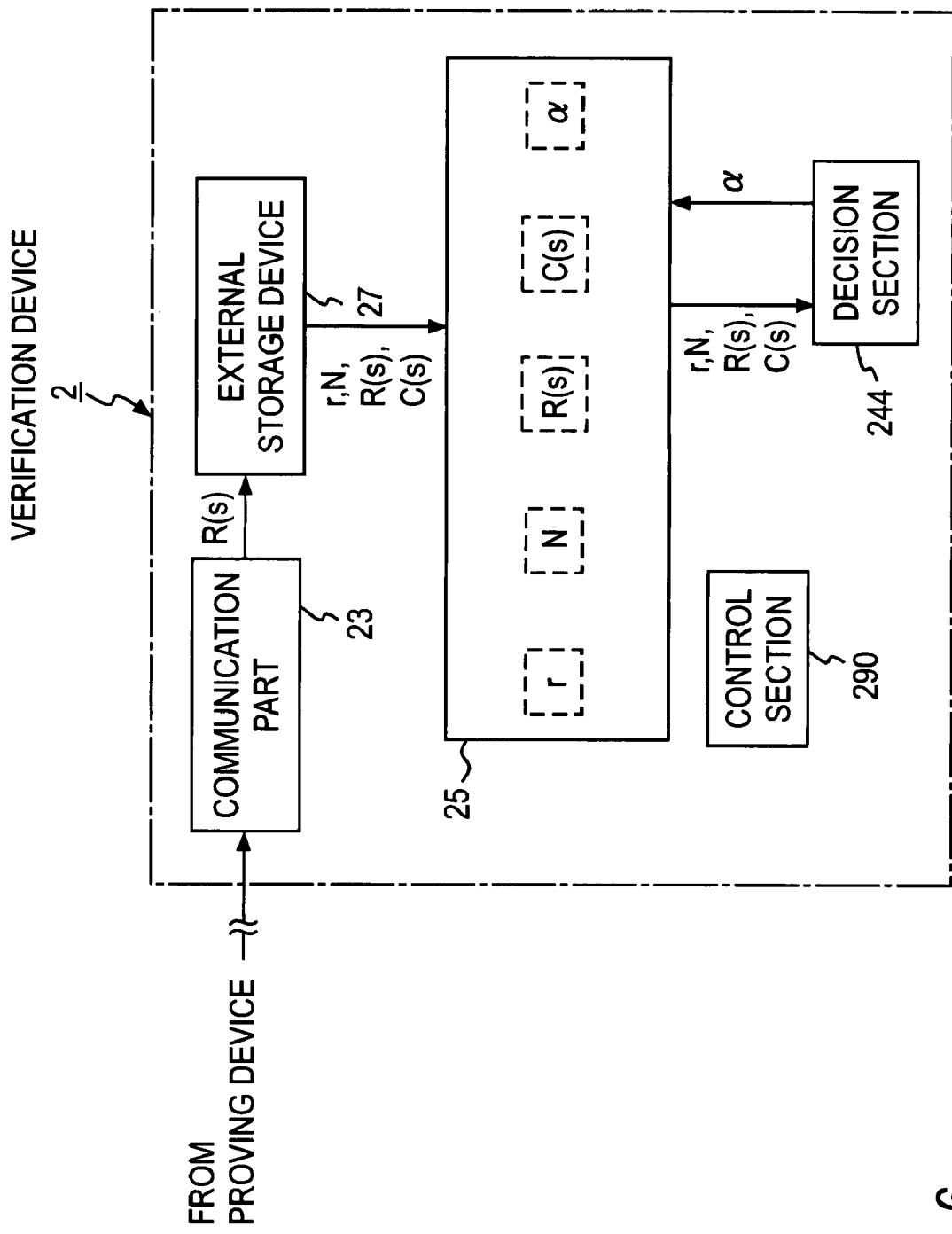
FIG. 6 is a functional block diagram (2) of the verification device (2) according to First Embodiment.
Figure 7:
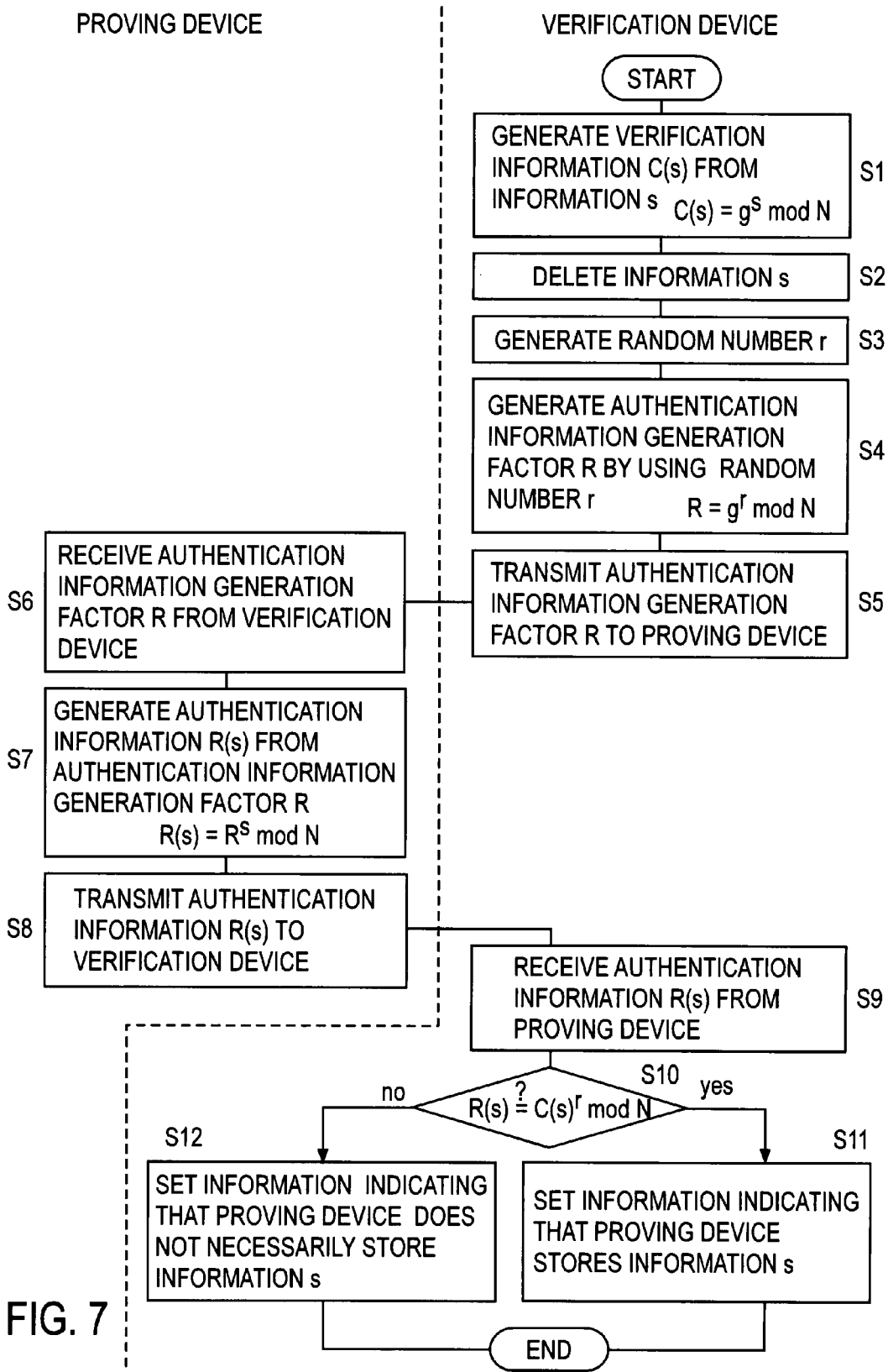
FIG. 7 shows a processing flow of First Embodiment.

Next, according to the control of the control section (290) of the verification device (2), the communication part (23) receives the authentication information R(s) transmitted in step S8, and the control section (290) stores the authentication information R(s) in the external storage device (27) (step S9) [see FIG. 6].

After that, the control section (290) of the verification device (2) reads N, the random number r, and the authentication information R(s), and the verification information C(s) from the external storage device (27) and stores them in the respective predetermined storage areas of the RAM (25) [see FIG. 6].

Next, a decision section (244) of the verification device (2) reads N, the random number r, the authentication information R(s), and the verification information C(s) from the RAM (25) and decides whether the relationship expressed by Formula (4) is established or not (step S10) [see FIG. 6]. When the decision section (244) decides that the relationship is established, predetermined information α (for example, value α=1) indicating that the relationship is established is stored in a predetermined storage area of the RAM (25) (step S11). When the decision section (244) decides that the relationship is not established, the predetermined information α (for example, value α=0) indicating that the relationship is not established is stored in the predetermined storage area of the RAM (25) (step S12).

[Formula 4]

$$R(s) = C(s)^r \bmod N \qquad (4)$$

In this case, the establishment of the relationship of Formula (4) means that the proving device (1) stores the information s. When the relationship of Formula (4) is not established, the proving device (1) does not necessarily store the information s.

As described above, the verification device (2) can authenticate that the proving device (1) stores the information s, without storing the information s.

Second Embodiment

Referring to FIGS. 8 to 14, Second Embodiment of the present invention will now be described below.

In First Embodiment, it is assumed that the large number N is stored in the external storage device (17) of the proving device (1) and the external storage device (27) of the verification device (2) beforehand. N is a natural number other than numbers which can be decided to be prime numbers and it is difficult to factorize N into prime factor.

In Second Embodiment, N is generated for securing a high level of safety in the authentication system/method illustrated in embodiments described in the present specification. N is not always generated by a single method and can be generated by various methods. In Second Embodiment, N is generated by a third party device (3). The third party device (3) does not always have to be physically separated and may be realized as a module that is present in a proving device (1) and/or a verification device (2).

In Second Embodiment, the same functions and processing as those of First Embodiment are indicated by the same reference numerals and the explanation thereof is omitted.

[Proving Device]

The proving device (1) of Second Embodiment is same as that of First Embodiment and thus the explanation thereof is omitted.

[Verification Device]

Unlike First Embodiment, an external storage device (27) [or a ROM and the like] of the verification device (2) in Second Embodiment does not require a program for generating verification information.

In the verification device (2), programs stored in the external storage device (27) [or the ROM and the like] and data required for the processing of the programs are read in a RAM (25) as needed. A CPU (24) executes these programs and processes the data. As a result, the CPU (24) realizes predetermined functions (an authentication information generation factor generation section, a random number generation section, a decision section, and a control section).

[Third Party Device]

The third party device of Second Embodiment will be described below.

Figure 8:
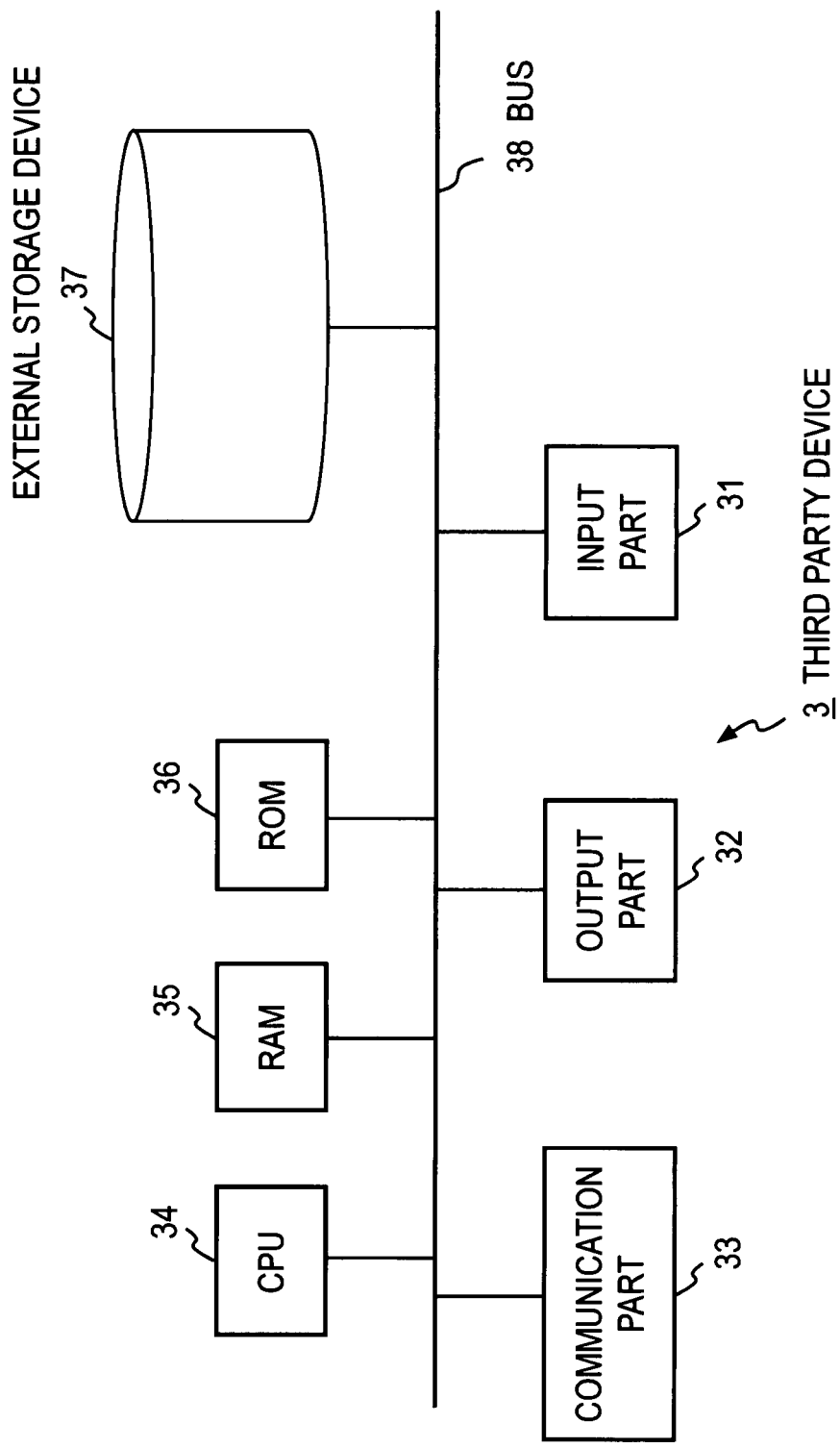
FIG. 8 is a structural block diagram illustrating a hardware configuration of a third party device (3) according to Second Embodiment.

FIG. 8 is a structural block diagram illustrating a hardware configuration of a third party device (3) according to Second Embodiment.

As shown in FIG. 8, the third party device (3) includes an input part (31) to which an input device such as a keyboard and a mouse can be connected, an output part (32) to which an output device such as a liquid crystal display can be connected, a communication part (33) to which a communication device (for example, a communication cable, a LAN card, a hub, a router, a modem and the like) capable of communicating with the outside of the third party device (3) can be connected, a CPU (Central Processing Unit) (34) [may include a cache memory], a RAM (35) serving as a memory, a ROM (36), an external storage device (37) such as a hard disc, an optical disc, and a semiconductor memory, and a bus (38) which connects the input part (31), the output part (32), the communication part (33), the CPU (34), the RAM (35), the ROM (36), and the external storage device (37) so that data can be exchanged thereamong. The third party device (3) may include, as needed, a device (drive) capable of reading/writing on a storage medium such as a CD-ROM and a DVD.

The external storage device (37) of the third party device (3) stores a program for generating N, a program for generating g, a program for generating verification information, and data and the like (information s) required for the processing of this program. Additionally, a control program for controlling processing based on these programs is also stored in the external storage device (37) and so on. Data obtained by the processing of these programs is stored in a RAM, an external storage device, and so on.

In the third party device (3), the programs stored in the external storage device (37) [or the ROM and the like] and the data required for the processing of these programs are read in the RAM (35) as needed. The CPU (34) executes these programs and processes the data. As a result, the CPU (34) realizes predetermined functions (an N generation section, a g generation section, a verification information generation section, and a control section).

[Network Configuration]

The network configuration of an authentication system of Second Embodiment will be described below.

Figure 9:
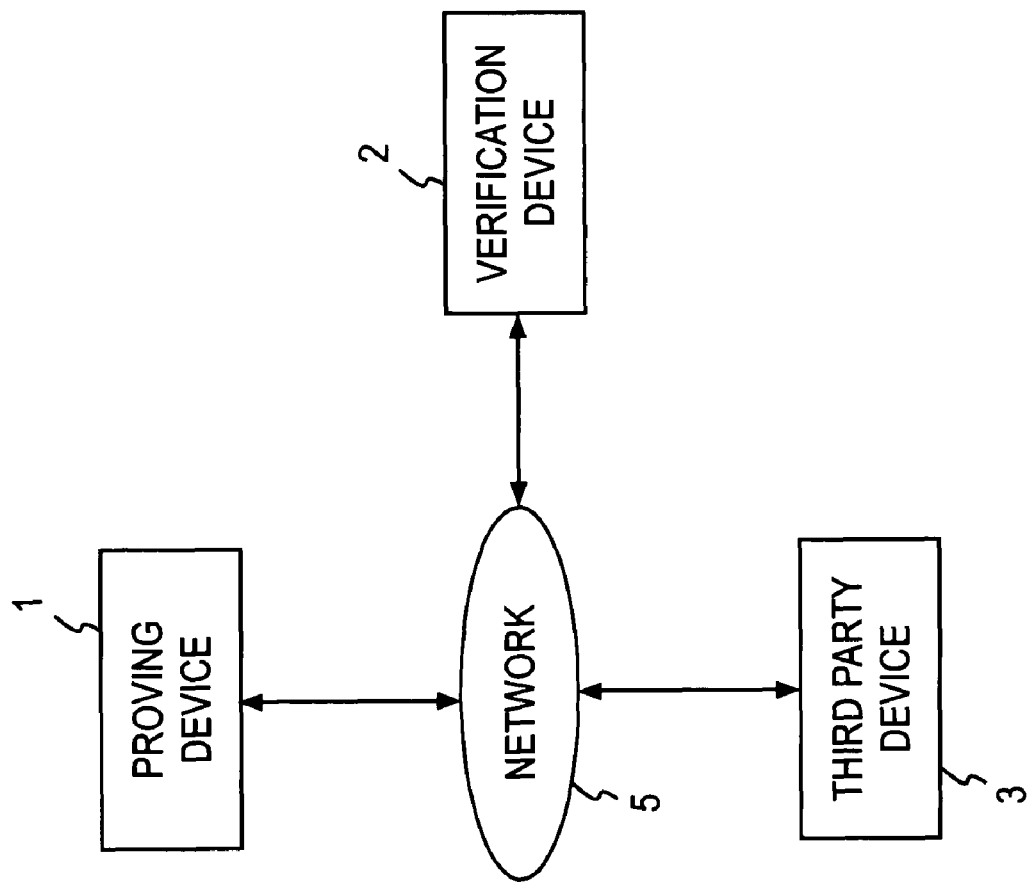
FIG. 9 shows an example of a network configuration of Second Embodiment.

FIG. 9 shows the network configuration of the authentication system of Second Embodiment.

As shown in FIG. 9, in Second Embodiment, the single proving device (1), the single verification device (2), and the single third party device (3) are connected via a network (5) so as to communicate with each other. The number of third party devices (3) is not limited one. However, in the presence of a plurality of proving devices, verification information corresponding to the proving devices can be generated if the same information (comparative information) as information stored in the proving devices (held information) are stored in the third party device. Thus generally, the single third party device is enough.

[Authentication]

It is assumed that information s [comparative information] is stored in the external storage device (37) of the third party device (3). Moreover, it is assumed that a predetermined natural number v is stored in the external storage device (27) of the verification device (2).

Figure 10:
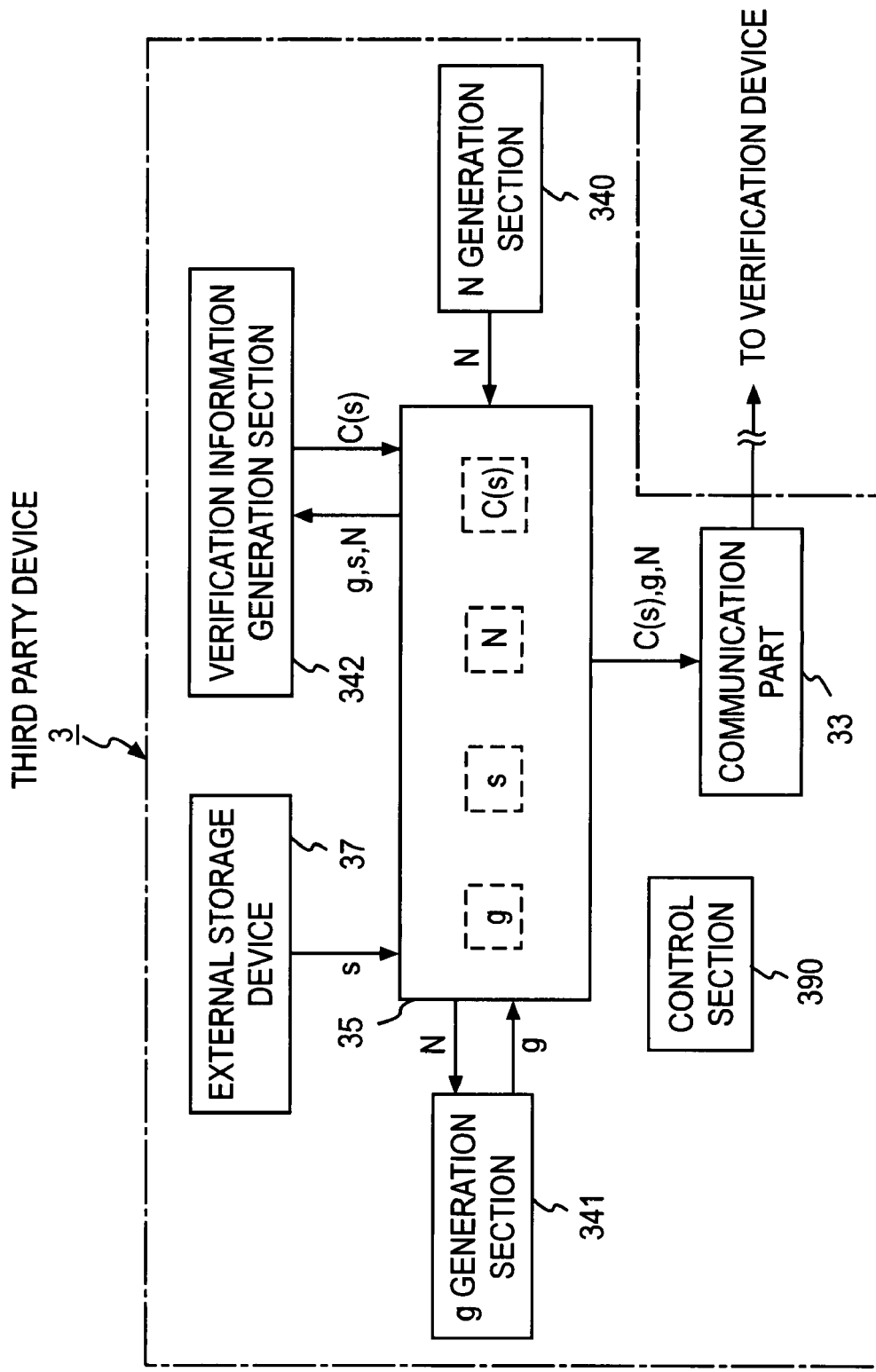
FIG. 10 is a functional block diagram of the third party device (3) according to Second Embodiment.

First, a control section (390) of the third party device (3) reads the information s from the external storage device (37) and stores the information in a predetermined storage area of the RAM (35) [see FIG. 10].

An N generation section (340) of the third party device (3) generates a number N. N is a natural number other than numbers which can be decided to be prime numbers and it is difficult to factorize N into prime factor. The N generation section (340) stores N in a predetermined storage area of the RAM (35) (step S0t) [see FIG. 10]. When N is the foregoing RSA modulus, N is generated such that (p−1)/2 and (q−1)/2 are prime numbers where p and q represent a pair of prime numbers, and then N=p·q is calculated. Such a kind of p and q are existent infinitely and N can be efficiently calculated by a probabilistic algorithm.

Instead of determining N by using the third party device, N may be determined by, for example, a program module executed by the processor of the proving device or the verification device. As an example of such a method, a multi-party protocol is available (see Reference 1). According to this method, any of the devices participating in a calculation for determining N cannot factorize N into prime factors and it is possible to generate a random N satisfying the requirements.

(Reference 1)

J. Algesheimer, J. Camenish and V. Shoup, "Efficient Computation Modulo a Shared Secret with Application to the Generation of Shared Safe-Prime Products", CRYPTO 2002, LNCS 2442, pp. 417-432, 2002, Springer-Verlag.

Further, as N difficult to factorize into prime factor, a number close to the power of 2, for example, N (Mersenne number) expressed as $2^m-1$ may be generated. N can be efficiently generated by a probabilistic algorithm. Since a table of numbers difficult to factorize into prime factors is publicly known, N close to the power of 2 may be selected from the table.

After that, a g generation section (341) of the third party device (3) reads N from the RAM (35), generates a positive integer g smaller than N, and stores g in a predetermined storage area of the RAM (35) (step S1$t$) [see FIG. 10].

Next, a verification information generation section (342) of the third party device (3) reads g, N, and the information s from the RAM (35), performs an operation according to Formula (1), and stores an arithmetic result C(s)[verification information] in a predetermined storage area of the RAM (35) (step S2$t$) [see FIG. 10].

After that, according to the control of the control section (390) of the third party device (3), the communication part (33) transmits, to the verification device (2), N, g, and the verification information C(s) which are read from the RAM (35) (obtained in steps S0$t$, S1$t$, S2$t$) (step S3$t$) [see FIG. 10].

Next, the control section (390) of the third party device (3) deletes the information s stored in the external storage device (37) as needed (step S4$t$).

According to the control of the control section (290) of the verification device (2), a communication part (23) receives N, g, and the verification information C(s) which are transmitted in step S3$t$, and the control section (290) stores N, g, and the verification information C(s) in the external storage device (27) (step S3$v$).

Steps S3 and S4 following step S3$v$ are same as the processing of First Embodiment and thus the explanation thereof is omitted.

Figure 11:
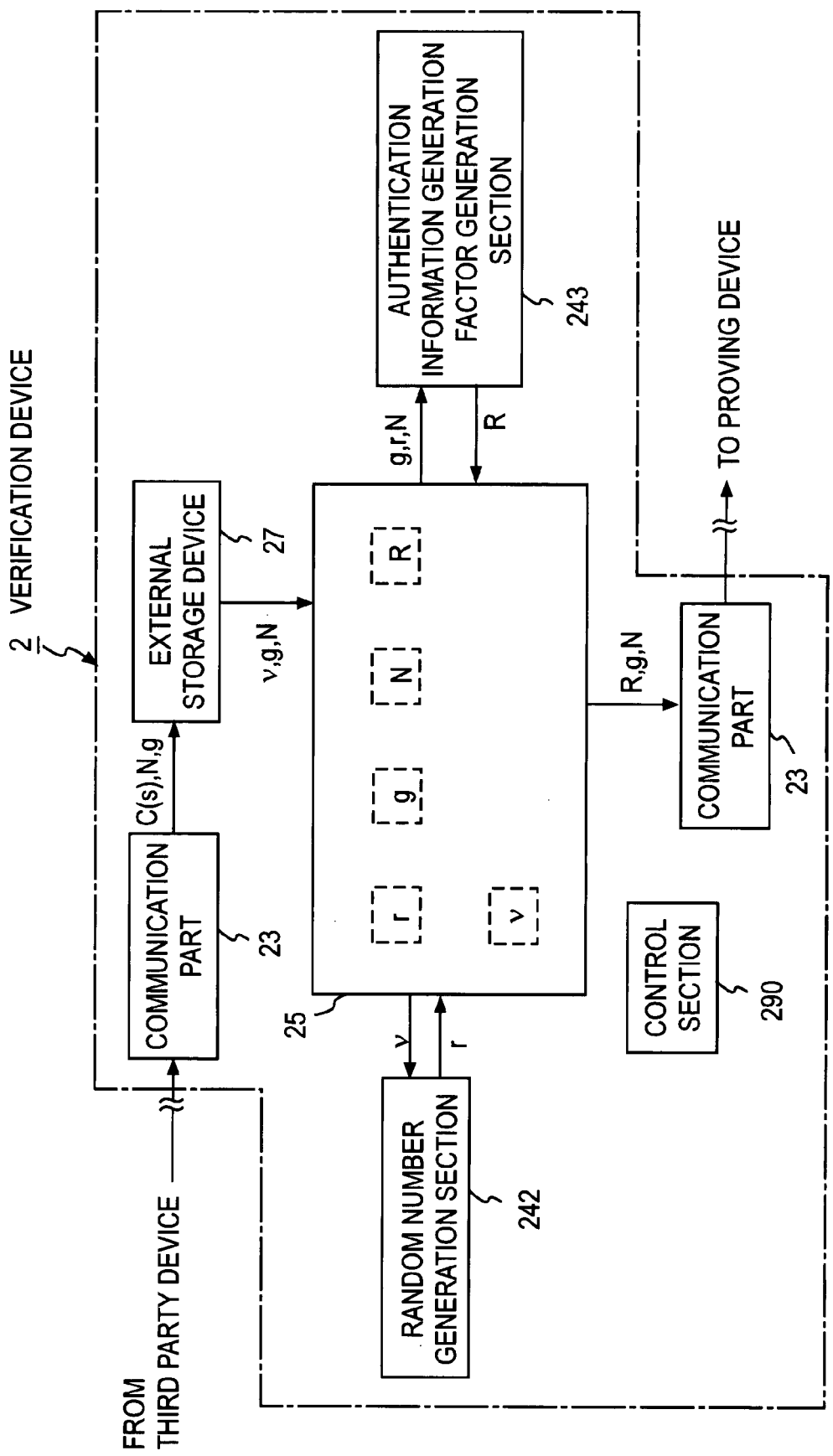
FIG. 11 is a functional block diagram of a verification device (2) according to Second Embodiment.

In the processing of step S5 in First Embodiment, the verification device (2) transmits the authentication information generation factor R to the proving device (1), whereas in Second Embodiment, N and g are transmitted to the proving device (1) in addition to the authentication information generation factor R (step S5') [see FIG. 11].

Figure 12:
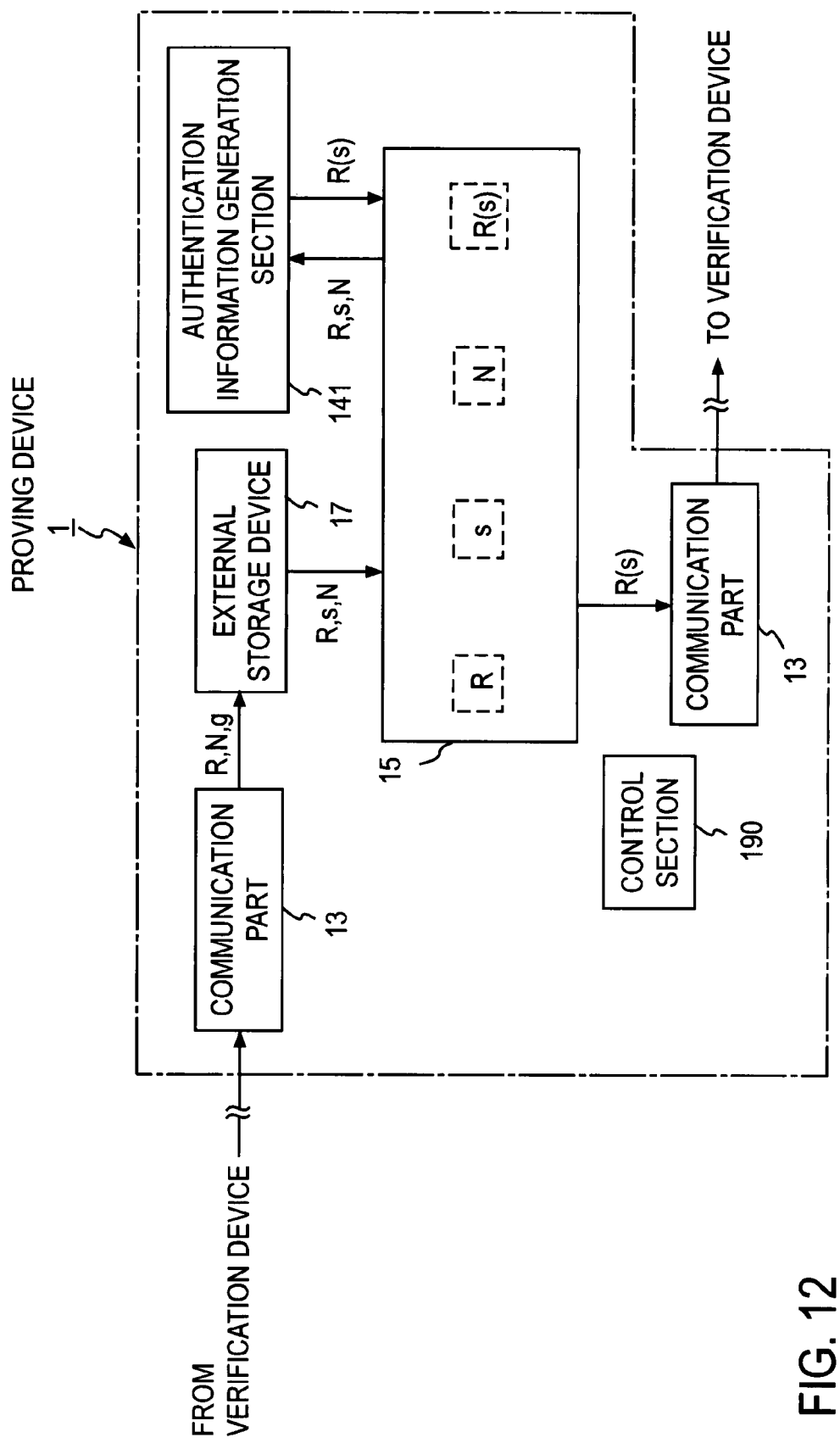
FIG. 12 is a functional block diagram of a proving device (1) according to Second Embodiment.
Figure 13:
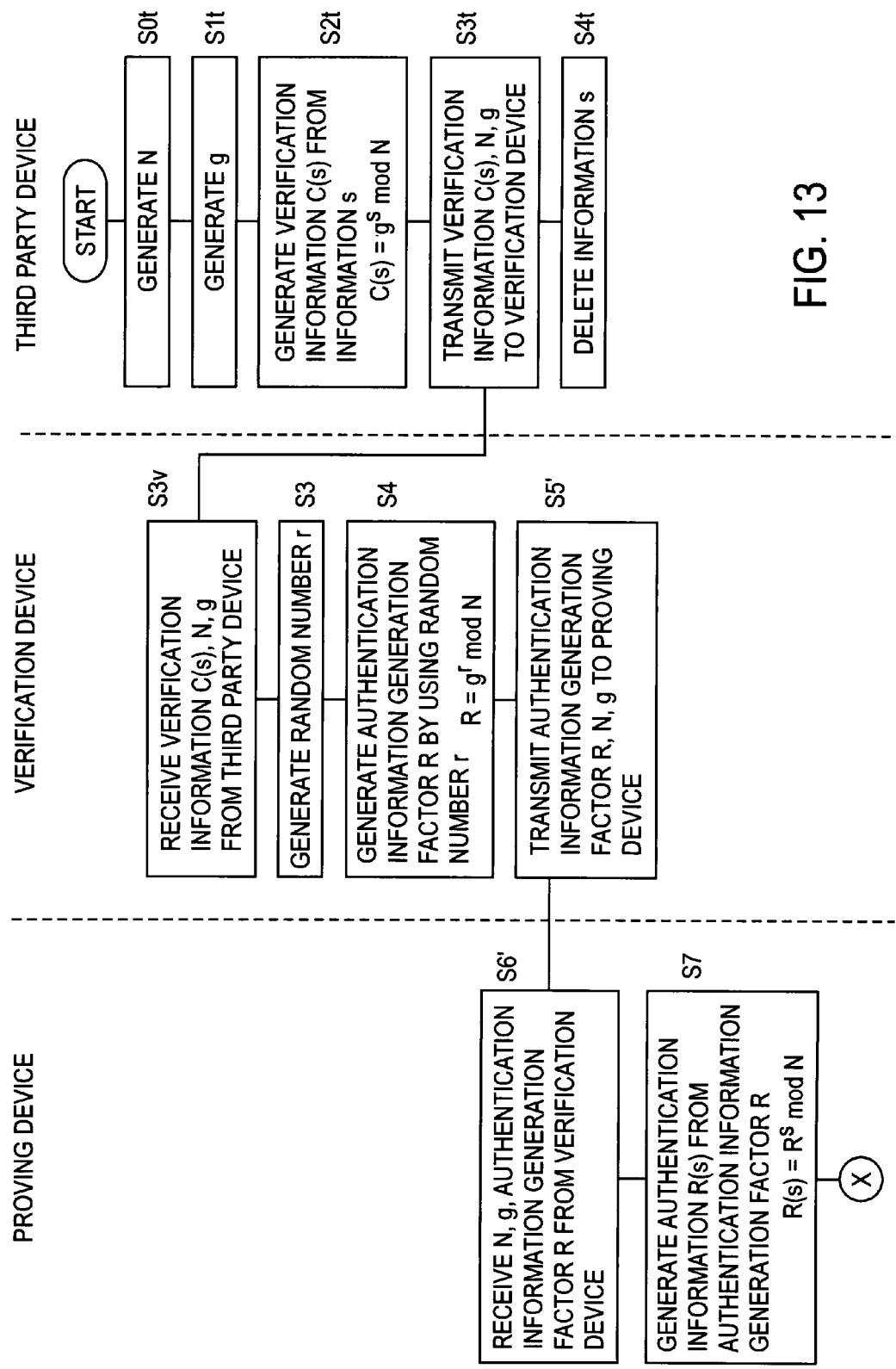
FIG. 13 shows a processing flow (1) of Second Embodiment.
Figure 14:
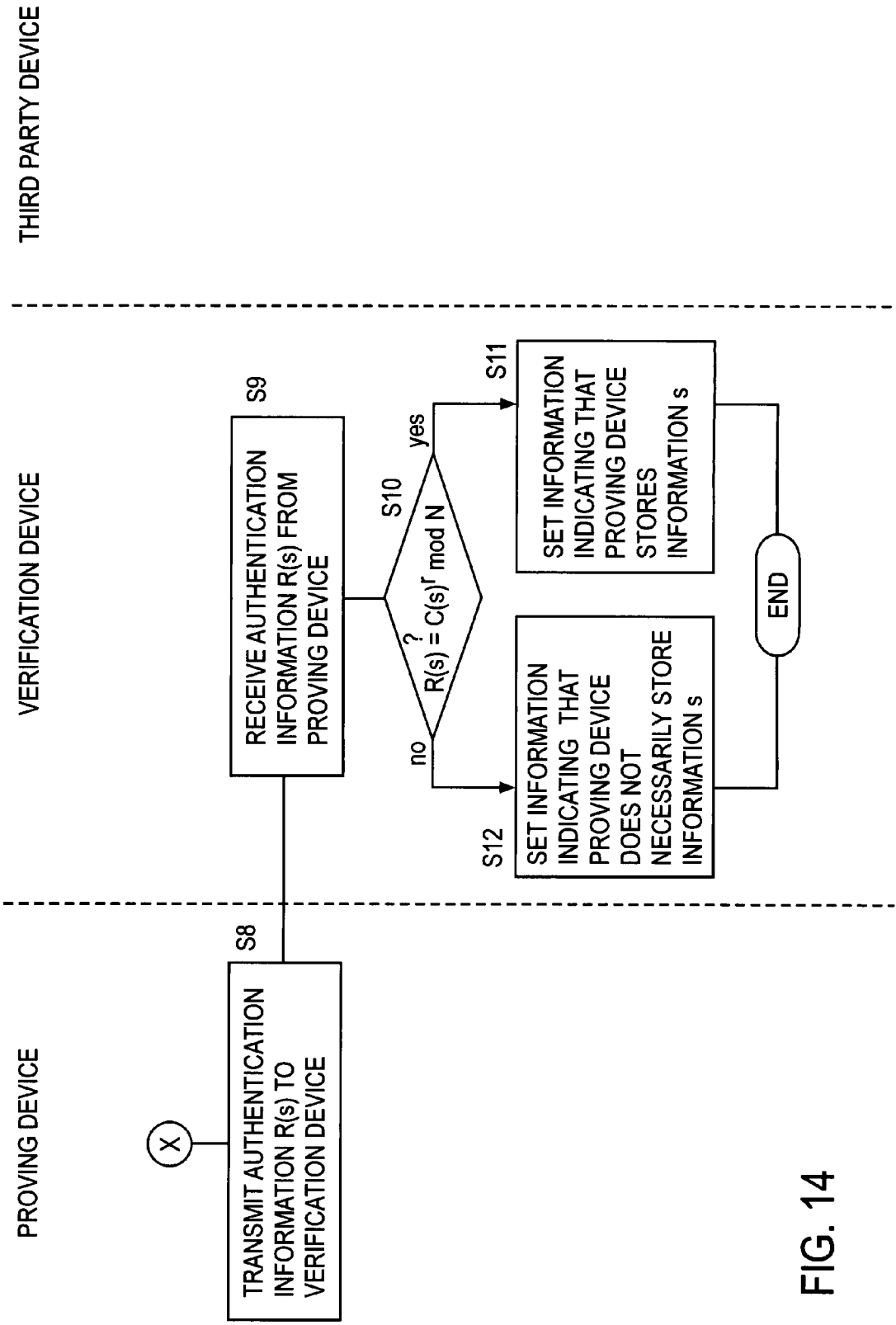
FIG. 14 shows a processing flow (2) of Second Embodiment.

In the processing of step S6 in First Embodiment, the proving device (1) receives the authentication information generation factor R from the verification device (2), whereas in Second Embodiment, N and g are received from the verification device (2) in addition to the authentication information generation factor R (step S6') [see FIG. 12].

Steps S7 to S12 following step S6' are same as the processing of First Embodiment and thus the explanation thereof is omitted.

Third Embodiment

Referring to FIGS. 15 to 20, Third Embodiment of the present invention will now be described below.

Third Embodiment will describe a technique for increasing calculation efficiency in First Embodiment and Second Embodiment. The technique for increasing calculation efficiency is applicable to both of First Embodiment and Second Embodiment. For convenience of explanation in Third Embodiment, the following will discuss an example in which the technique for increasing calculation efficiency is applied to Second Embodiment.

In order to increase calculation efficiency, information s is divided into a plurality of pieces of information. In Third Embodiment, an example of the divided pieces of information will be described. The information s represented as bit strings is divided into k pieces of divided information $s_0, s_1, \ldots, s_{k-1}$ and the information s is expressed as a combination of bit strings of k pieces of divided information $s_0, s_1, \ldots, s_{k-1}$. In other words, the information s is expressed as $s=s_0|s_1|\ldots|s_{k-1}$. In Third Embodiment, the value of the division number k and bit length of $s_i$ for $i=0, 1, 2, \ldots, k-1$ are stored beforehand in the external storage devices of a proving device (1), a verification device (2), and a third party device (3). As a matter of course, the value and the bit length may be determined at random in, for example, the third party device (3) and then transmitted to the verification device (2) and the proving device (1). The design can be optionally changed.

Further, for the sake of efficiency, the division number k may be set at a predetermined fixed value or a protocol may be determined such that the bit length of $s_i$ is obtained by equally dividing the bit length of s. In Third Embodiment, the same functions and processing as Second Embodiment are indicated by the same reference numerals and the explanation thereof is omitted. Hereinafter, the information s is a generic name for k pieces of divided information $s_0, s_1, \ldots, s_{k-1}$.

[Proving Device]

The proving device (1) of Third Embodiment is same as that of First Embodiment and thus the explanation thereof is omitted.

[Verification Device]

The verification device (2) of Third Embodiment is same as that of Second Embodiment and thus the explanation thereof is omitted.

[Third Party Device]

The third party device (3) of Third Embodiment is same as that of Second Embodiment and thus the explanation thereof is omitted.

[Preparation]

v is set at a predetermined natural number. It is assumed that v is stored in an external storage device (27) of the verification device (2). Further, H(i,u,R) is a predetermined function. For example, $H(i,u,R)=u^i$ may be set, $H(i,u,R)=u^i \mod E$ (E is preferably a prime number larger than $2^v$) may be set, and a hash function such as SHA-1 may be used. Moreover, a different function may be provided as H(i,u,R) for each i where at least one of u and R is a variable (for example, H(i,u,R)=u is set for i=1, $H(i,u,R)=u^{i+R}$ is set for i=2). Additionally, H(i,u,R) may be any function as long as the function value is determined depending upon i and at least one of u and R.

In view of safety, it is desirable that the function H(i,u,R) is a function H(i,X) (X represents at least one of u and R) satisfying the following conditions. This is because when the function H(i,X) satisfying the following conditions is used, it is possible to prove that only a user who can correctly obtain H(i,u,R) corresponding all of k pieces of divided information $s_0, s_1, \ldots, s_{k-1}$ can pass the verification of the protocol.

(1) j=0 is set.

(2) X is randomly selected and $a_{i+1,j+1}=H(i,X)$ is set for i=0, 1, ..., k-1.

(3) j=j+1 is set and when j>k-1 is not satisfied, the process returns to (2).

(4) In the case of j>k−1, there is a high probability that a matrix $(a_{i+1,j+1})$(i=0, 1, . . . , k−1, j=0, 1, . . . , k−1) is nondegenerate.

The hash function and said $H(i,u,R)=u^i \mod E$ are functions satisfying these conditions (for example, see "H. Anton and C. Rorres. Elementary Linear Algebra with Applications. 9th ed., John Wiley & Sons, 2005" and so on). Thus in view of safety, it is desirable to use the hash function or said $H(i,u,R)=u^i \mod E$.

Further, as described above, when $H(i,u,R)$ is a one-way function, the collision of the function value can be prevented, improving the reliability and safety of verification.

[Authentication]

It is assumed that information s [comparative information] is stored in an external storage device (37) of the third party device (3).

Steps S0t and S1t are same as the processing of Second Embodiment and thus the explanation thereof is omitted.

Figure 15:
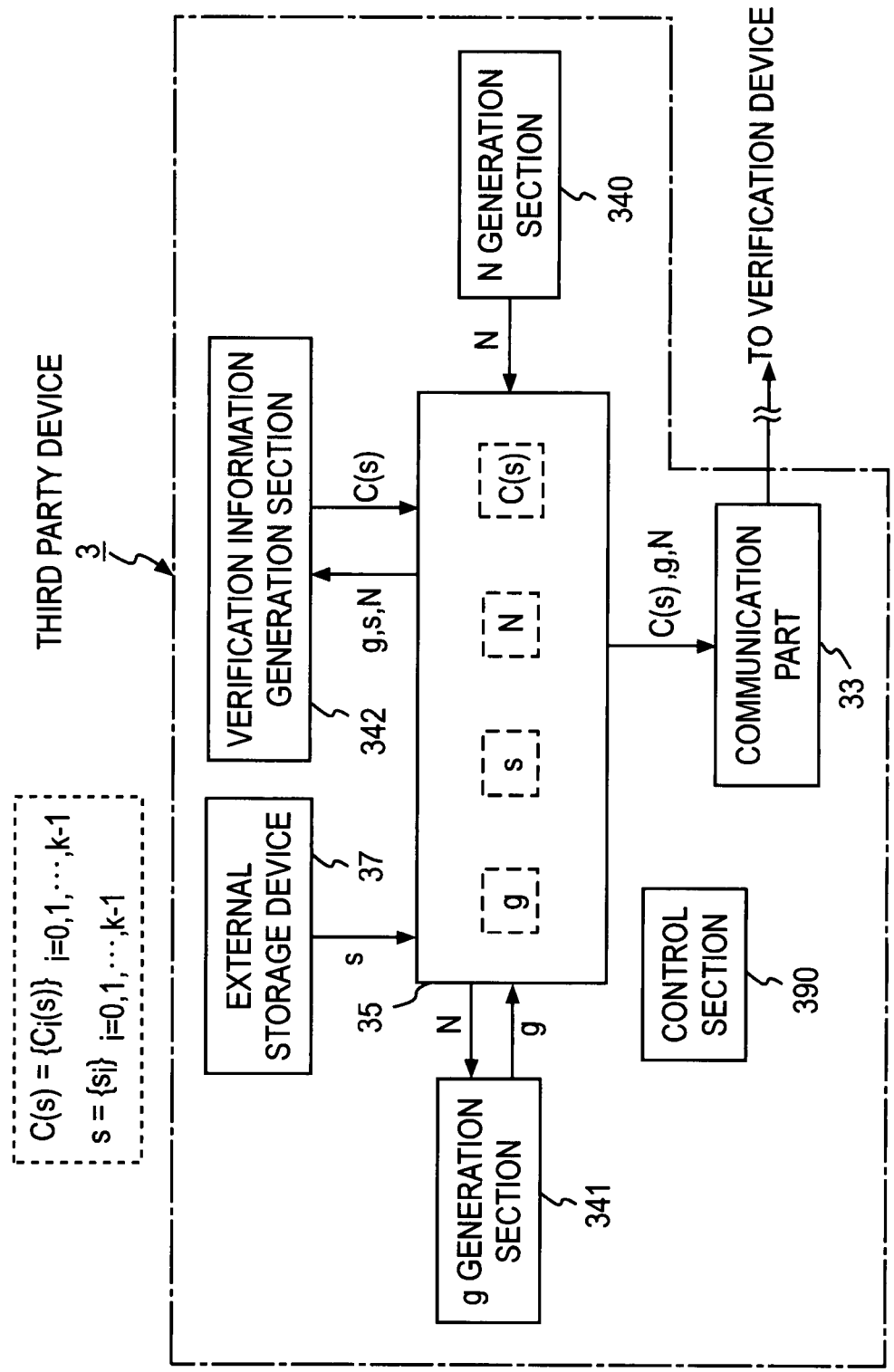
FIG. 15 is a functional block diagram of a third party device (3) according to Third Embodiment.

After step S1t, a verification information generation section (342) of the third party device (3) reads g, N, and k pieces of divided information $s_0, s_1, \ldots, s_{k-1}$ [first divided information obtained by dividing the comparative information into a plurality of pieces] from the RAM (35) [These information are read in the RAM (35) from the external storage device (37) beforehand], performs an operation according to Formula (5) for each of the divided information $s_i$, and stores arithmetic results $C_i(s)=\{C_i(s)\}_{i=0, 1, 2, \ldots, k-1}$ [verification information] in a predetermined storage area of the RAM (35) (step S2a) [see FIG. 15]. Bit strings $s_i$ are equated with the binary notation of natural numbers.

[Formula 5]

$$C_i(s)=g^{s_i} \mod N \quad (5)$$

Next, according to the control of a control section (390) of the third party device (3), a communication part (33) transmits, to the verification device (2), N, g, and the verification information $C_i(s)$ $\{C_i(s)\}_{i=0, 1, 2, \ldots, k-1}$ which are read from the RAM (35) (obtained in steps S0t, S1t, and S2a) (step S3a) [see FIG. 15].

Step S4t is same as that of Second Embodiment and thus the explanation thereof is omitted.

Figure 16:
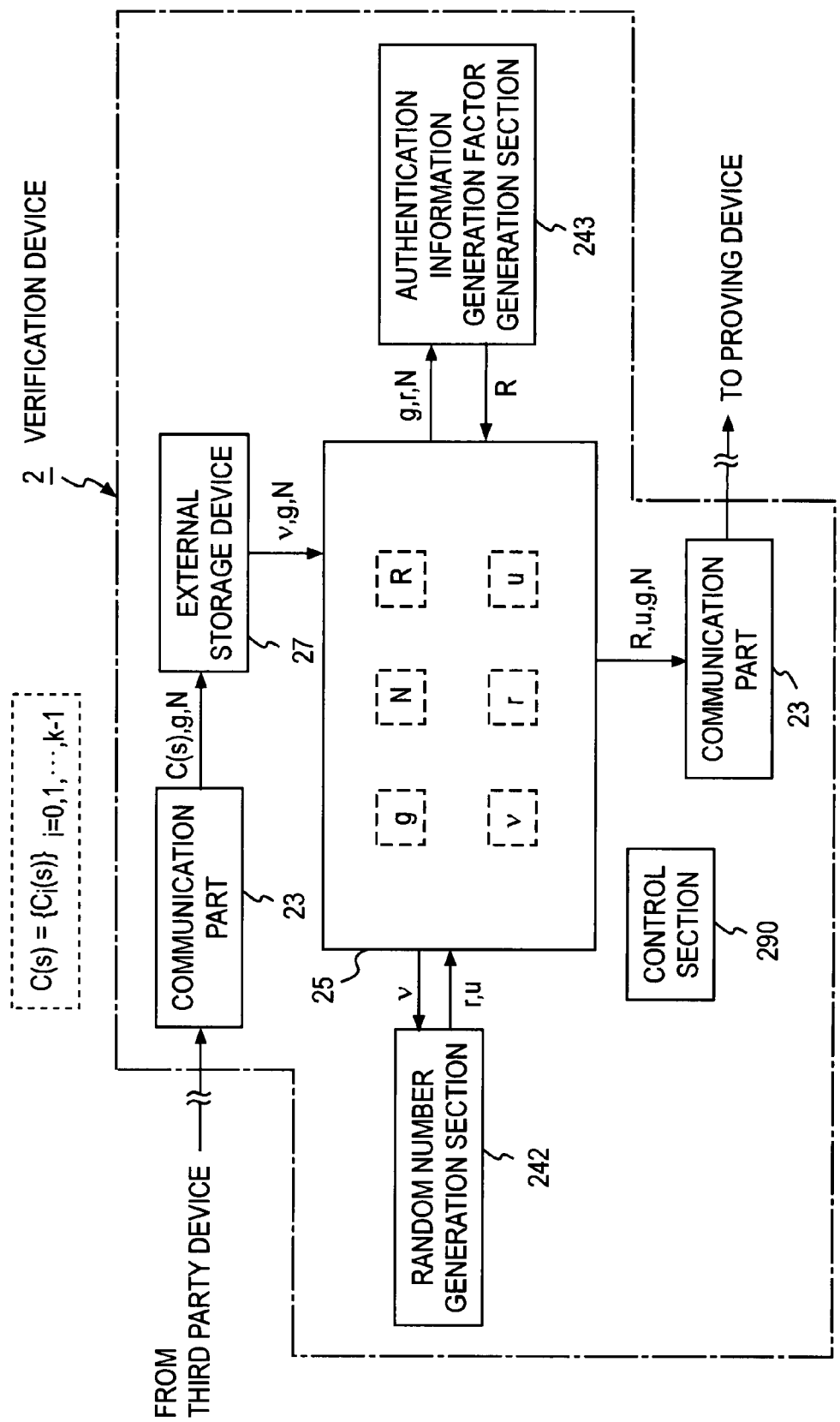
FIG. 16 is a functional block diagram (1) of a verification device (2) according to Third Embodiment.

According to the control of a control section (290) of the verification device (2), a communication part (23) receives N, g, and the verification information $C_i(s)=\{C_i(s)\}_{i=0, 1, 2, \ldots, k-1}$ which are transmitted in step S3a, and the communication part (23) stores N, g, and the verification information $C_i(s)$ in the external storage device (27) (step S3va) [see FIG. 16].

Steps S3 and S4 following step S3va are same as the processing of First Embodiment and thus the explanation thereof is omitted.

After step S4, a random number generation, section (242) of the verification device (2) reads v from the RAM (25) (these are read in the RAM (25) from the external storage device (27) beforehand), generates a random number u not more than v bits, and stores the random number u in a predetermined storage area of the RAM (25) (step S4a) [see FIG. 16]. A predetermined value may be stored as a value corresponding to the random number u in the external storage device (27) and read from the external storage device (27). In this case, the predetermined value corresponding to the random number u has to be concealed from the outside of the verification device (2) in view of safety.

In the processing of step S5' in Second Embodiment, the authentication information generation factor R, N and g are transmitted to the proving device (1), whereas in Third Embodiment, the random number u is transmitted to the proving device (1) in addition to the authentication information generation factor R, N and g (step S5a) [see FIG. 16].

Figure 17:
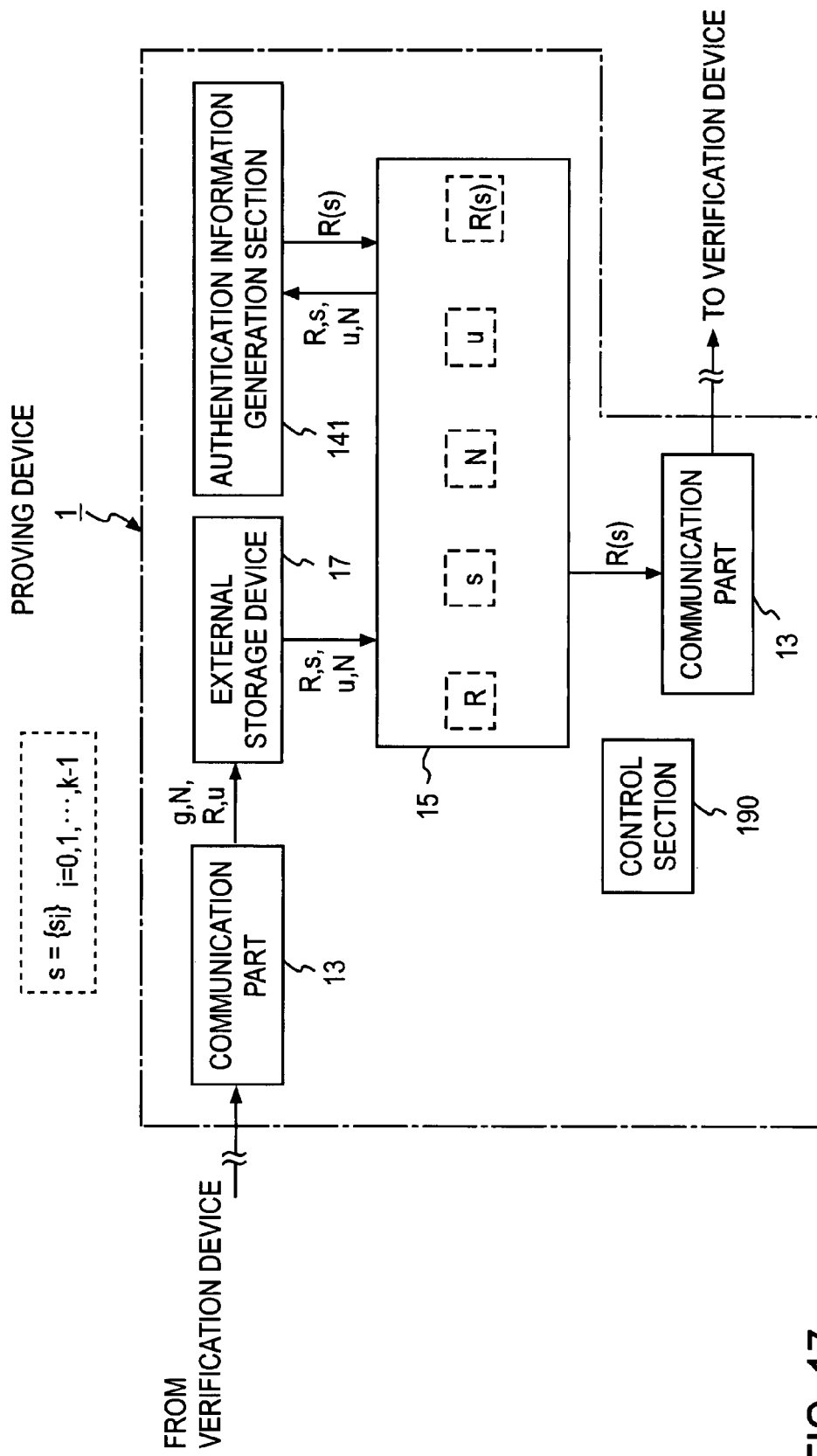
FIG. 17 is a functional block diagram of a proving device (1) according to Third Embodiment.

In the processing of step S6' in Second Embodiment, the proving device (1) receives the authentication information generation factor R, N and g from the verification device (2), whereas in Third Embodiment, the random number u is received from the verification device (2) in addition to the authentication information generation factor R, N and g (step S6a) [see FIG. 17].

In the processing of step S7 in First Embodiment (Second Embodiment), the authentication information R(s) is generated according to Formula (3), whereas in Third Embodiment, the following processing is performed: a verification information generation section (141) of the proving device (1) reads N, k pieces of divided information $s_0, s_1, \ldots, s_{k-1}$ [second divided information obtained by dividing the held information into a plurality of pieces], the authentication information generation factor R, and the random number u (these are read in the RAM (15) from an external storage device (17) beforehand) from the RAM (15), performs an operation according to Formula (6), and stores an arithmetic result R(s)[authentication information] in a predetermined storage area of the RAM (15) (step S7a) [see FIG. 17].

[Formula 6]

$$R(s) = R^{\sum_{i=0}^{k-1} s_i H(i,u,R)} \mod N \quad (6)$$

R(s) calculated by Formula (6) is an example of "a result of modular exponentiation whose exponent is a value obtained by summing, for all i, products of the second divided information $s_i$ and information H whose value is dependent upon i corresponding to the second divided information $s_i$ and some kind of information transmitted from the verification device, and whose base is the authentication information generation factor R, and whose modulus is N". In Formula (6), "some kind of information transmitted from the verification device (2)" is at least one of u and R and "information H" is the function value H (i,u,R) determined depending upon at least one of u and R and i. However, "some kind of information transmitted from the verification device (2)" may include information other than u and R transmitted from the verification device (2). Further, a table in which "some kind of information transmitted from the verification device (2)" and i match "information H" may be shared by the proving device (1) and the verification device (2), and the authentication information generation section (141) may determine "information H" by means of the table.

In this case, the bit length of the exponent of Formula (6) is considerably shorter than the overall bit length of the held information s, and the arithmetic cost of Formula (6) is about one k-th of that of Formula (3) of First Embodiment. Moreover, by properly selecting a parameter such as k, the arithmetic cost of the overall system is made lower than that of an authentication method using a publicly known message authentication code with a hash function such as SHA-1.

Steps S8 and S9 following step S7a are same as the processing of First Embodiment (Second Embodiment) and thus the explanation thereof is omitted.

Figure 18:
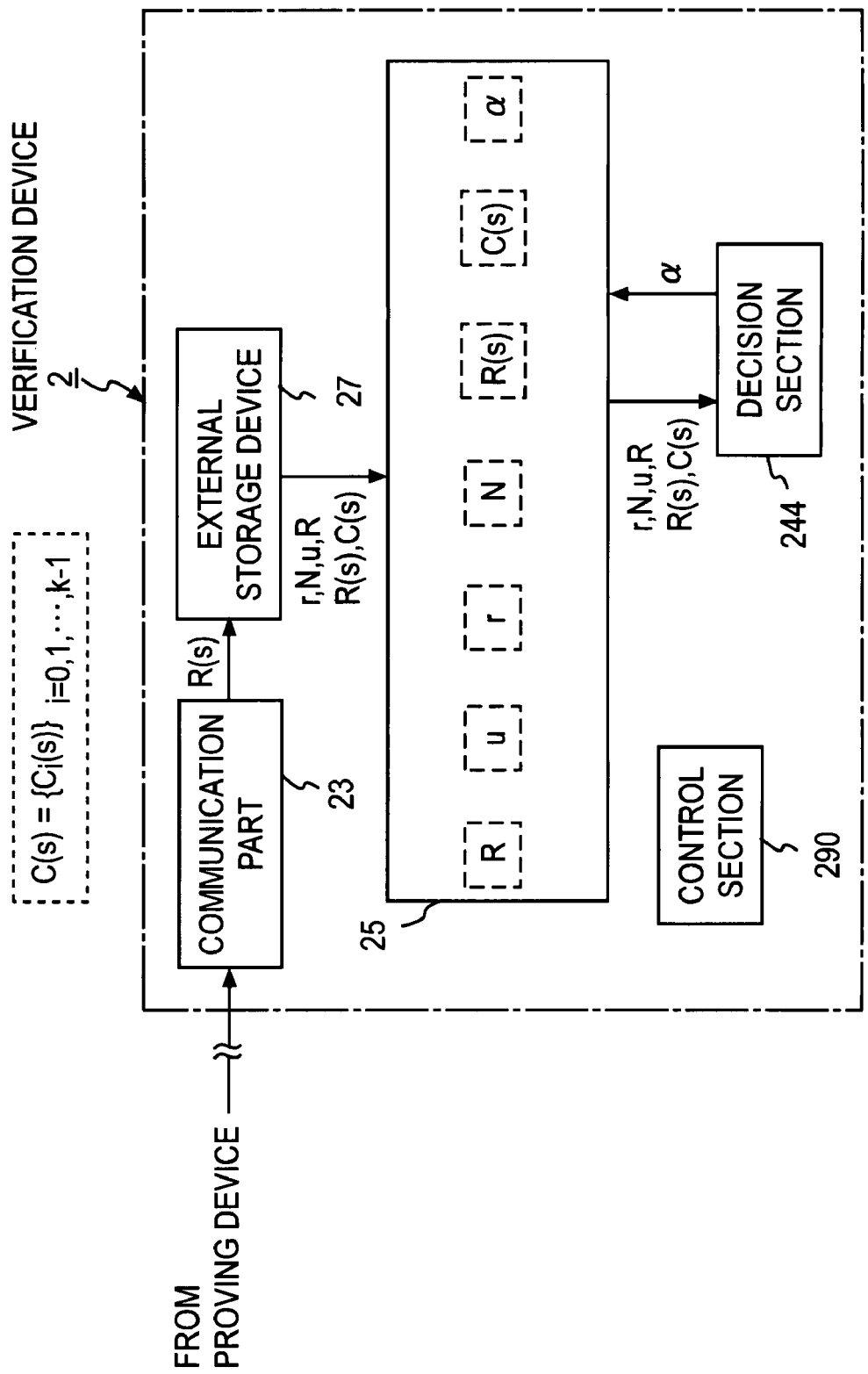
FIG. 18 is a functional block diagram (2) of the verification device (2) according to Third Embodiment.
Figure 19:
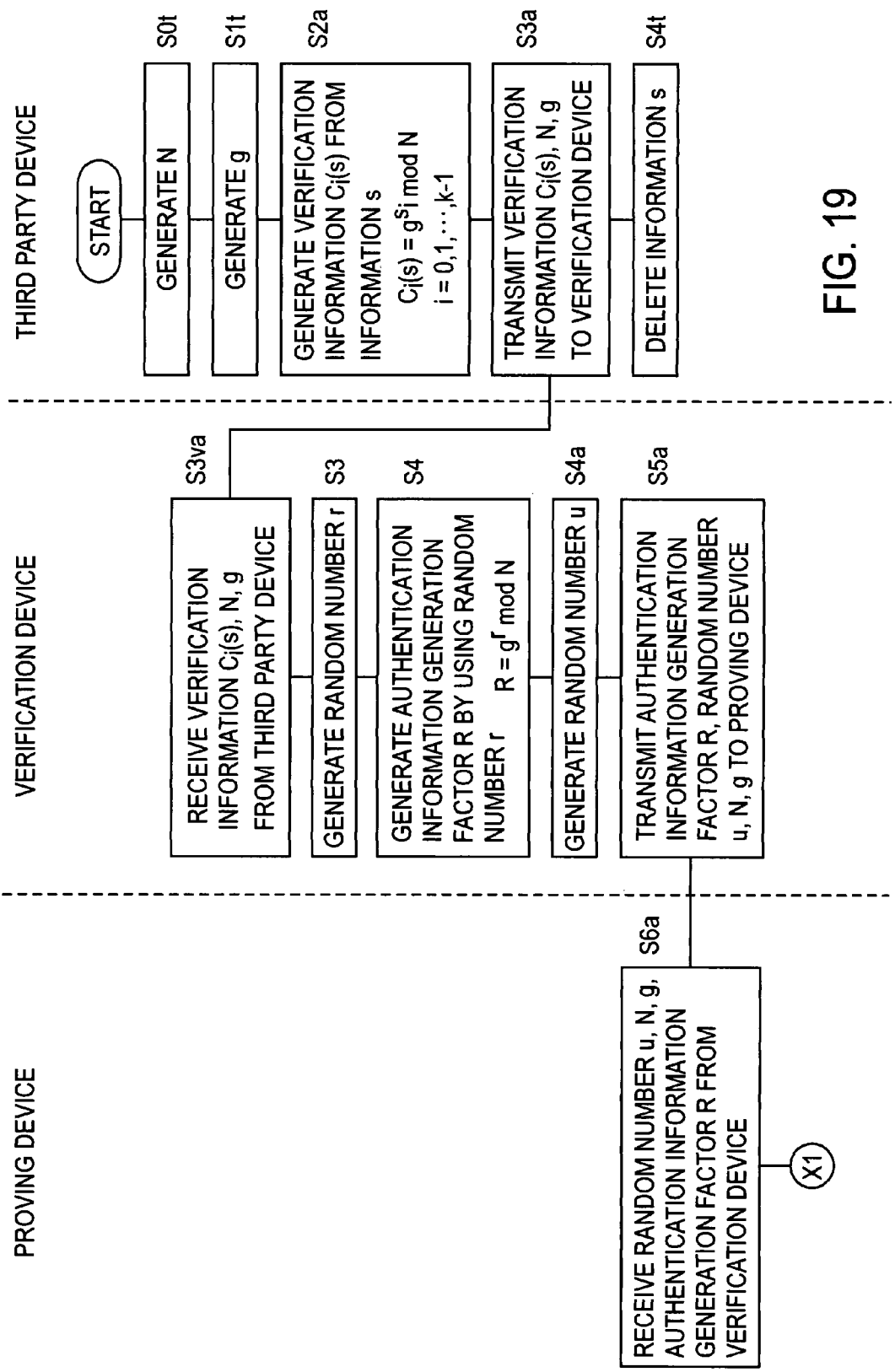
FIG. 19 shows a processing flow (1) of Third Embodiment.
Figure 20:
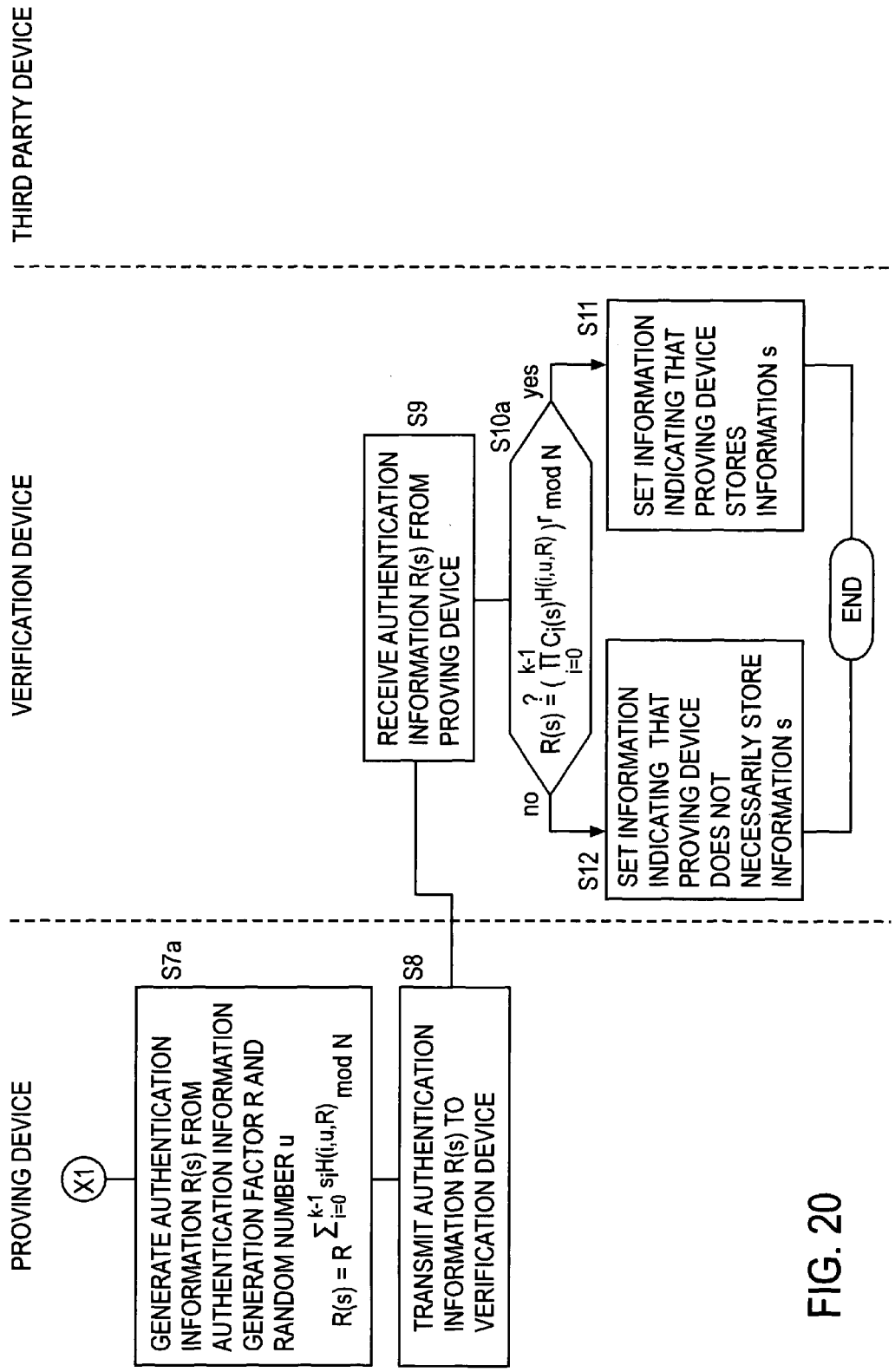
FIG. 20 shows a processing flow (2) of Third Embodiment.

In the processing of step S10 in First Embodiment (Second Embodiment), a decision is made according to Formula (4), whereas in Third Embodiment, the following decision is made: a decision section (244) of the verification device (2) reads N, the random number r, the random number u, the authentication information generation factor R, the authentication information R(s), and the verification information C(s) (these are read in the RAM (25) from the external storage device (27) beforehand) from the RAM (25) and the decision section (244) decides whether the relationship of Formula (7) is established or not (step S10a) [see FIG. 18].

[Formula 7]

$$R(s) = \left(\prod_{i=0}^{k-1} C_i(s)^{H(i,u,R)}\right)^r \mod N \quad (7)$$

The processing of steps S11 and S12 following step S10a is same as that of First Embodiment (Second Embodiment) and thus the explanation thereof is omitted.

Fourth Embodiment

Referring to FIGS. 21 to 29, Fourth Embodiment of the present invention will now be described below.

Fourth Embodiment will describe a technique for improving safety in First, Second and Third Embodiments. Although the technique for improving safety is applicable to all of First, Second and Third Embodiments. However, for convenience of explanation, the technique for improving safety is applied to Third Embodiment in an example of Fourth Embodiment.

In First, Second and Third Embodiments, the verification device for transmitting an authentication information generation factor R is regarded as a reliable verification device. However, as described above, it is not deniable that the verification device may generate the authentication information generation factor R according to an unauthorized method or an attacker's device masquerading as the verification device may enter the system of the present invention. To address such a case, the proving device authenticates, by interactive proof, that the verification device directly communicating with the proving device has certainly generated the authentication information generation factor R based on predetermined processing. Fourth Embodiment will describe an example in which the verification device is authorized using zero-knowledge interactive proof regarding a random number r. Various configuration methods of the zero-knowledge proof are publicly known. The configuration illustrated in Fourth Embodiment is an example of zero-knowledge interactive proof. For example, instead of the configuration of zero-knowledge proof described in Fourth Embodiment, zero-knowledge proof can be configured using scalar multiplication on an elliptic curve.

In view of safety, it is desirable to use interactive proof in which zero knowledge is mathematically proved. This is because the interactive proof can secure safety concealing the random number r from an attacker who wants to pick up the contents of the random number r. In this case, "the zero knowledge of interactive proof for proving to the verification device that the proving device stores r is mathematically proved", so that it is proved that when a given proving device makes a response according to the standards of the interactive proof and the verification device decides that the proving device is acceptable, the verified device can be modified to make up a device for outputting r (for example, see "O. Goldreich Foundations of Cryptography, volume I. Cambridge University Press, 2001" and so on). In the case of such interactive proof, only a person who knows r can make a reply according to the standards. Such a characteristic of interactive proof is called knowledge soundness.

As described above, in view of safety, it is desirable that knowledge be proved by zero-knowledge proof. For the sake of efficiency, means having zero knowledge not completely mathematically proved at the present time, for example, $\hat{c}$ (describe later) can be replaced with bit commitment using a hash function.

In Fourth Embodiment, the same functions and processing as those of Third Embodiment are indicated by the same reference numerals and the explanation thereof is omitted.

[Proving Device]

An external storage device (17) [or a ROM and the like] of a proving device (1) according to Fourth Embodiment stores a program for generating authentication information, a program for generating $\hat{c}$ (described later), a program for authenticating, by interactive proof, that an authentication information generation factor is correctly generated in a verification device, and data and the like (information s and so on) required for the processing of these programs. Additionally, a control program for controlling processing based on these programs is also stored in the external storage device (17) and so on.

In the proving device (1) of Fourth Embodiment, the programs stored in the external storage device (17) [or the ROM and the like] and data required for the processing of the programs are read in a RAM (15) as needed. A CPU (14) executes these programs and processes the data. As a result, the CPU (14) realizes predetermined functions (a $\hat{c}$ generation section, an authentication decision section, an authentication information generation section, and a control section).

[Verification Device]

An external storage device (27) [or a ROM and the like] of a verification device (2) according to Fourth Embodiment stores a program for generating authentication information generation factor, a program for generating random numbers, a program for generating W and z (described later), a program for proving, by interactive proof, that the authentication information generation factor is correctly generated in the verification device, a program for deciding whether information received from the proving device matches information stored in the verification device, and data and the like required for the processing of these programs. Additionally, a control program for controlling processing based on these programs is also stored in the external storage device (27) and so on.

In the verification device (2), the programs stored in the external storage device (27) [or the ROM and the like] and data required for the processing of the programs are read in a RAM (25) as needed. A CPU (24) executes these programs and processes the data. As a result, the CPU (24) realizes predetermined functions (an authentication information generation factor generation section, a random number generation section, a W generation section, a z generation section, an interaction decision section, a decision section, and a control section).

[Third Party Device]

The third party device (3) of Fourth Embodiment is same as that of Second Embodiment and thus the explanation thereof is omitted.

[Preparation]

t is set at a predetermined natural number (smaller than N). It is assumed that t is stored in the external storage device (17) of the proving device (1) and the external storage device (27) of the verification device (2). Further, a function H (i,u,R) same as that of Third Embodiment is determined in advance. For example, $H(i,u,R)=u^i$ may be set or a hash function such as SHA-1 may be used.

[Authentication]

Interactive proof in Fourth Embodiment is performed between the processing of step S6a and the processing of step S7a which are described in Third Embodiment.

Thus the explanation of steps S0t to S6a and steps S7a to S12 is omitted and the processing of interactive proof will be described below.

First, after the processing of step S6a, a control section (190) of the proving device (1) reads g, t and N from the external storage device (17) and stores them in predetermined storage areas of the RAM (15).

Figure 21:
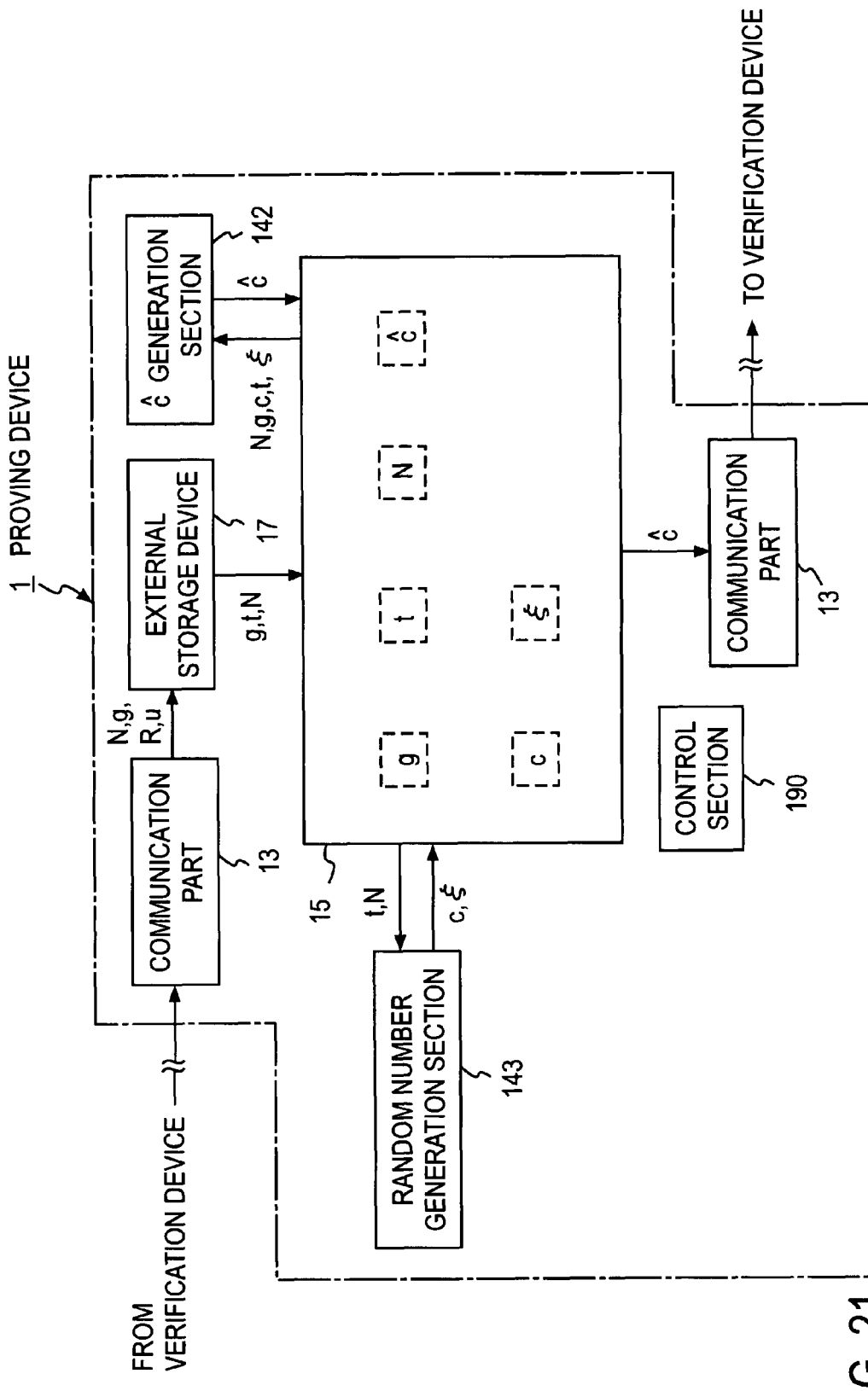
FIG. 21 is a functional block diagram (1) of a proving device (1) according to Fourth Embodiment.

A random number generation section (143) of the proving device (1) reads t from the RAM (15), generates a random number c which is not smaller than 0 and smaller than t, and a random number $\xi$ which is coprime to N, not smaller than 0 and smaller than N, stores the random number c and the random number $\xi$ in predetermined storage areas of the RAM (15) (step S611) [see FIG. 21]. Moreover, the random number c which is not smaller than 0 and not larger than $2^t-1$ may be generated.

Next, a ĉ generation section (142) of the proving device (1) reads N, g, t, the random number c, and the random number $\xi$ from the RAM (15), performs an operation according to Formula (8), and stores an arithmetic result ĉ in a predetermined storage area of the RAM (15) (step S612) [see FIG. 21].

[Formula 8]

$$\hat{c} = g^c \xi^t \bmod N \qquad (8)$$

After that, according to the control of the control section (190) of the proving device (1), a communication part (13) transmits, to the verification device (2), ĉ which is read from the RAM (15) (obtained in step S612) (step S613) [see FIG. 21].

The random number c and the random number $\xi$ which are obtained in step S611 are stored in the external storage device (17) under the control of the control section (190) of the proving device (1).

Figure 22:
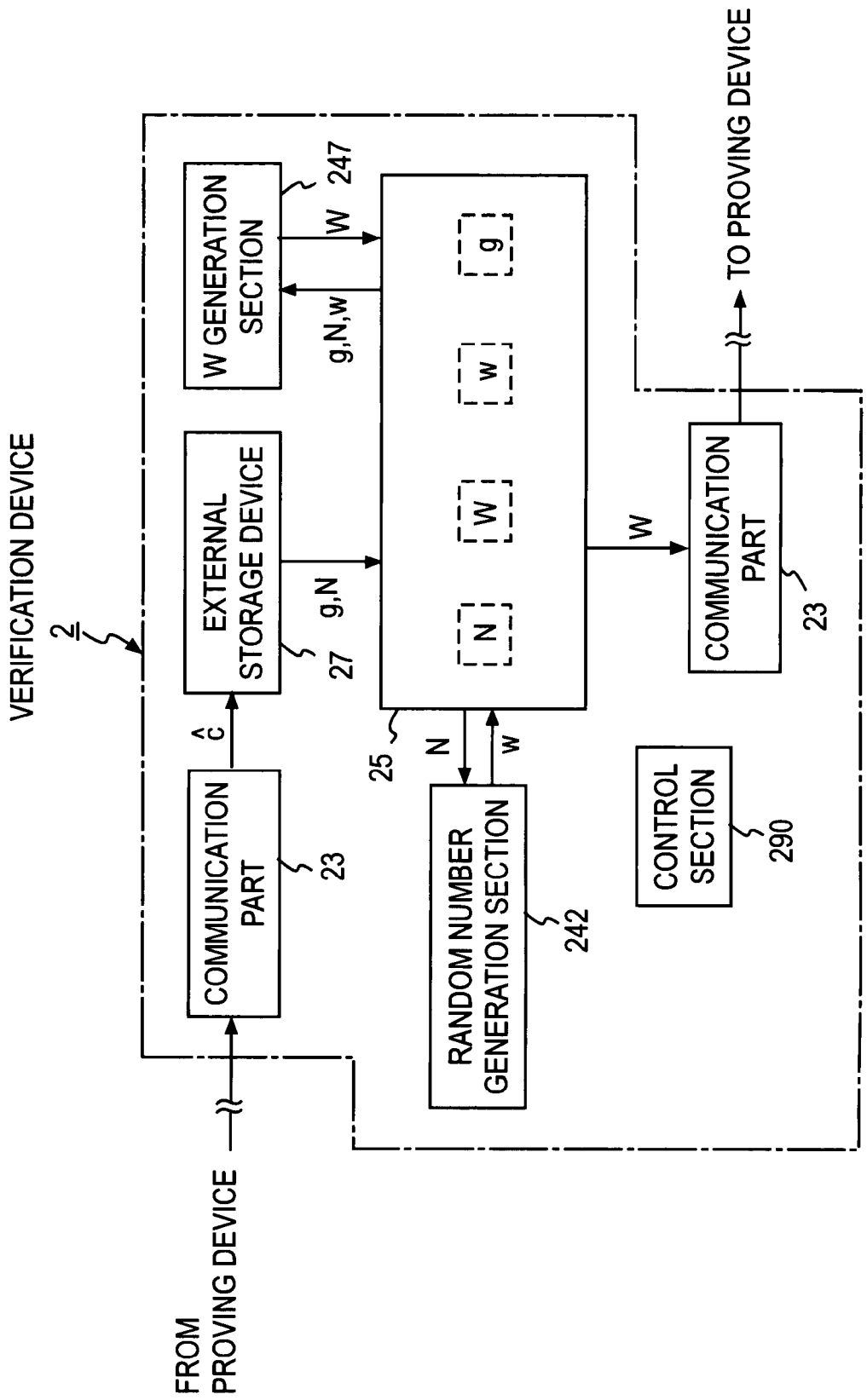
FIG. 22 is a functional block diagram (1) of a verification device (2) according to Fourth Embodiment.

Next, according to the control of a control section (290) of the verification device (2), a communication part (23) receives ĉ transmitted in step S613 and stores ĉ in the external storage device (27) (step S614) [see FIG. 22].

After that, the control section (290) of the verification device (2) reads N and g from the external storage device (27) and stores N and g in the respective predetermined storage areas of the RAM (25) [see FIG. 22].

Next, a random number generation section (242) of the verification device (2) reads N from the RAM (25), generates a random number w not smaller than 0 and smaller than N, and stores the random number w in a predetermined storage area of the RAM (25) (step S615) [see FIG. 22]. The random number w not smaller than 0 and not larger than $N \cdot 2^{3t}-1$ may be generated. As will be describe later, the verification device (2) transmits $z=c \cdot r+w$ to the proving device (1) (step S623). When the random number w not smaller than 0 and not larger than $N \cdot 2^{3t}-1$ is selected, whichever method is used for providing c and r, it can be proved that the distribution of $z=c \cdot r+w$ and the distribution of a random number w' generated in this range are indistinguishable. In other words, when w is selected from this range, it is sufficiently difficult for an attacker to estimate r from $z=c \cdot r+w$, securing the safety of a protocol.

Next, a W generation section (247) of the verification device (2) reads N, g, and the random number w from the RAM (25), performs an operation according to Formula (9), and stores an arithmetic result W in a predetermined storage area of the RAM (25) (step S616) [see FIG. 22].

[Formula 9]

$$W = g^w \bmod N \qquad (9)$$

After that, according to the control of the control section (290) of the verification device (2), the communication part (23) transmits, to the proving device (1), W which is obtained in step S616 and read from the RAM (25) (step S617) [see FIG. 22].

The random number w obtained in step S615 is stored in the external storage device (27) under the control of the control section (290) of the verification device (2).

Figure 23:
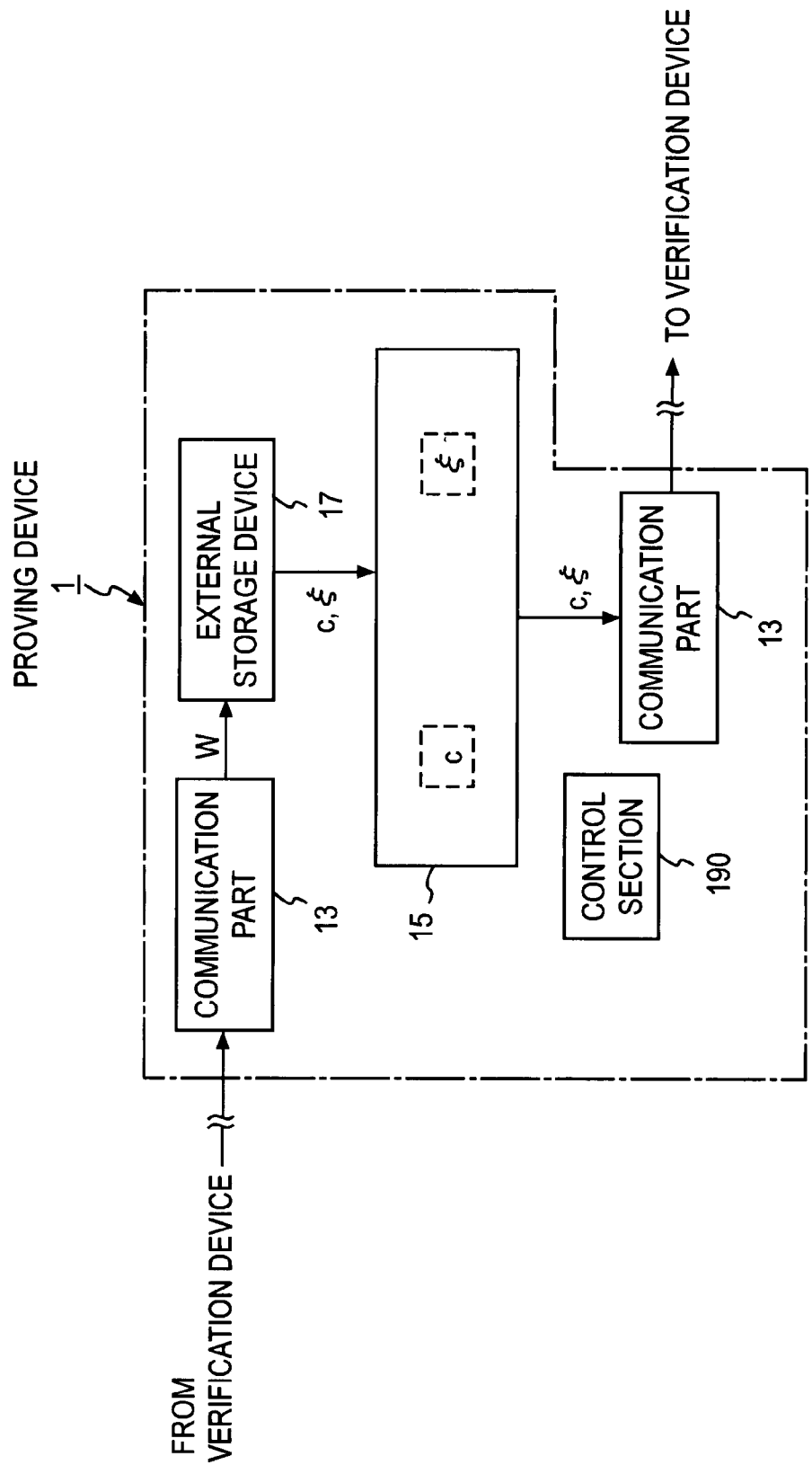
FIG. 23 is a functional block diagram (2) of the proving device (1) according to Fourth Embodiment.

Next, according to the control of the control section (190) of the proving device (1), a communication part (13) receives W transmitted in step S617 and stores W in the external storage device (17) (step S618) [see FIG. 23].

After that, the control section (190) of the proving device (1) reads the random number c and the random number $\xi$ from the external storage device (17) and stores the random numbers in the respective predetermined storage areas of the RAM (15). Next, according to the control of the control section (190) of the proving device (1), the communication part (13) transmits, to the verification device (2), the random number c and the random number $\xi$ which are read from the RAM (15) (step S619) [see FIG. 23].

Figure 24:
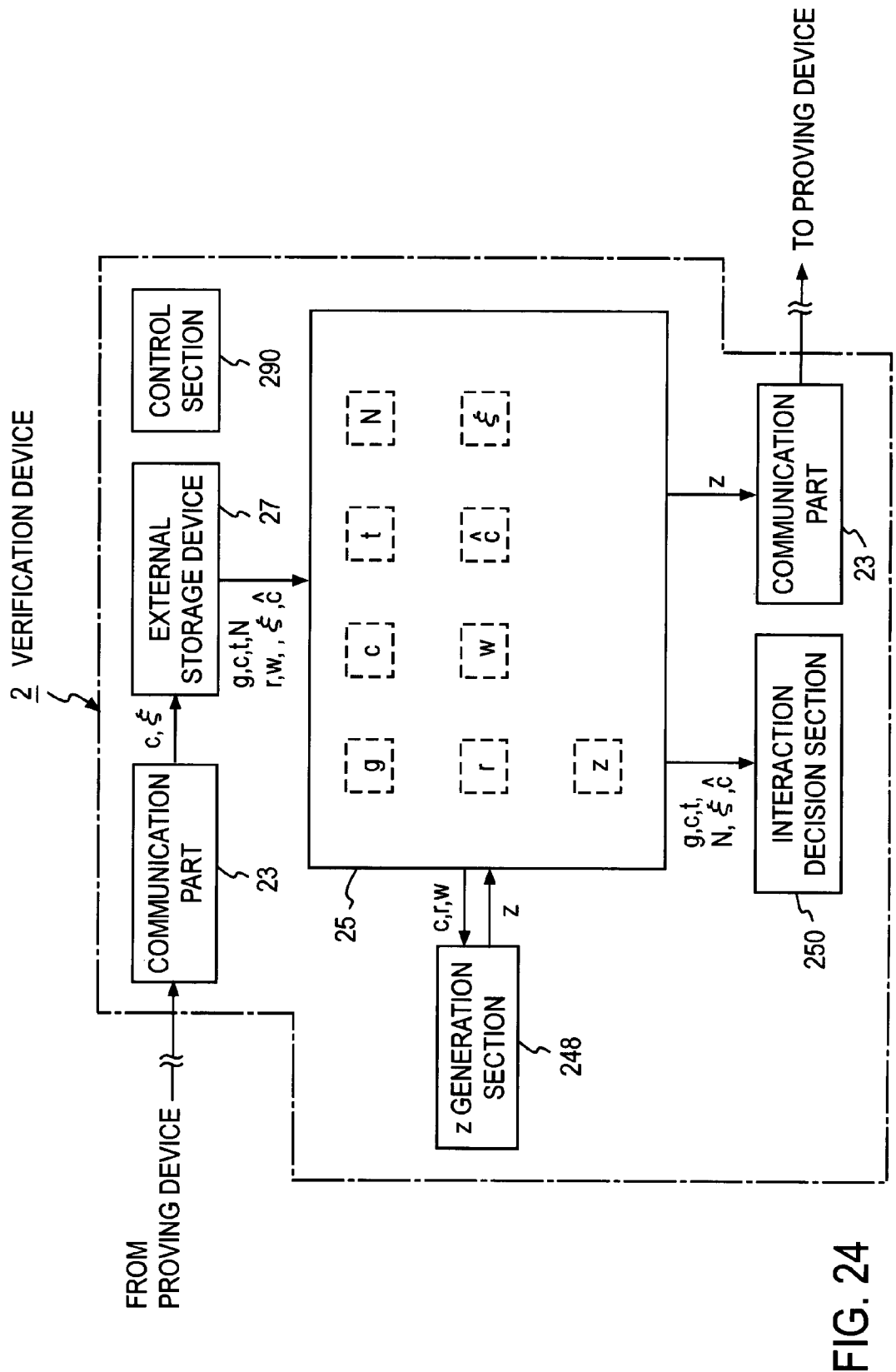
FIG. 24 is a functional block diagram (2) of the verification device (2) according to Fourth Embodiment.

After that, according to the control of the control section (290) of the verification device (2), the communication part (23) receives the random number c and the random number $\xi$ which are transmitted in step S619 and stores the random number c and the random number $\xi$ in the external storage device (27) (step S620) [see FIG. 24].

Next, the control section (290) of the verification device (2) reads the random number c, the random number $\xi$, g, t, N, the random number r, the random number w, and ĉ from the external storage device (27) and stores them in the respective predetermined storage areas of the RAM (25) [see FIG. 24].

After that, an interaction decision section (250) of the verification device (2) reads g, c, t, N, the random number $\xi$, and ĉ from the RAM (25) and decides whether the relationship expressed by Formula (8) is established or not (step S621) [see FIG. 24]. When the interaction decision section (250) decides that the relationship is not established, the process is completed under the control of the control section (290) of the verification device (2) without performing the subsequent processing (step S622). When the interaction decision section (250) decides that the relationship is established, the subsequent step S623 is performed under the control of the control section (290) of the verification device (2).

Next, a z generation section (248) of the verification device (2) reads the random number c, the random number r, and the random number w from the RAM (25), performs an operation according to Formula (10), and stores an arithmetic result z in a predetermined storage area of the RAM (25) (step S623) [see FIG. 24].

[Formula 10]

$$z = cr + w \qquad (10)$$

After that, according to the control of the control section (290) of the verification device (2), the communication part (23) transmits, to the proving device (1), z which is obtained in step S623 and read from the RAM (25) (step S624) [see FIG. 24].

Figure 25:
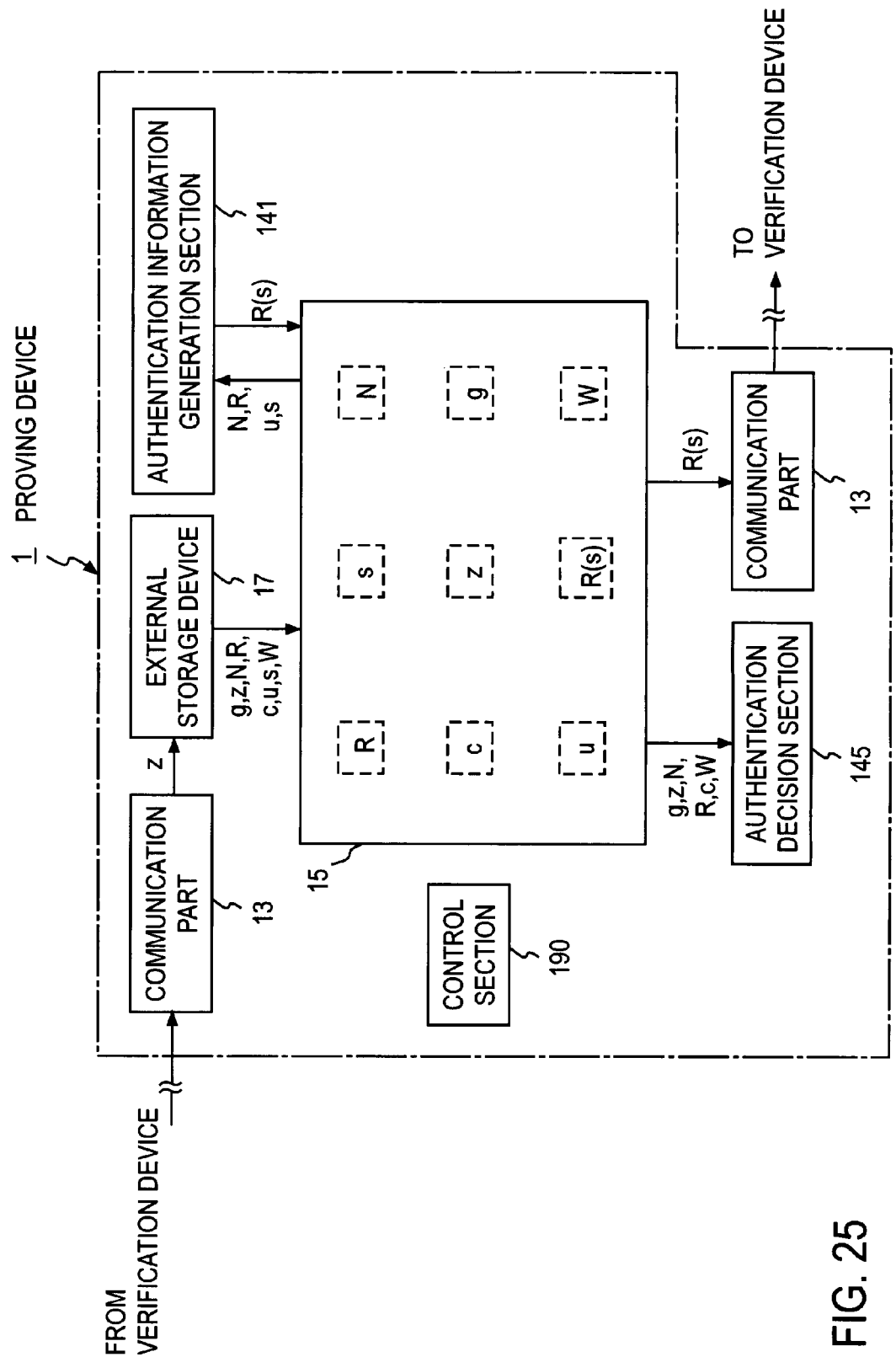
FIG. 25 is a functional block diagram (3) of the proving device (1) according to Fourth Embodiment.
Figure 26:
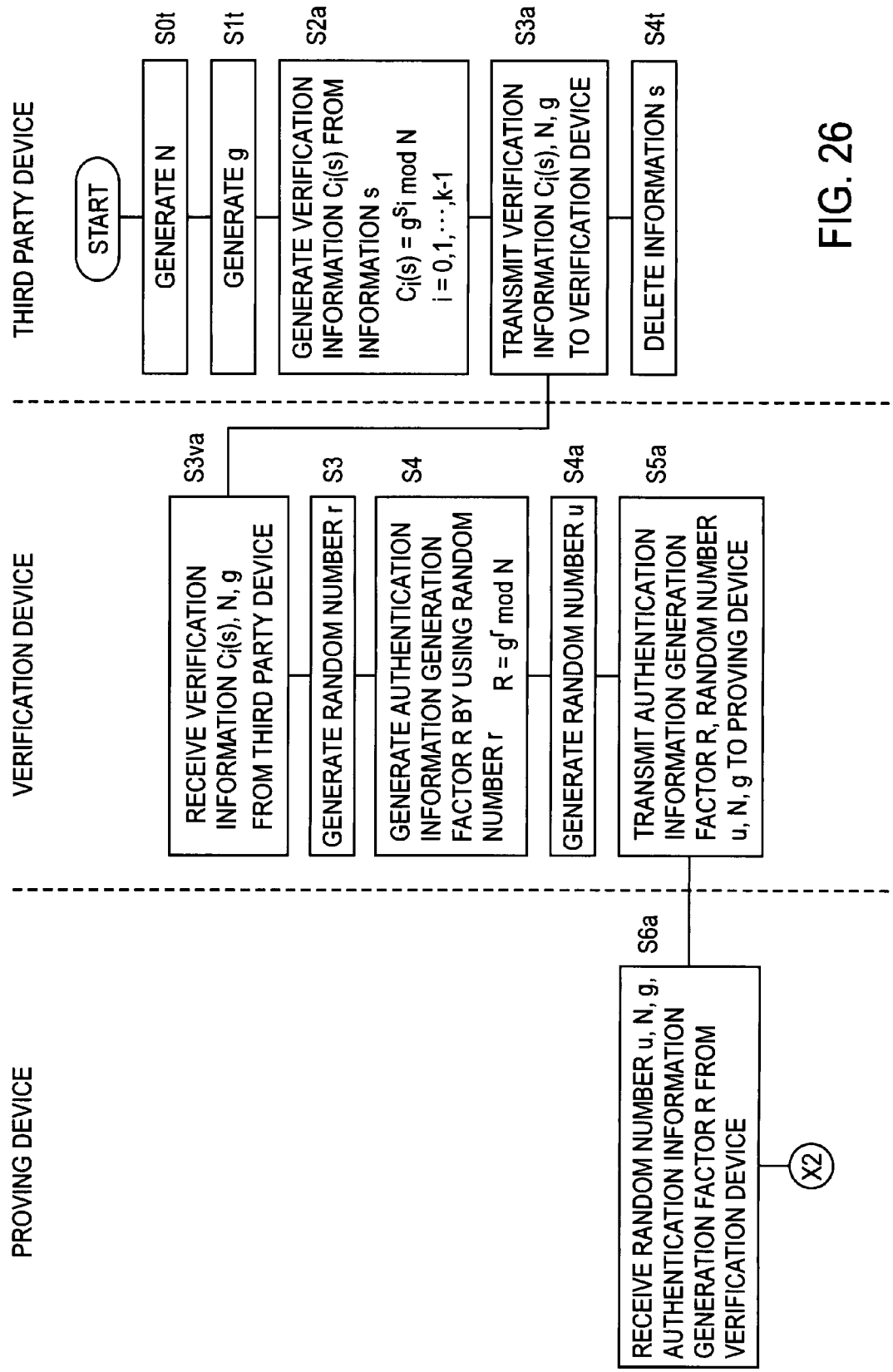
FIG. 26 shows a processing flow (1) of Fourth Embodiment.
Figure 27:
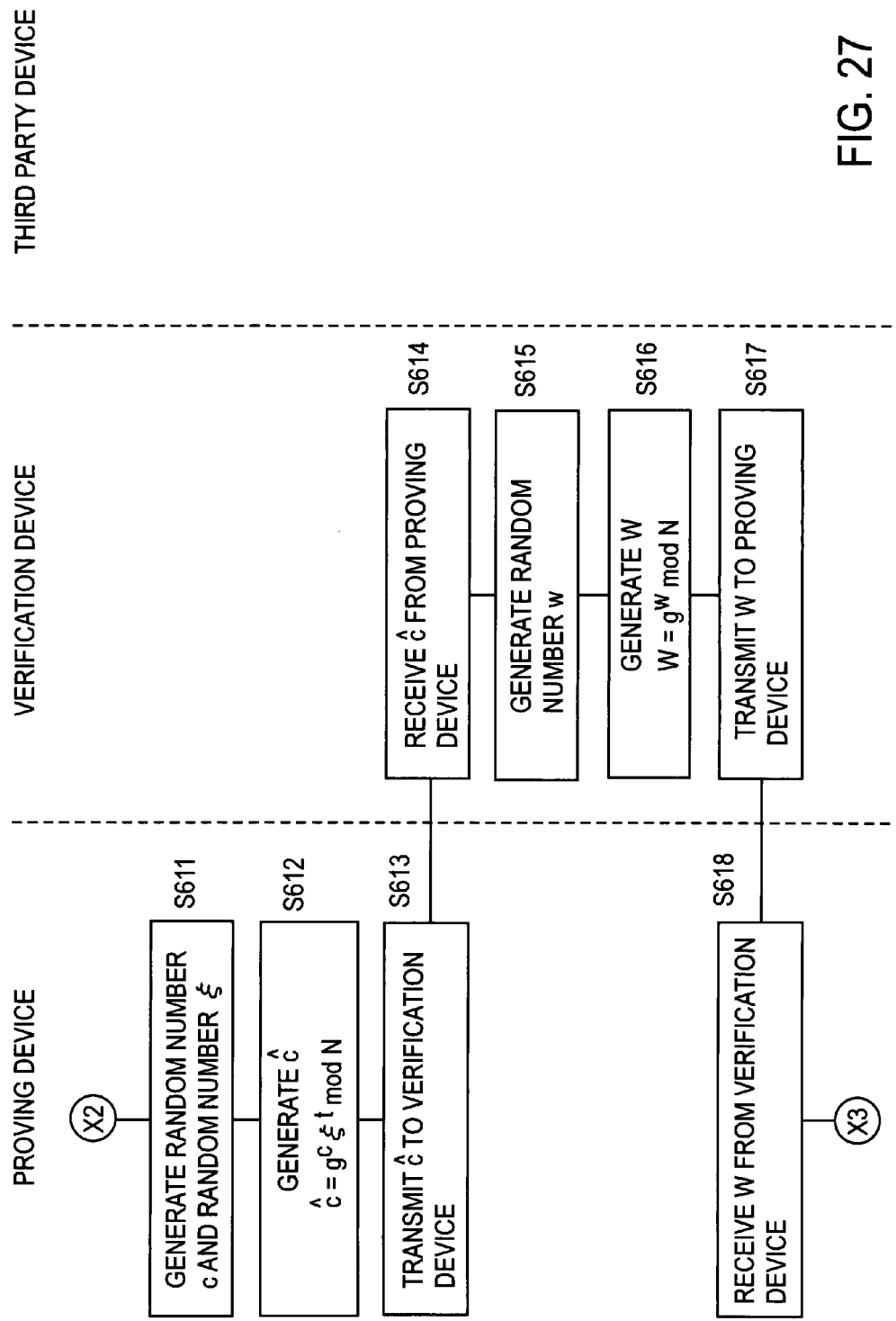
FIG. 27 shows a processing flow (2) of Fourth Embodiment.
Figure 28:
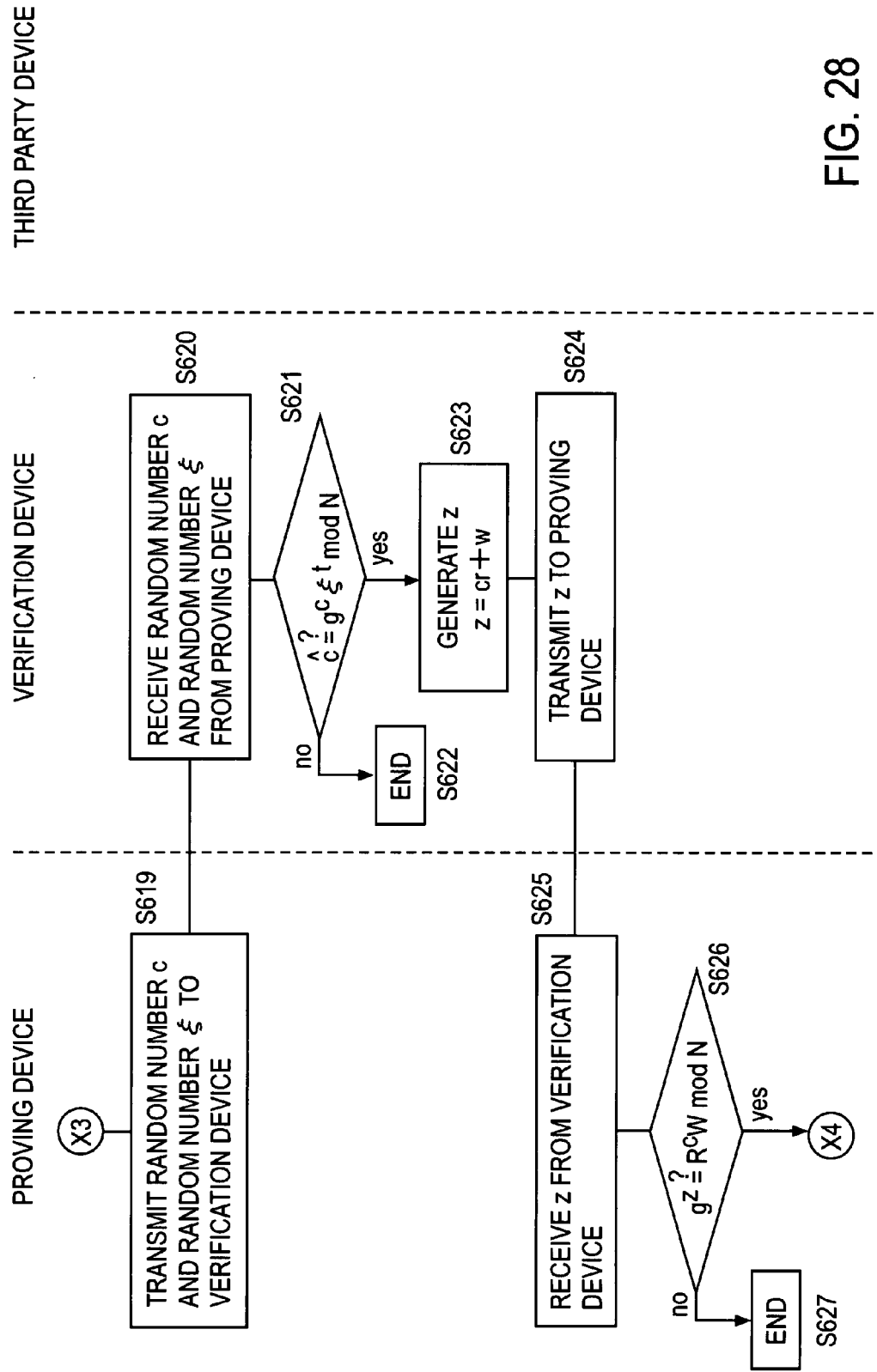
FIG. 28 shows a processing flow (3) of Fourth Embodiment.
Figure 29:
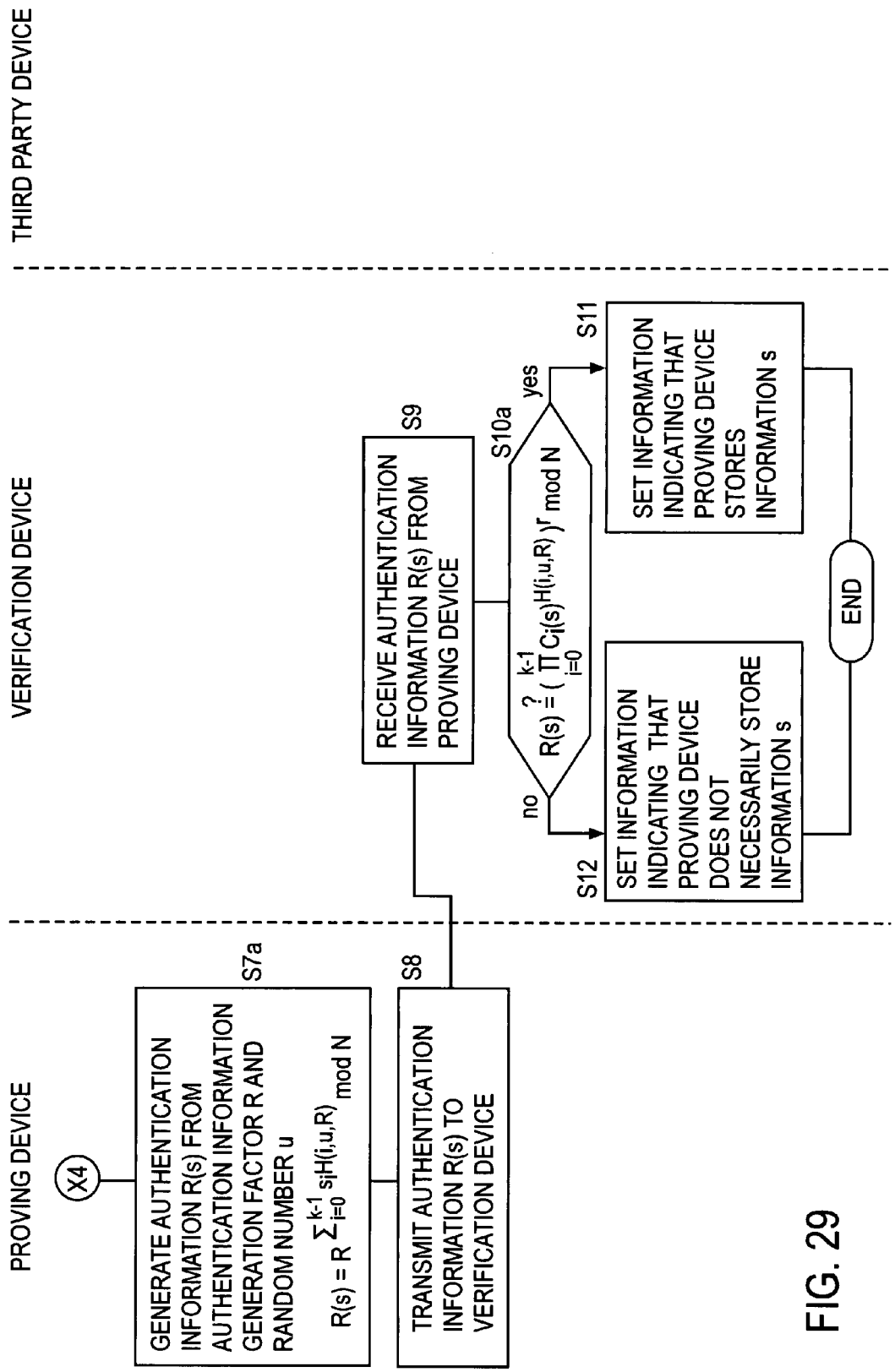
FIG. 29 shows a processing flow (4) of Fourth Embodiment.
Figure 30:
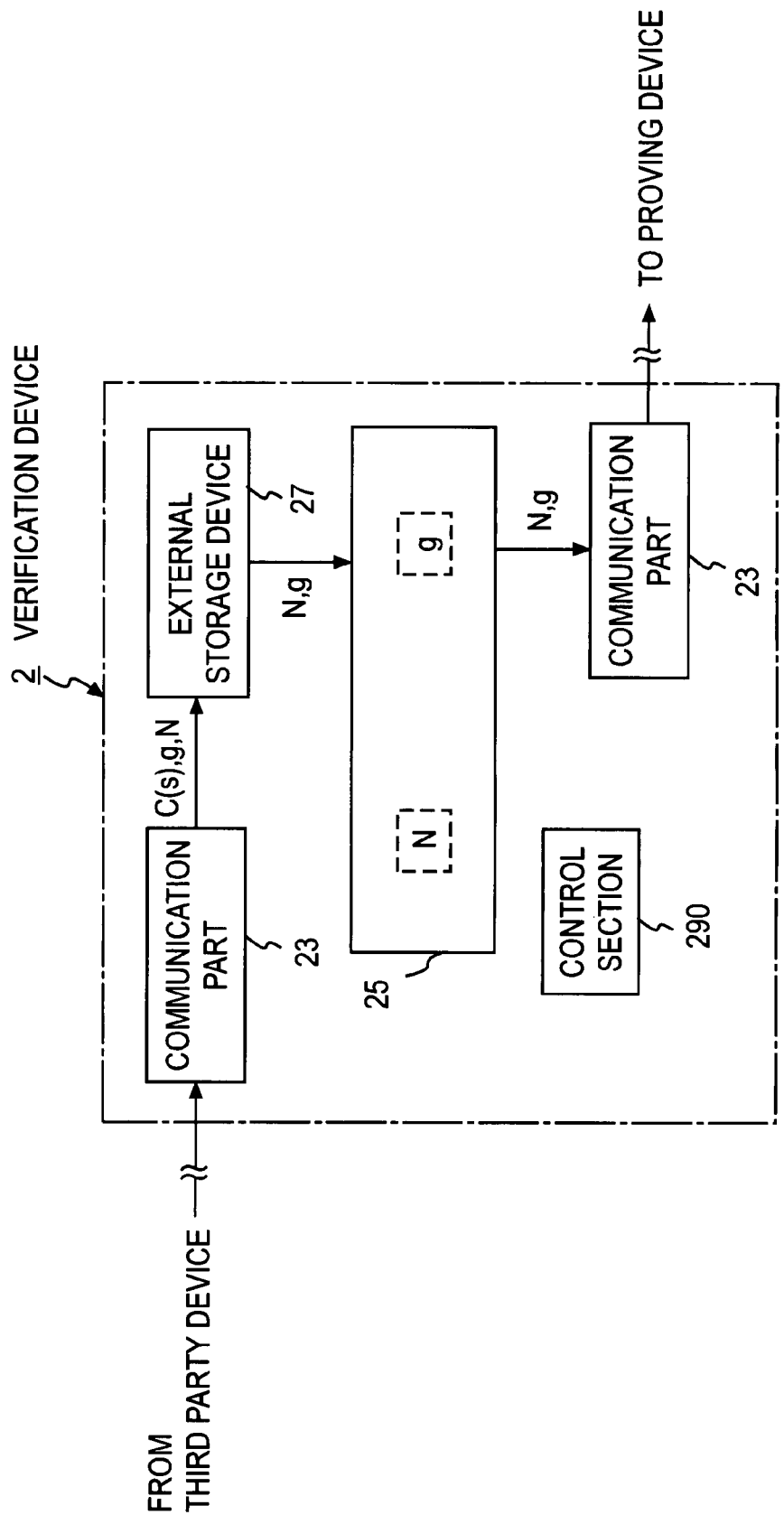
FIG. 30 is a functional block diagram (1) of a verification device (2) according to Fifth Embodiment.

Next, according to the control of the control section (190) of the proving device (1), the communication part (13) receives z transmitted in step S624 and stores z in the external storage device (17) (step S625) [see FIG. 25].

After that, the control section (190) of the proving device (1) reads g, N, the authentication information generation factor R, z, the random number c, the random number u, the information s, and W from the external storage device (17)

and stores them in the respective predetermined storage areas of the RAM (15) [see FIG. 25].

Next, an authentication decision section (145) of the proving device (1) reads g, z, N, the random number c, W, and the authentication information generation factor R from the RAM (15) and decides whether the relationship expressed by Formula (11) is established or not (step S626) [see FIG. 25]. When the authentication decision section (145) decides that the relationship is not established, the process is completed under the control of the control section (190) of the proving device (1) without performing the subsequent processing (step S627). When the authentication decision section (145) decides that the relationship is established, the subsequent step S7a is performed under the control of the control section (190) of the proving device (1). Processing in and after step S7a is same as that of Second Embodiment.

[Formula 11]

$$g^z = R^c W \bmod N \tag{11}$$

A section for performing the processing of steps S611, S612, S618, S619, S625, and S626 corresponds to an "interactive proof section". Further, a section for performing the processing of steps S614 to S617 and steps S620 to S624 corresponds to an "interactive verification section".

Fifth Embodiment

Referring to FIGS. 30 to 37, Fifth Embodiment of the present invention will now be described below.

In Fifth Embodiment, an interactive proof method peculiar to the present invention is used to improve safety in First Embodiment and Second Embodiment. For convenience of explanation, the interactive proof method peculiar to the present invention is applied to Second Embodiment in the following explanation.

In Fifth Embodiment, the same functions and processing as those of Second Embodiment and Fourth Embodiment are indicated by the same reference numerals and the explanation thereof is omitted.

[Proving Device]

An external storage device (17) [or a ROM and the like] of a proving device (1) according to Fifth Embodiment stores a program for generating authentication information, a program for generating A (described later), a program for generating random numbers, a program for deciding whether or not a verification device generates an authentication information generation factor by correctly using first random information, and data and the like (information s and so on) required for the processing of these programs. Additionally, a control program for controlling processing based on these programs is also stored in the external storage device (17) and so on.

In the proving device (1), the programs stored in the external storage device (17) [or the ROM and the like] and data required for the processing of the programs are read in a RAM (15) as needed. A CPU (14) executes the programs and processes the data. As a result, the CPU (14) realizes predetermined functions (an A generation section, a random number section, a first decision section, an authentication information generation section, and a control section).

[Verification Device]

An external storage device (27) [or a ROM and the like] of a verification device (2) according to Fifth Embodiment stores a program for generating an authentication information generation factor, a program for generating random numbers, a program for generating B (described later), a program for deciding whether the proving device has correctly generated A, a program for deciding whether information received from the proving device matches information stored in the verification device, and data and the like required for the processing of these programs. Additionally, a control program for controlling processing based on these programs is also stored in the external storage device (27) and so on.

In the verification device (2), the programs stored in the external storage device (27) [or the ROM and the like] and data required for the processing of the programs are read in the RAM (25) as needed. A CPU (24) executes the programs and processes the data. As a result, the CPU (24) realizes predetermined functions (an authentication information generation factor generation section, a B generation section, a random number generation section, a second decision section, a decision section, and a control section).

[Third Party Device]

A third party device (3) of Fifth Embodiment is same as that of Second Embodiment and thus the explanation thereof is omitted.

[Preparation]

v is set at a predetermined natural number. It is assumed that v is stored in the external storage device (17) of the proving device (1) and the external storage device (27) of the verification device (2).

[Authentication]

The processing of steps S0t to S3v is same as that of Second Embodiment and thus the explanation thereof is omitted.

After step S3v, the following processing is sequentially performed.

First, a control section (290) of the verification device (2) reads N and g from the external storage device (27) and stores N and g in the respective predetermined storage areas of the RAM (25). Next, according to the control of the control section (290) of the verification device (2), a communication part (23) transmits, to the proving device (1), N and g which are read from the RAM (25) (step S700) [see FIG. 30].

Figure 31:
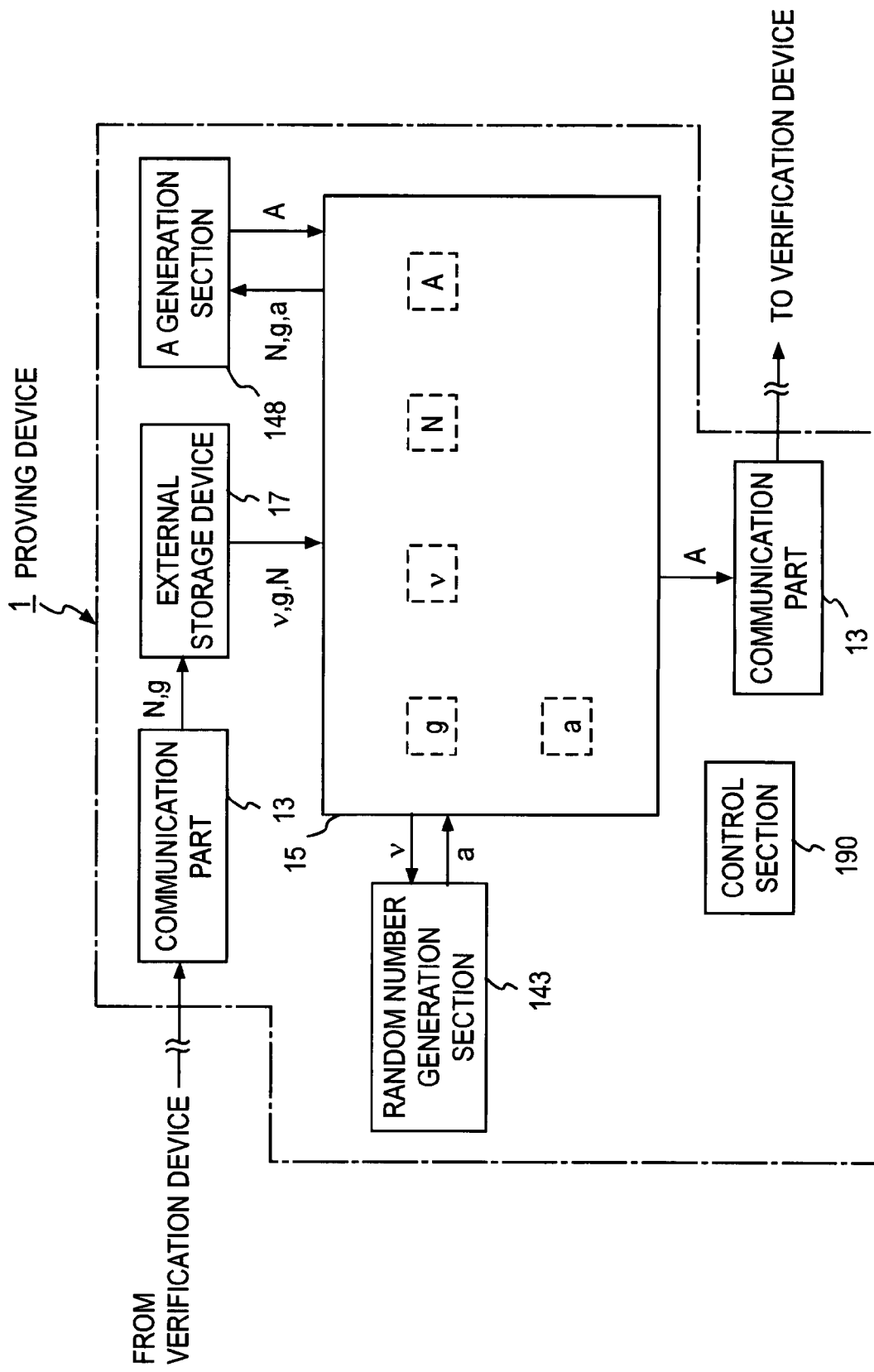
FIG. 31 is a functional block diagram (1) of a proving device (1) according to Fifth Embodiment.

After that, according to the control of a control section (190) of the proving device (1), a communication part (13) receives N and g transmitted in step S700 and stores N and g in the external storage device (17) (step S701) [see FIG. 31].

After that, the control section (190) of the proving device (1) reads N, g and v from the external storage device (17) and stores N, g, and v in respective predetermined storage areas of the RAM (15) [see FIG. 31].

Next, a random number generation section (143) of the proving device (1) reads v from the RAM (15), generates a random number a not more than $2^{2v}$, and stores the random number a in a predetermined storage area of the RAM (15) (step S702) [see FIG. 31]. The random number generation section (143) may generate the random number a from the range of $0 \leq a \leq N \cdot 2^v - 1$. This is because, as described above, the configuration for selecting the random number a from this range is desirable in view of compatibility of safety and arithmetic cost. Further, a does not always have to be a random number as long as the value can be selected at random.

Next, an A generation section (148) of the proving device (1) reads N, g, and the random number a from the RAM (15), performs an operation according to Formula (12), and stores an arithmetic result A in a predetermined storage area of the RAM (15) (step S703) [see FIG. 31].

[Formula 12]

$$A = g^a \bmod N \tag{12}$$

After that, according to the control of the control section (190) of the proving device (1), the communication part (13)

transmits, to the verification device (2), A which is obtained in step S703 and read from the RAM (15) (step S704) [see FIG. 31].

The random number a and A which are obtained in steps S703 and S704 are stored in the external storage device (17) under the control of the control section (190) of the proving device (1).

Figure 32:
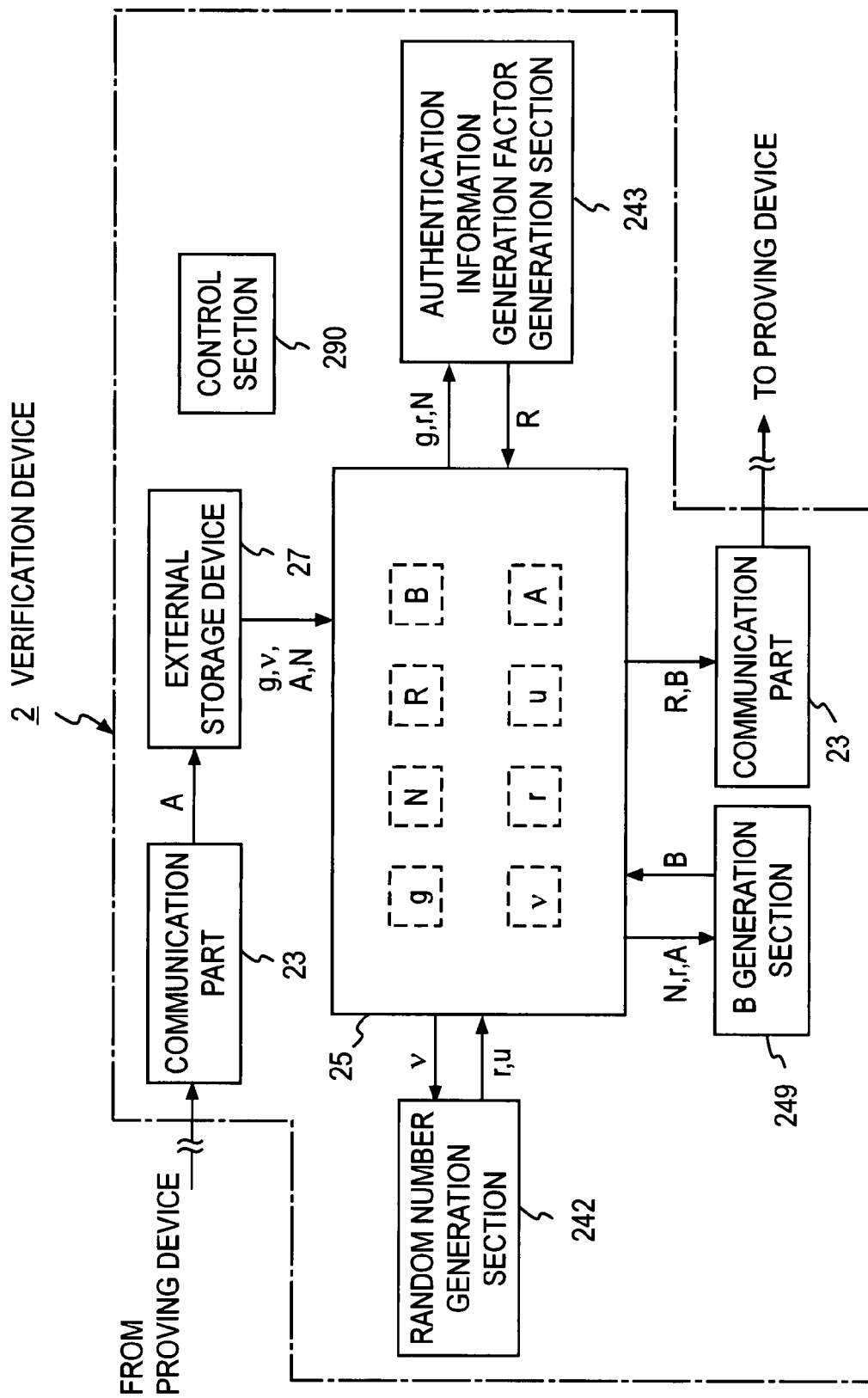
FIG. 32 is a functional block diagram (2) of the verification device (2) according to Fifth Embodiment.

Next, according to the control of the control section (290) of the verification device (2), the communication part (23) receives A transmitted in step S704 and stores A in the external storage device (27) (step S705) [see FIG. 32].

After that, the control section (290) of the verification device (2) reads N, g, v and A from the external storage device (27) and stores them in respective predetermined storage areas of the RAM (25) [see FIG. 32].

Next, a random number generation section (242) of the verification device (2) reads v from the RAM (25), generates a random number r not more than $2^{2v}$, and stores the random number r in a predetermined storage area of the RAM (25) (step S706) [see FIG. 32]. The random number generation section (242) may generate the random number r from the range of $0 \leq r N \cdot 2^v - 1$. This is because, as described above, the configuration for selecting the random number r from this range is desirable in view of compatibility of safety and arithmetic cost. Further, r does not always have to be a random number as long as the value can be selected at random.

Next, an authentication information generation factor generation section (243) of the verification device (2) reads N, g, and the random number r from the RAM (25), performs an operation according to Formula (2), and stores an arithmetic result R [authentication information generation factor] in a predetermined storage area of the RAM (25) (step S707) [see FIG. 32].

After that, a B generation section (249) of the verification device (2) reads N, the random number r, and A from the RAM (25), performs an operation according to Formula (13), and stores an arithmetic result B in a predetermined storage area of the RAM (25) (step S708) [see FIG. 32].

[Formula 13]

$$B = A^r \bmod N \qquad (13)$$

Next, according to the control of the control section (290) of the verification device (2), the communication part (23) transmits, to the proving device (1), an authentication information generation factor R and B which are obtained in steps S707 and S708 and read from the RAM (25) (step S709) [see FIG. 32].

The random number r, the authentication information generation factor R, and B which are obtained in steps S706, S707 and S708 are stored in the external storage device (27) under the control of the control section (290) of the verification device (2).

Figure 33:
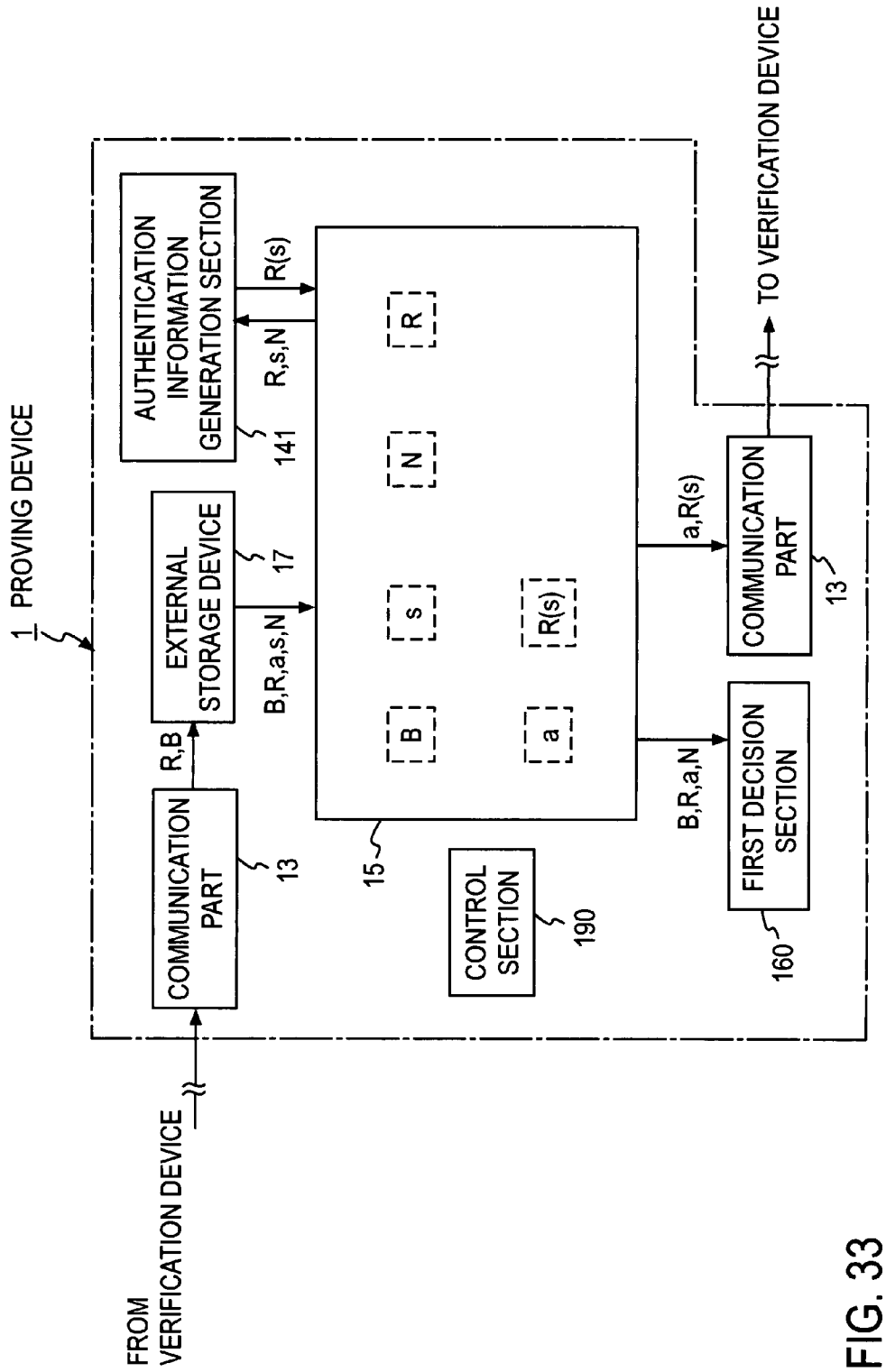
FIG. 33 is a functional block diagram (2) of the proving device (1) according to Fifth Embodiment.

Next, according to the control of a control section (190) of the proving device (1), the communication part (13) receives the authentication information generation factor R and B which are transmitted in step S709, and the communication part (13) stores the authentication information generation factor R and B in the external storage device (17) (step S710) [see FIG. 33].

After that, the control section (190) of the proving device (1) reads B, the authentication information generation factor R, the random number a, the information s, and N from the external storage device (17) and stores them in respective predetermined storage areas of the RAM (15).

Next, a first decision section (160) of the proving device (1) reads B, the authentication information generation factor R, the random number a, and N from the RAM (15) and decides whether the relationship expressed by Formula (14) is established or not (step S711) [see FIG. 33]. When the first decision section (160) decides that the relationship is not established, the process is completed under the control of the control section (190) of the proving device (1) without performing the subsequent processing (step S712). When the first decision section (160) decides that the relationship is established, the subsequent step S713 is performed under the control of the control section (190) of the proving device (1).

[Formula 14]

$$B = R^a \bmod N \qquad (14)$$

Next, an authentication information generation section (141) of the proving device (1) reads N, the information s, and the authentication information generation factor R from the RAM (15), performs an operation according to Formula (3), and stores an arithmetic result R(s)[authentication information] in a predetermined storage area of the RAM (15) (step S713) [see FIG. 33].

After that, according to the control of the control section (190) of the proving device (1), the communication part (13) transmits, to the verification device (2), the authentication information R(s) which is obtained in step S713 and read from the RAM (15) and the random number a obtained in step S702 (step S714) [see FIG. 33].

Figure 34:
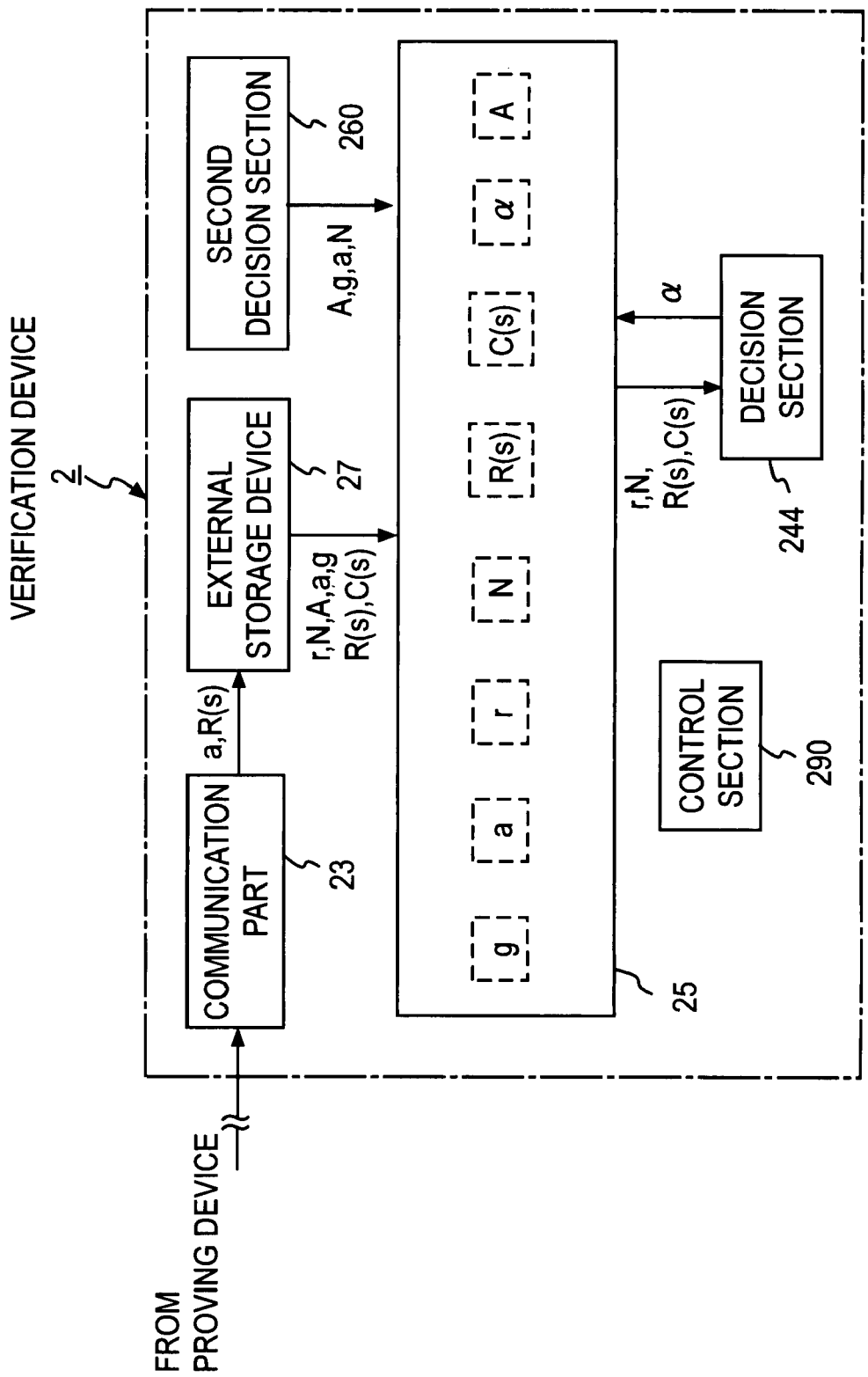
FIG. 34 is a functional block diagram (3) of the verification device (2) according to Fifth Embodiment.
Figure 35:
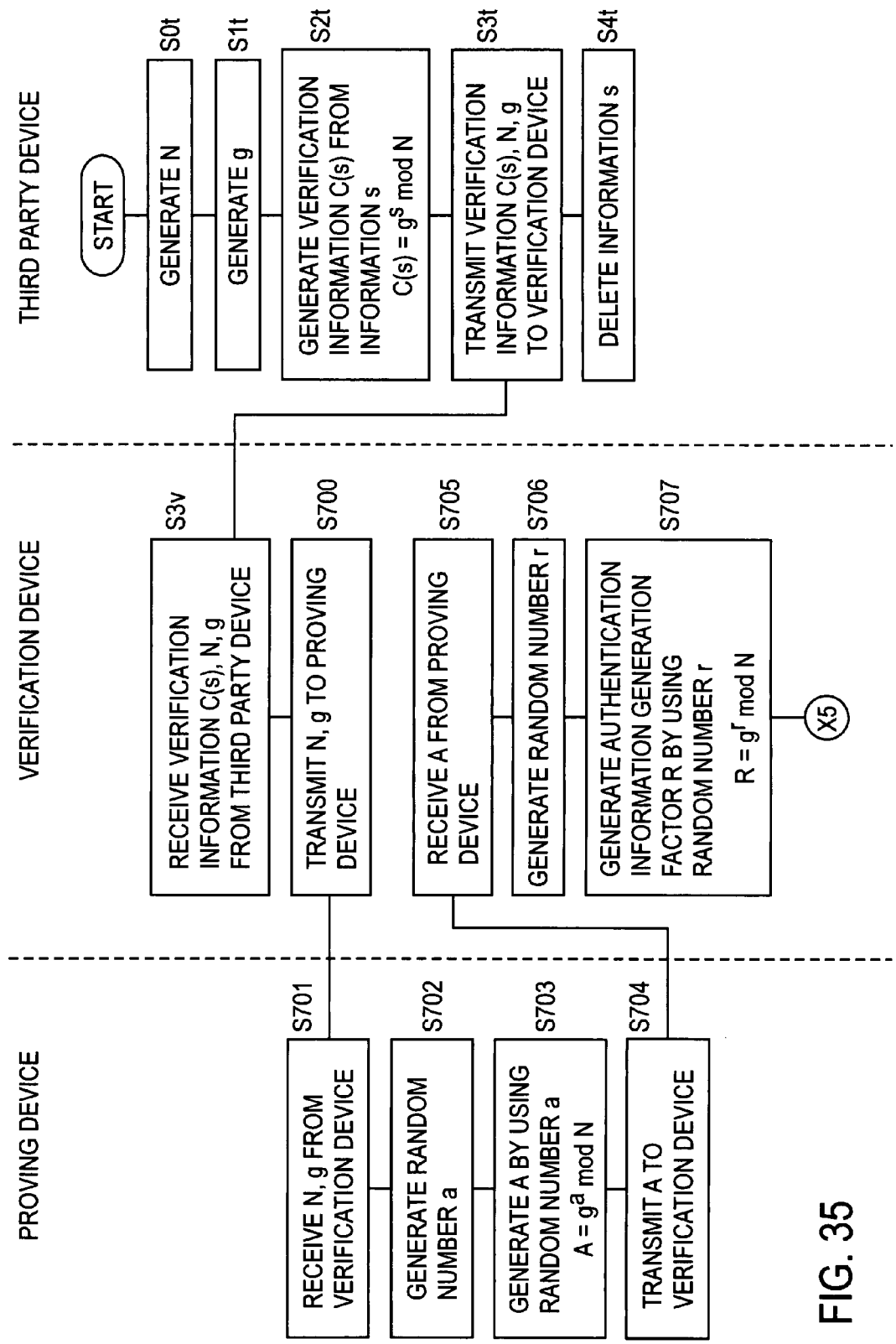
FIG. 35 shows a processing flow (1) of Fifth Embodiment.
Figure 36:
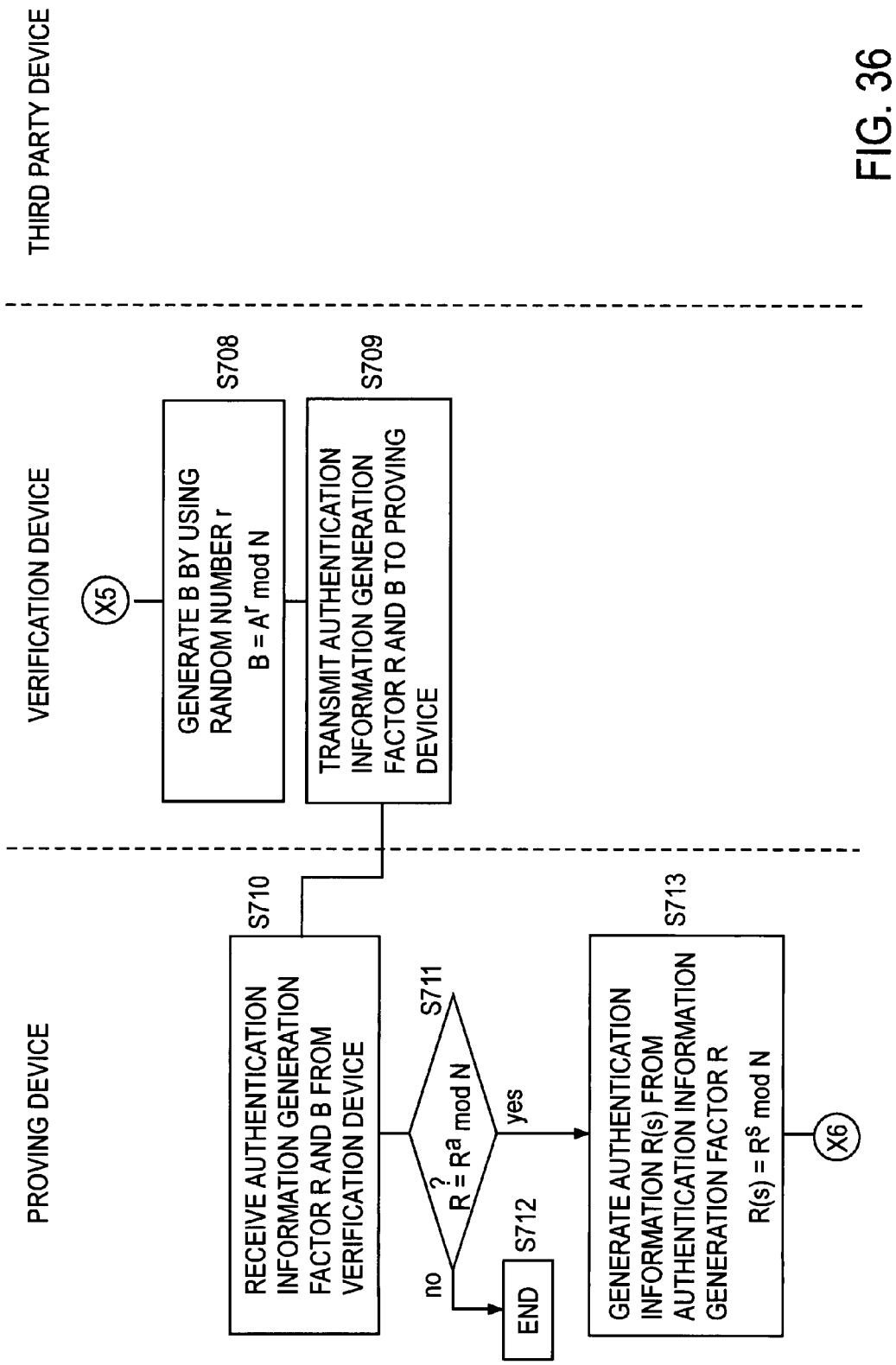
FIG. 36 shows a processing flow (2) of Fifth Embodiment.
Figure 37:
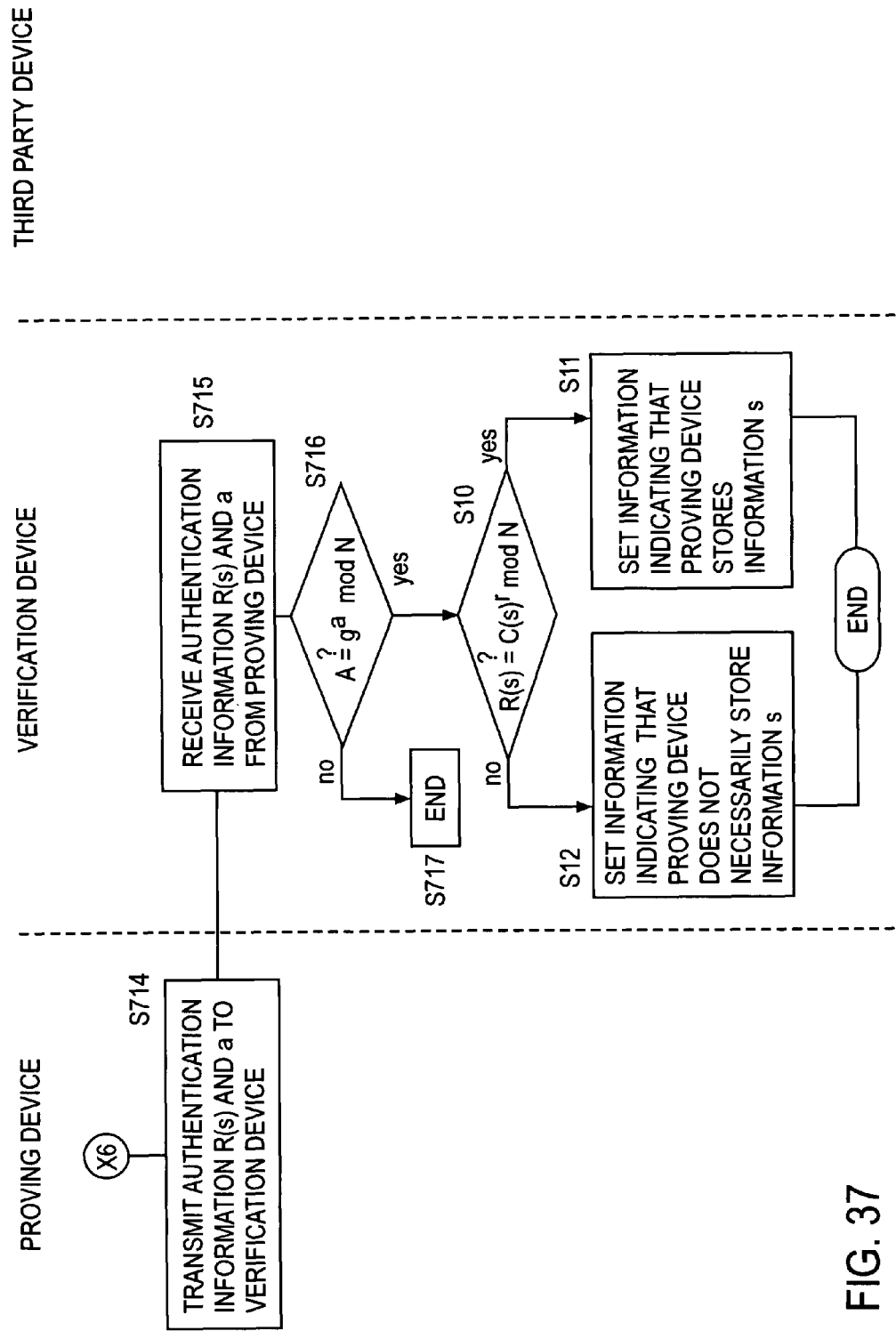
FIG. 37 shows a processing flow (3) of Fifth Embodiment.

Next, according to the control of a control section (290) of the verification device (2), the communication part (23) receives the authentication information R(s) and the random number a which are transmitted in step S714 and stores them in the external storage device (27) (step S715) [see FIG. 34].

After that, the control section (290) of the verification device (2) reads N, the random number r, the authentication information R(s), verification information C(s), A, the random number a, and g from the external storage device (27) and stores them in the respective predetermined storage areas of the RAM (25) [see FIG. 34].

After that, a second decision section (260) of the verification device (2) reads A, g, the random number a, and N from the RAM (25) and decides whether the relationship expressed by Formula (15) is established or not (step S716) [see FIG. 34]. When the second decision section (260) decides that the relationship is not established, the process is completed under the control of the control section (290) of the verification device (2) without performing the subsequent processing (step S717). When the second decision section (260) decides that the relationship is established, processing in and after the subsequent step S10 is performed under the control of the control section (290) of the verification device (2). The processing in and after step S10 has been already discussed and thus the explanation thereof is omitted. When the second decision section (260) decides that the relationship is not established, it is desirable that the verification device (2) does not transmit, to the proving device, the step (S716 or S10) where the relationship is not established. This is because the protocol transmitting this information cannot keep safety.

[Formula 15]

$$A = g^a \bmod N \qquad (15)$$

A section for performing the processing of steps of S702 to S704, S710 and S711 corresponds to "interactive proof section". Further, a section for performing the processing of steps S705 to S709, S715 and S716 corresponds to "interactive verification section".

Sixth Embodiment

Referring to FIGS. 38 to 44, Sixth Embodiment of the present invention will now be described below.

Sixth Embodiment is an embodiment for improving calculation efficiency in Fifth Embodiment. The technique for improving calculation efficiency is the same as that of Third Embodiment. For convenience of explanation, in the following explanation, the interactive proof method which is peculiar to the present invention and described in Fifth Embodiment is applied to Second Embodiment and the method for improving calculation efficiency described in Third Embodiment is applied to Second Embodiment.

In Sixth Embodiment, the same functions and processing as those of Third Embodiment and Fifth Embodiment are indicated by the same reference numerals and the explanation thereof is omitted. Hereinafter, information s is a generic name for k pieces of divided information $s_0, s_1, \ldots, s_{k-1}$.

[Proving Device]

A proving device (1) of Sixth Embodiment is same as that of Fifth Embodiment and thus the explanation thereof i's omitted.

[Verification Device]

A verification device (2) of Sixth Embodiment is same as that of Fifth Embodiment and thus the explanation thereof is omitted.

[Third Party Device]

A third party device (3) of Sixth Embodiment is same as that of Second Embodiment and thus the explanation thereof is omitted.

[Preparation]

v is set at a predetermined natural number. It is assumed that v is stored in an external storage device (17) of the proving device (1) and an external storage device (27) of the verification device (2).

[Authentication]

The processing of steps S0t to S3va is same as that of Third Embodiment and thus the explanation thereof is omitted.

After step S3va, the following processing is sequentially performed.

Figure 38:
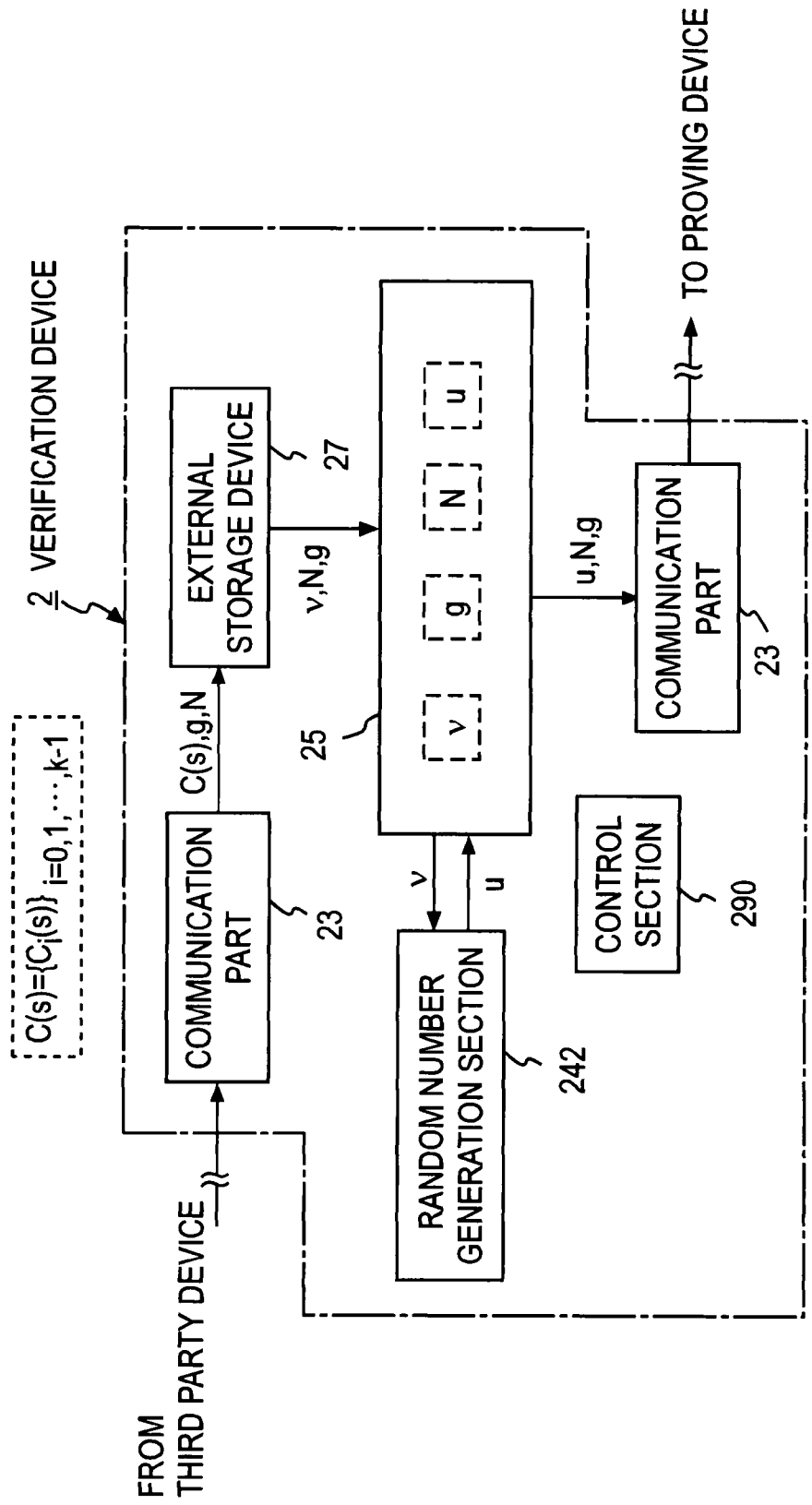
FIG. 38 is a functional block diagram (1) of a verification device (2) according to Sixth Embodiment.

First, a control section (290) of the verification device (2) reads v, N and g from the external storage device (27) and stores them in respective predetermined storage areas of a RAM (25) [see FIG. 38].

Next, a random number generation section (242) of the verification device (2) reads v from the RAM (25), generates a random number u not more than v bits, and stores the random number u in a predetermined storage area of the RAM (25) (step S800) [see FIG. 38].

After that, according to the control of the control section (290) of the verification device (2), a communication part (23) transmits, to the proving device (1), the random number u, N and g which are read from the RAM (25) (step S801) [see FIG. 38].

The random number u obtained in step S800 is stored in the external storage device (27) under the control of the control section (290) of the verification device (2).

Figure 39:
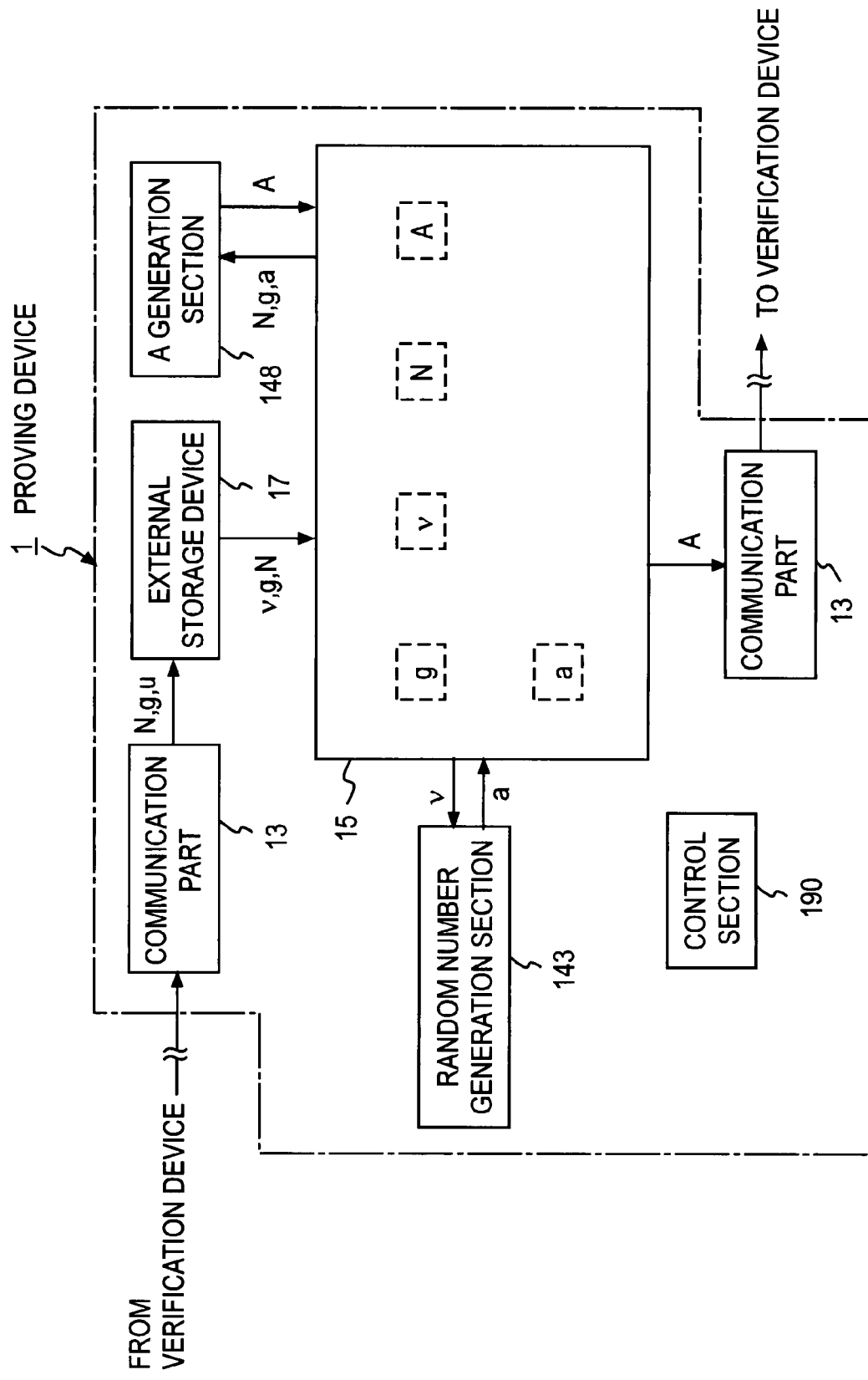
FIG. 39 is a functional block diagram (1) of a proving device (1) according to Sixth Embodiment.
Figure 40:
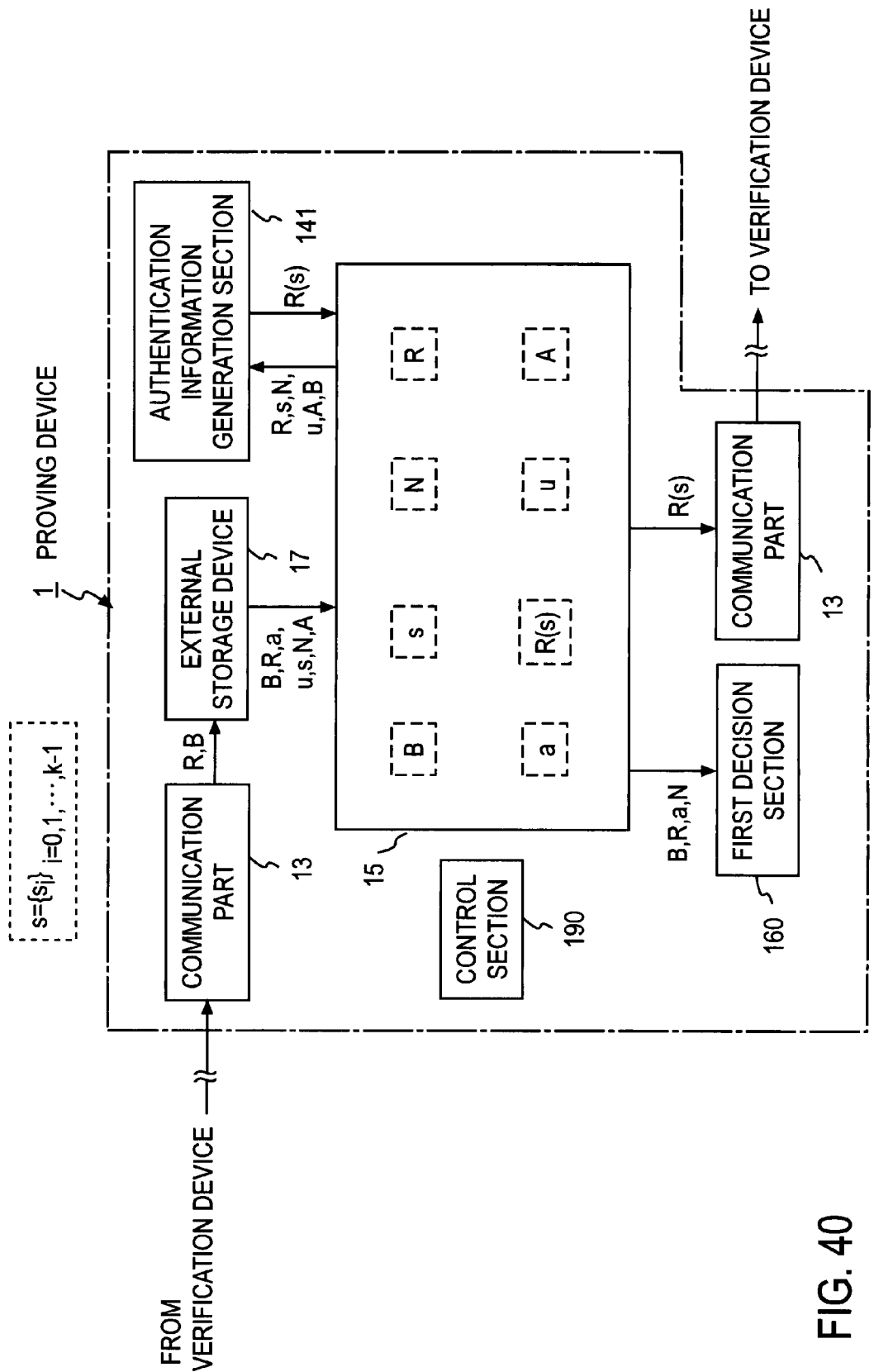
FIG. 40 is a functional block diagram (2) of the proving device (1) according to Sixth Embodiment.
Figure 41:
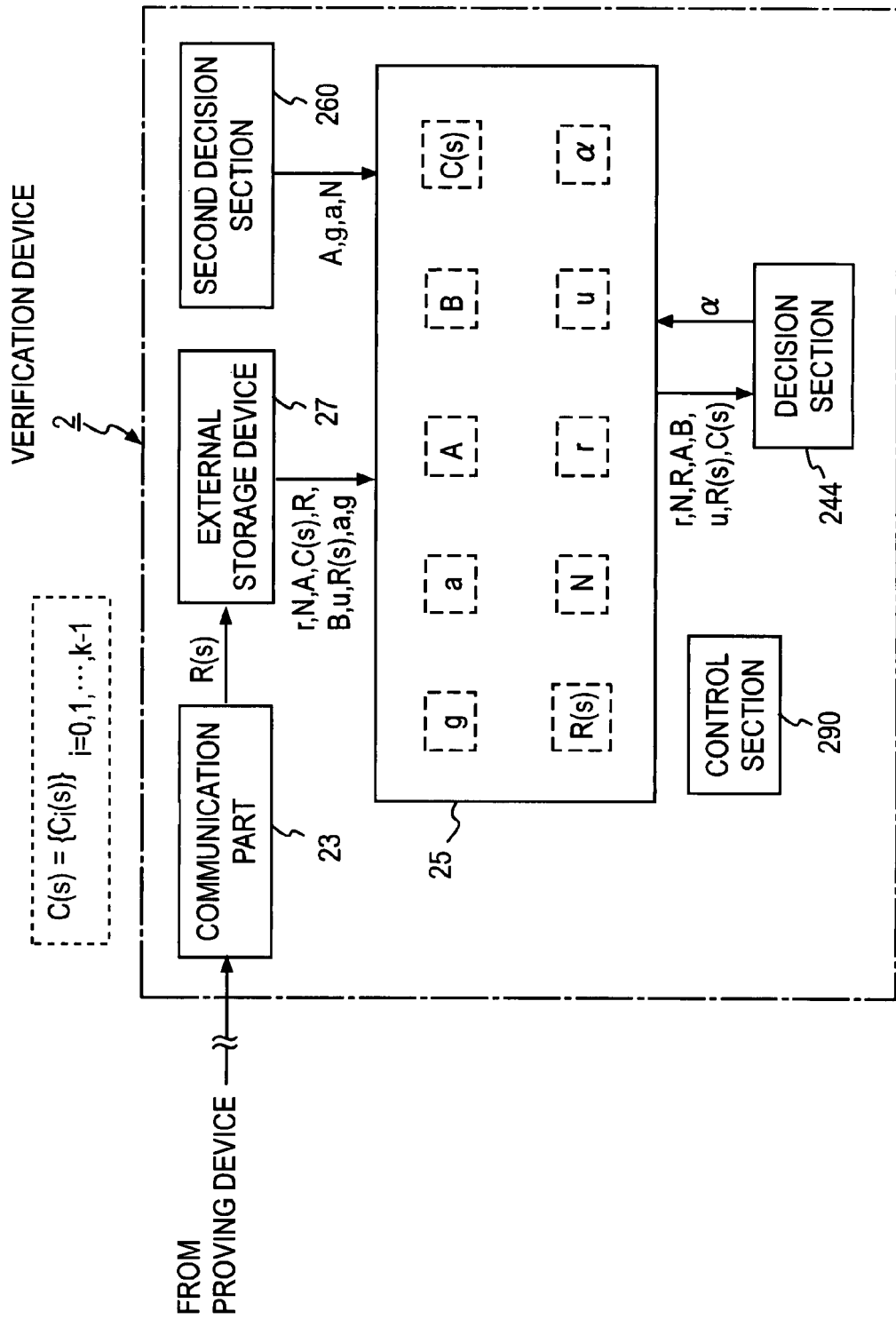
FIG. 41 is a functional block diagram (2) of the verification device (2) according to Sixth Embodiment.
Figure 42:
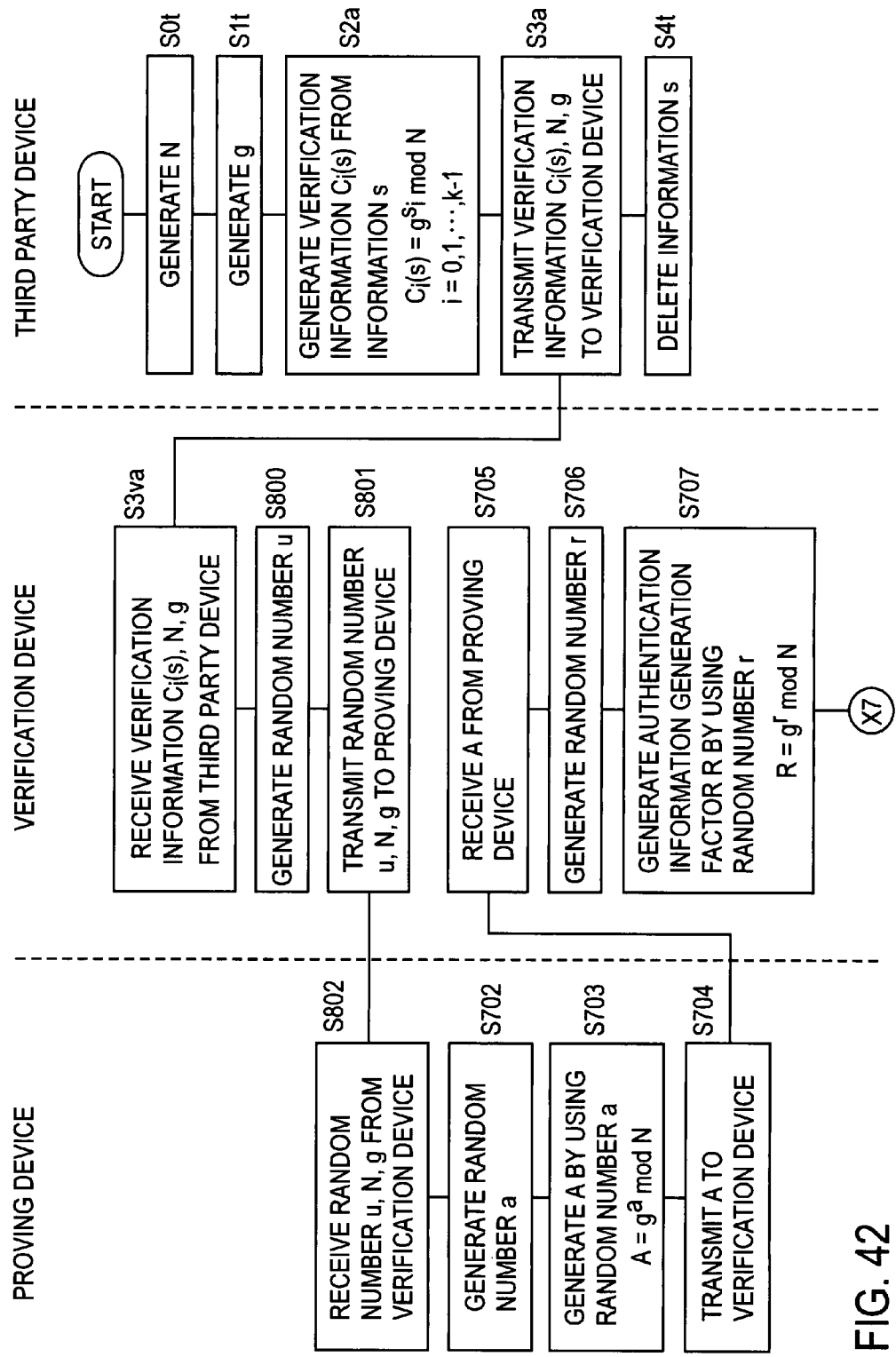
FIG. 42 shows a processing flow (1) of Sixth Embodiment.
Figure 43:
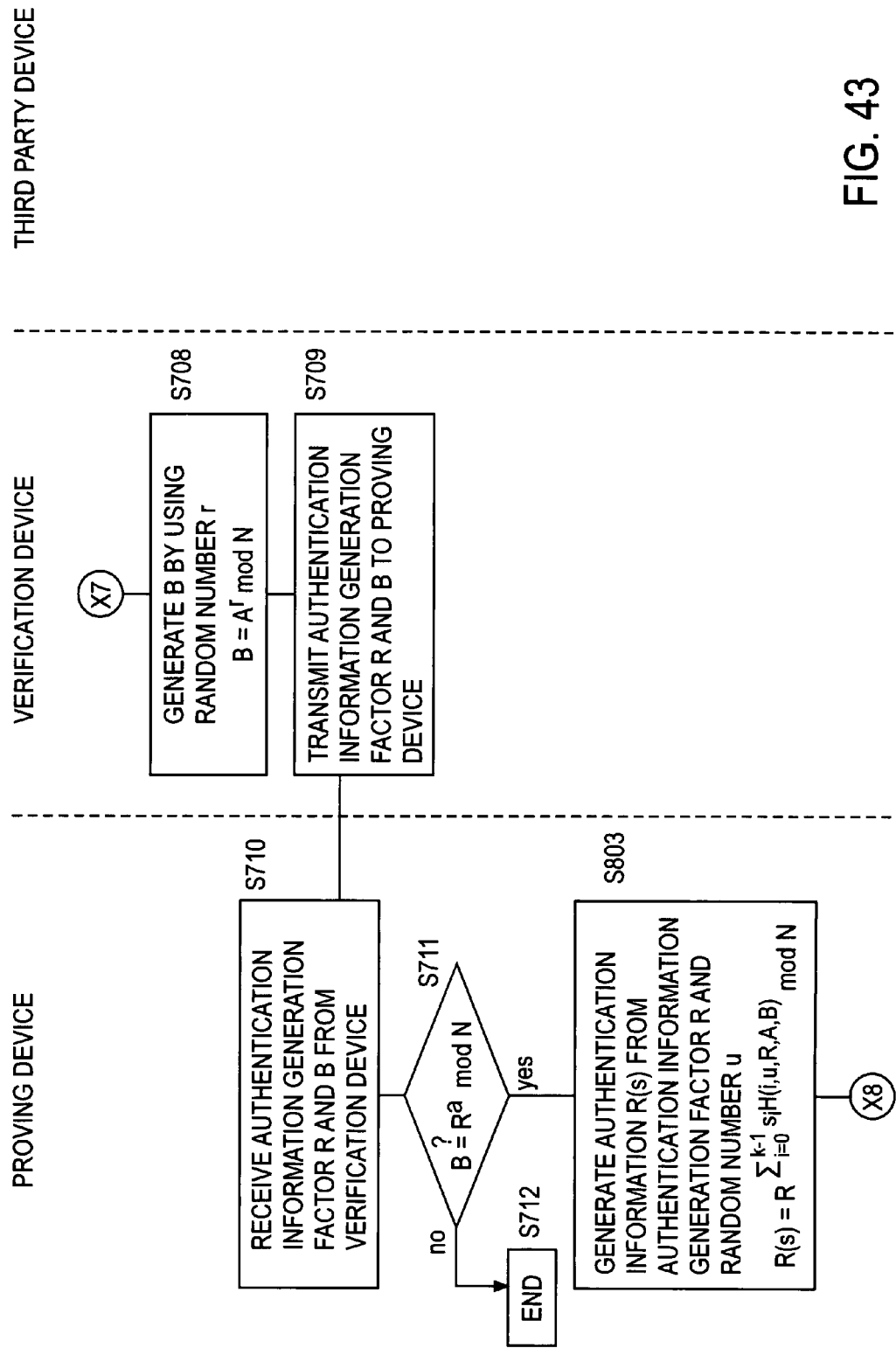
FIG. 43 shows a processing flow (2) of Sixth Embodiment.
Figure 44:
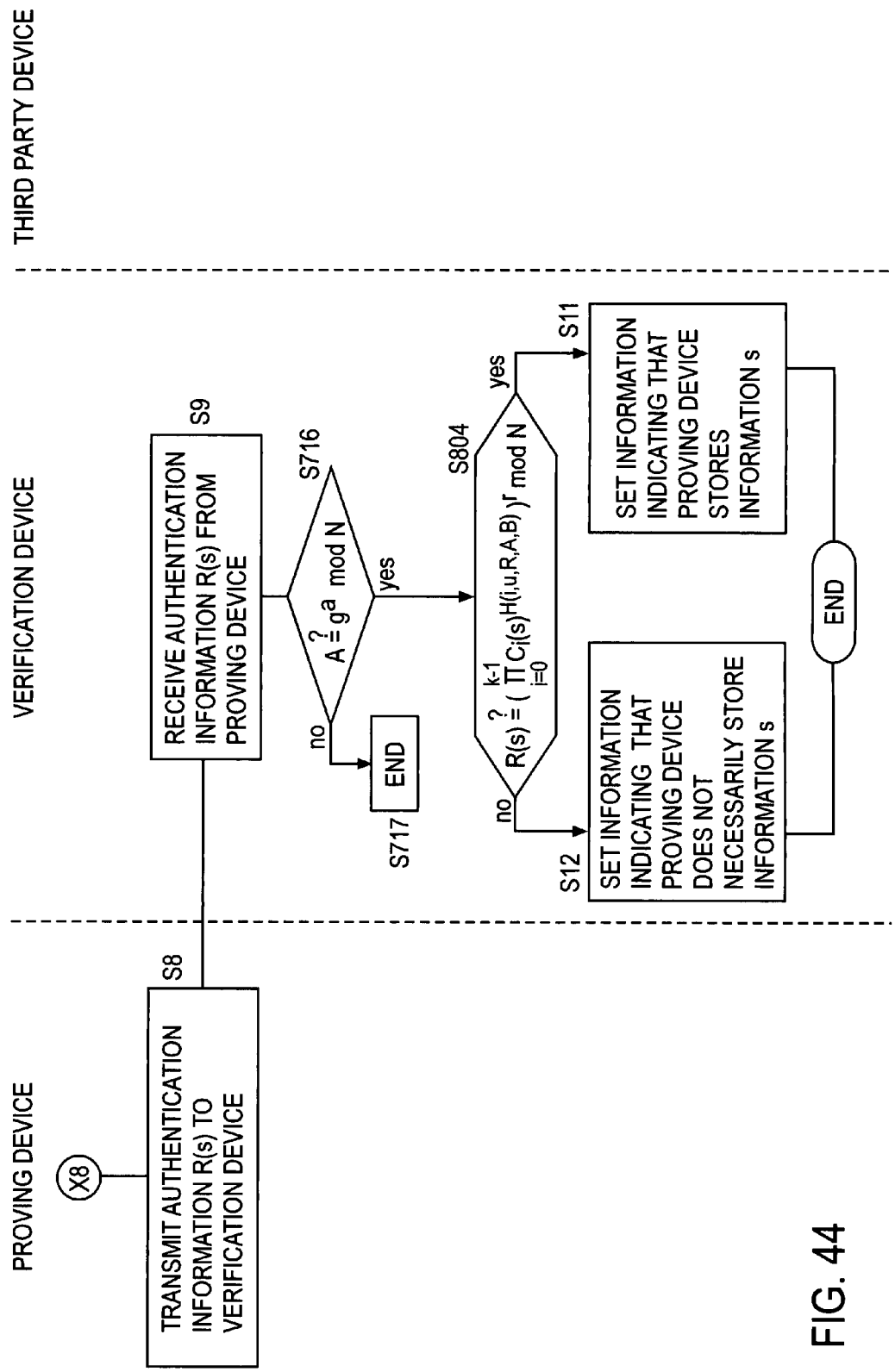
FIG. 44 shows a processing flow (3) of Sixth Embodiment.

Next, according to the control of a control section (190) of the proving device (1), a communication part (13) receives the random number u, N and g which are transmitted in step S801 and stores them in the external storage device (17) (step S802) [see FIG. 39].

After step S802, the processing of steps S702 to S712 is performed. This processing has been already discussed in Fifth Embodiment and thus the explanation thereof is omitted.

After step S711 (in other words, when termination in step S712 is not performed), the subsequent step S803 is processed. In other words, an authentication information generation section (141) of the proving device (1) reads N, the information s, an authentication information generation factor R, the random number u, A and B (read from the external storage device (17) beforehand) from a RAM (15), performs an operation according to Formula (16), and stores an arithmetic result R(s)[authentication information] in a predetermined storage area of the RAM (15) (step S803) [see FIG. 40].

[Formula 16]

$$R(s) = R^{\sum_{i=0}^{k-1} s_i H(i,u,R,A,B)} \bmod N \tag{16}$$

After step S803, steps S8, S9 and S716 are sequentially processed. This processing has been already discussed in Fifth Embodiment and thus the explanation thereof is omitted.

After step S716 (in other words, when termination in step S717 is not performed), the subsequent step S804 is processed. In other words, a decision section (244) of the verification device (2) reads N, a random number r, the random number u, the authentication information generation factor R, the authentication information R(s), verification information C(s), A and B (read from the external storage device (27) beforehand) from a RAM (25), and the decision section (244) decides whether the relationship expressed by Formula (17) is established or not (step S804) [see FIG. 41].

[Formula 17]

$$R(s) = \left( \prod_{i=0}^{k-1} C_i(s)^{H(i,u,R,A,B)} \right)^r \bmod N \tag{17}$$

The processing of steps S11 and S12 following step S804 is same as that of Third Embodiment and thus the explanation thereof is omitted.

The authentication system/method of the present invention is not limited to the foregoing embodiments and may be changed without departing from the gist of the present invention.

For example, in the forgoing embodiments, a multiplicative cyclic group of a residue class ring whose modulus is N (N is a constant) is used as a "communicative semigroup". However, the "communicative semigroup" usable in the present invention is not limited to a cyclic group. For example, the "communicative semigroup" may be a multiplicative cyclic group of a residue class ring whose modulus is polynomial.

Further, in the foregoing embodiments, the base (for example, g) of an exponentiation defined on the communicative semigroup is a numeric value such as a natural number. However, the base of the exponentiation may be a polynomial.

Moreover, in the foregoing embodiments, it is desirable that N is a natural number other than numbers which can be decided to be prime numbers and it is difficult to factorize N into prime factor. However, other numbers may be used as N. For example, N may be a composite number of the product of three or more prime numbers. In view of safety, N may have any value as long as the present invention is applied to a use in which the presence of an attacker is negligible. In other words, when the present invention is applied to such a use, it is not always necessary to set the "communicative semigroup" such that the order of a finite set defined on the semigroup is difficult to calculate.

Moreover, the function H(i,u,R) may not be used in Second Embodiment, Third Embodiment, and Sixth Embodiment. In this case, for example, H(i,u,R)=1 is set in the processing of the embodiments.

Instead of the random numbers used in the embodiments, other any given numbers may be used. Further, data stored in the external storage device in the embodiments may be stored in the RAM and data stored in the RAM in the embodiments may be stored in the external storage device.

Moreover, the method of generating the authentication information and the decision method may be optionally changed. Further, the processing described in the authentication system/method does not always have to be chronologically performed in the described order. The processing may be performed according to the throughput of the device for performing the processing or may be performed in parallel or separately as needed.

Further, when the processing functions of the proving device, the verification device, and the third party device are realized by a computer mainly made up of a processor, the processing contents of functions to be provided in the proving device, the verification device, and the third party device is described by a program. The program is executed by the computer, so that the processing functions of the proving device, the verification device, and the third party device are realized on the computer.

The program in which the processing contents are described can be recorded on a recording medium readable by the computer. The recording medium readable by the computer may be any kind of medium including, for example, a magnetic recorder, an optical disc, a magneto-optical recording medium, and a semiconductor memory. To be specific, for example, a magnetic recorder may be a hard disc device, a flexible disc, a magnetic tape and so on, the optical disc may be a DVD (Digital Versatile Disc), DVD-RAM (Random Access Memory), a CD-ROM (Compact Disc Read Only Memory), a CD-R (Recordable)/RW (ReWritable) and so on, the magneto-optical recording medium may be an MO (Magneto-Optical disc) and so on, and the semiconductor memory may be an EEP-ROM (Electronically Erasable and Programmable-Read Only Memory) and so on.

Further, this program is distributed by, for example, selling, transferring, lending a transportable recording medium such as a DVD and CD-ROM in which the program is recorded. Moreover, the program may be stored in the storage device of a server computer and distributed by transferring the program from the server computer to another computer via a network.

For example, the computer for executing such a program first stores a program temporarily in the storage device of the computer, the program having been recorded on a transportable recording medium or transferred from a server computer. When processing is performed, the computer reads the program stored in the recording medium of the computer and performs the processing according to the read program. In another embodiment for executing the program, the computer may directly read a program from a transportable recording medium and perform processing according to the program. The processor may perform processing according to a received program every time the program is transferred from the server computer to the computer. Moreover, the above processing may be performed by so-called ASP (Application Service Provider) service in which programs are not transferred from a server computer to a computer and processing functions are realized only by an executive instruction and the acquisition of results. It is assumed that the program of this embodiment includes information for processing of an electronic calculator, the information being pursuant to the program (including data that is not a direct command to the computer but has a property of specifying the processing of the computer).

Further, in this embodiment, the proving device, the verification device, and the third party device are configured by executing the predetermined program on the computer. At least some of these processing contents may be realized as hardware.

INDUSTRIAL APPLICABILITY

The present invention is useful for authenticating that predetermined information is stored in a specified or unspecified proving device. Although the present invention relates to a basic technology that is versatile in various fields, the present invention is specifically used for, for example, monitoring and authentication of the other party in file distribution or network storage service, high-quality digital media distribution, the confirmation of database matching, and so on.

What is claimed is:
1. An authentication system, comprising:
a proving device for storing held information; and
a verification device connected to the proving device so as to communicate with the proving device, the verification device verifying that the held information is the same as comparative information; wherein
the verification device comprises:
a first storage section for storing verification information, and storing first random information;
an authentication information generation factor generation section for generating an authentication information generation factor by using the first random information stored in the first storage section;
a first transmitting section for transmitting the authentication information generation factor generated by the authentication information generation factor generation section to the proving device;
a first receiving section for receiving authentication information transmitted by the proving device; and
a decision section for deciding whether a predetermined relationship is established between the authentication information received by the first receiving section and the verification information and the first random information which are stored in the first storage section;
the proving device comprises:
a second storage section for storing the held information;
a second receiving section for receiving the authentication information generation factor transmitted by the first transmitting section;
an authentication information generation section for generating the authentication information by using the authentication information generation factor received by the second receiving section and the held information stored in the second storage section; and
a second transmitting section for transmitting the authentication information generated by the authentication information generation section to the verification device;
wherein the verification information is a result $C(s')$ of modular exponentiation whose modulus is a constant N, base is a value g smaller than N, and exponent is the comparative information $s'$;
the authentication information generation factor is a result R of modular exponentiation whose modulus is a constant N, base is the value g, and exponent is the first random information r;

the authentication information is a result R(s) of modular exponentiation whose modulus is N, base is the authentication information generation factor R, and exponent is the held information s; and the decision section decides whether or not a result of modular exponentiation whose modulus is N, base is the verification information C(s'), and exponent is the first random information is equal to the authentication information R(s).

2. The authentication system according to claim 1, wherein the verification information is an arithmetic result of an exponentiation whose base is an element of a finite set in which an operation constituting a communicative semigroup is defined, and whose exponent is the comparative information, the exponentiation being defined on the semigroup;

the authentication information generation factor is an arithmetic result of an exponentiation whose base is the element of the finite group, and whose exponent is the first random information, the exponentiation being defined on the semigroup;

the authentication information is an arithmetic result of an exponentiation whose base is the authentication information generation factor, and whose exponent is the held information, the exponentiation being defined on the semigroup; and the decision section decides whether the authentication information is equal to an arithmetic result of an exponentiation whose base is the verification information, and whose exponent is the first random information, the exponentiation being defined on the semigroup.

3. The authentication system according to claim 2, wherein it is difficult to calculate an order of the finite set of the semigroup.

4. The authentication system according to claim 1, wherein the constant N is a natural number other than numbers which can be decided to be prime numbers and it is difficult to factorize N into prime factors.

5. The authentication system according to claim 1, wherein the constant N is a composite number of a product of three or more prime numbers.

6. The authentication system according to claim 4, wherein the first random information r is a value randomly selected from a range of $0 \leq r \leq N \cdot 2^v - 1$ where v represents a predetermined natural number.

7. An authentication system, comprising:
a proving device for storing held information; and
a verification device connected to the proving device so as to communicate with the proving device, the verification device verifying that the held information is the same as comparative information; wherein
the verification device comprises:
a first storage section for storing verification information, and storing first random information;
an authentication information generation factor generation section for generating an authentication information generation factor by using the first random information stored in the first storage section;
a first transmitting section for transmitting the authentication information generation factor generated by the authentication information generation factor generation section to the proving device;
a first receiving section for receiving authentication information transmitted by the proving device; and
a decision section for deciding whether a predetermined relationship is established between the authentication information received by the first receiving section and the verification information and the first random information which are stored in the first storage section;

the proving device comprises:
a second storage section for storing the held information;
a second receiving section for receiving the authentication information generation factor transmitted by the first transmitting section;
an authentication information generation section for generating the authentication information by using the authentication information generation factor received by the second receiving section and the held information stored in the second storage section; and
a second transmitting section for transmitting the authentication information generated by the authentication information generation section to the verification device;

wherein the verification information is generated for each first divided information obtained by dividing the comparative information into a plurality of pieces, the each verification information is generated by using each first divided information;

the authentication information generation section generates the authentication information by using the authentication information generation factor received by the second receiving section and all pieces of second divided information obtained by dividing the held information stored in the second storage section into a plurality of pieces;

the verification information is a result $C_i(s')$ of modular exponentiation whose modulus is N, base is a value g smaller than N, and exponent is the first divided information $s_i'$;

the authentication information generation factor is a result R of modular exponentiation whose modulus is N, base is the value g, and exponent is the first random information r;

the authentication information is a result R(s) of modular exponentiation whose exponent is a value obtained by summing, for all i, products of the second divided information $s_i$ and information H whose value is dependent upon i corresponding to the second divided information $s_i$ and some kind of information transmitted from the verification device, and whose base is the authentication information generation factor R, and whose modulus is N; and the decision section decides whether or not the authentication information R(s) is equal to a result of modular exponentiation whose base is a product of values which are, corresponding to all i, the verification information $C_i(s')$ raised to the power of the information H each corresponding to $C_i(s')$, and whose exponent is the first random information r, and whose modulus is N.

8. The authentication system according to claim 7, wherein the verification information is an arithmetic result of an exponentiation whose base is an element of a finite set in which an operation constituting a communicative semigroup is defined, and whose exponent is the first divided information, the exponentiation being defined on the semigroup;

the authentication information generation factor is an arithmetic result of an exponentiation whose base is the element of the finite group, and whose exponent is the first random information, the exponentiation being defined on the semigroup;

the authentication information is an arithmetic result of an exponentiation whose base is the authentication information generation factor, and whose exponent is a value which is calculated using all the pieces of the second divided information and has a smaller information volume than the held information, the exponentiation being defined on the semigroup; and the decision section decides whether or not the authentication information is equal to an arithmetic result of an exponentiation whose base is the value obtained by calculating all the pieces of the verification information, and whose exponent is the first random information, the exponentiation being defined on the semigroup.

9. The authentication system according to claim 8, wherein the authentication information is an arithmetic result of an exponentiation whose exponent is a value calculated by using all the pieces of the second divided information and information which corresponds to a bit position of the second divided information in the held information and is difficult to prepare beforehand, the value having a smaller information volume than the held information, and whose base is the authentication information generation factor, the exponentiation being defined on the semigroup.

10. The authentication system according to claim 8, wherein it is difficult to calculate an order of the finite set of the semigroup.

11. The authentication system according to claim 7, wherein the constant N is a natural number other than numbers which can be decided to be prime numbers and it is difficult to factorize N into prime factors.

12. The authentication system according to claim 7, wherein the information H is a one-way function value which is dependent upon i corresponding to the second divided information $s_i$ and some kind of information transmitted from the verification device.

13. An authentication system, comprising:
a proving device for storing held information; and
a verification device connected to the proving device so as to communicate with the proving device, the verification device verifying that the held information is the same as comparative information; wherein
the verification device comprises:
a first storage section for storing verification information, and storing first random information;
an authentication information generation factor generation section for generating an authentication information generation factor by using the first random information stored in the first storage section;
a first transmitting section for transmitting the authentication information generation factor generated by the authentication information generation factor generation section to the proving device;
a first receiving section for receiving authentication information transmitted by the proving device; and
a decision section for deciding whether a predetermined relationship is established between the authentication information received by the first receiving section and the verification information and the first random information which are stored in the first storage section;
the proving device comprises:
a second storage section for storing the held information;
a second receiving section for receiving the authentication information generation factor transmitted by the first transmitting section;
an authentication information generation section for generating the authentication information by using the authentication information generation factor received by the second receiving section and the held information stored in the second storage section; and
a second transmitting section for transmitting the authentication information generated by the authentication information generation section to the verification device;

wherein the proving device comprises:
an A generation section for generating an arithmetic value A obtained by an exponentiation whose base is an element g of a finite set in which an operation constituting a communicative semigroup is defined, and whose exponent is second random information a, the exponentiation being defined on the semigroup;
the second transmitting section of the proving device transmits the arithmetic value A to the verification device;
the first receiving section of the verification device receives the arithmetic value A transmitted from the proving device;
the authentication information generation factor generation section of the verification device generates the authentication information generation factor R by computing an exponentiation whose base is the element g of the finite set, and whose exponent is the first random information r, the exponentiation being defined on the semigroup;
the verification device comprises:
a B generation section for generating an arithmetic value B by computing an exponentiation whose base is the arithmetic value A, and whose exponent is the first random information r, the exponentiation being defined on the semigroup;
the first transmitting section of the verification device transmits the authentication information generation factor R and the arithmetic value B to the proving device;
the second receiving section of the proving device receives the authentication information generation factor R and the arithmetic value B which are transmitted from the verification device;
the proving device comprises:
a first decision section for deciding whether the arithmetic value B is equal to an arithmetic result of an exponentiation whose base is the authentication information generation factor R received by the second receiving section, and whose exponent is the second random information a, the exponentiation being defined on the semigroup; and
the second transmitting section of the proving device transmits the authentication information generated by the authentication information generation section to the verification device when the first decision section can confirm that the arithmetic value B is equal to an arithmetic result of an exponentiation whose base is the authentication information generation factor R received by the second receiving section, and whose exponent is the second random information a, the exponentiation being defined on the semigroup.

14. The authentication system according to claim 13, wherein the second transmitting section of the proving device further transmits the second random information a to the verification device when the first decision section can confirm that the arithmetic value B is equal to an arithmetic result of an exponentiation whose base is the authentication information generation factor R received by the second receiving section, and whose exponent is the second random information a, the exponentiation being defined on the semigroup;
the first receiving section of the verification device receives the second random information a transmitted from the proving device; and
the verification device comprises:

a second decision section for deciding whether the arithmetic value A is equal to an arithmetic result of an exponentiation whose base is the element g of the finite set, and whose exponent is the second random information a, the exponentiation being defined on the semigroup.

15. The authentication system according to claim 13, wherein it is difficult to calculate an order of the finite set of the semigroup.

16. The authentication system according to claim 13, wherein the arithmetic value A is a result of modular exponentiation whose modulus is a constant N whose base is a value g smaller than N, and whose exponent is the second random information a;
the authentication information generation factor R is a result of modular exponentiation whose modulus is N, whose base is the value g, and whose exponent is the first random information r;
the arithmetic value B is a result of modular exponentiation whose modulus is N, base is the arithmetic value A, and exponent is the first random information r; and
said arithmetic result of an exponentiation whose base is the authentication information generation factor R received by the second receiving section, and whose exponent is the second random information a, and the exponentiation being defined on the semigroup is a result of modular exponentiation whose modulus is N, and whose base is the authentication information generation factor R, and whose exponent is the second random information a.

17. The authentication system according to claim 16, wherein said arithmetic result of an exponentiation whose base is the element g of the finite set, and whose exponent is the second random information a, and the exponentiation being defined on the semigroup is a result of modular exponentiation whose modulus is N, base is the element g of the finite set, and exponent is the second random information a.

18. The authentication system according to claim 16, wherein the constant N is a natural number other than numbers which can be decided to be prime numbers and it is difficult to factorize N into prime factors.

19. The authentication system according to claim 16, wherein the second random information a is a value randomly selected from a range of $0 \leq a \leq N \cdot 2^v - 1$ where v represents a predetermined natural number.

20. A proving device for proving to a verification device that held information in the proving device is the same as comparative information, comprising:
a storage section for storing the held information;
a receiving section for receiving an authentication information generation factor transmitted from the verification device;
an authentication information generation section for generating an authentication information by using the authentication information generation factor received by the receiving section and the held information stored in the storage section; and
a transmitting section for transmitting the authentication information generated by the authentication information generation section to the verification device;
wherein the authentication information generation factor is a result R of modular exponentiation whose modulus is N, base is a value g smaller than N, and exponent is a first random information r; and
the authentication information is a result R(s) of modular exponentiation whose exponent is a value obtained by summing, for all i, products of second divided information $s_i$, and information H whose value is dependent upon i corresponding to the second divided information $s_i$, and some kind of information transmitted from the verification device, and whose base is the authentication information generation factor R, and whose modulus is N.

21. A verification device for verifying that held information in a proving device is the same as comparative information, comprising:
a storage section for storing verification information, and storing random information;
an authentication information generation factor generation section for generating an authentication information generation factor by using the random information stored in the storage section;
a transmitting section for transmitting the authentication information generation factor generated by the authentication information generation factor generation section to the proving device;
a receiving section for receiving an authentication information transmitted by the proving device; and
a decision section for deciding whether a predetermined relationship is established between the authentication information received by the receiving section and the verification information and the random information which are stored in the storage section;
wherein the verification information is a result C(s') of modular exponentiation whose modulus is a constant N, base is a value g smaller than N, and exponent is the comparative information s';
the authentication information generation factor is a result R of modular exponentiation whose modulus is a constant N, base is the value g, and exponent is the first random information r;
the authentication information is a result R(s) of modular exponentiation whose modulus is N, base is the authentication information generation factor R, and exponent is the held information s; and
the decision section decides whether or not a result of modular exponentiation whose modulus is N, base is the verification information C(s'), and exponent is the first random information is equal to the authentication information R(s).

22. An authentication method for allowing a verification device to verify that held information stored in a storage section of a proving device is the same as comparative information,
the authentication method comprises:
a step of storing verification information in a storage section of the verification device;
a step of storing random information in the storage section of the verification device;
a step of generating an authentication information generation factor for generating authentication information in the proving device, the authentication information generation factor being generated in an authentication information generation factor generation section by using the random information stored in the storage section,
a step of transmitting the authentication information generation factor to the proving device by a transmitting section of the verification device;
a step of receiving the authentication information generation factor by a receiving section of the proving device;
a step of generating the authentication information, the authentication information being generated in an authentication information generation section of the proving device by using the authentication information generation factor and the held information stored in the storage section;

a step of transmitting the authentication information to the verification device by a transmitting section of the proving device;

a step of receiving the authentication information by a receiving section of the verification device; and a step of deciding in a decision section of the verification device whether a predetermined relationship is established between the verification information and the random information which are stored in the storage section of the verification device, and the authentication information;

wherein the verification information is a result C(s') of modular exponentiation whose modulus is a constant N, base is a value g smaller than N, and exponent is the comparative information s';

the authentication information generation factor is a result R of modular exponentiation whose modulus is a constant N, base is the value g, and exponent is the first random information r;

the authentication information is a result R(s) of modular exponentiation whose modulus is N, base is the authentication information generation factor R, and exponent is the held information s; and the step of deciding decides whether or not a result of modular exponentiation whose modulus is N, base is the verification information C(s'), and exponent is the first random information is equal to the authentication information R(s).

23. An authentication method for allowing a verification device to verify that held information stored in a storage section of a proving device is the same as comparative information, the authentication method comprises:

a step of storing verification information in a storage section of the verification device;

a step of storing random information in the storage section of the verification device;

a step of generating an authentication information generation factor for generating authentication information in the proving device, the authentication information generation factor being generated in an authentication information generation factor generation section by using the random information stored in the storage section, a step of transmitting the authentication information generation factor to the proving device by a transmitting section of the verification device;

a step of receiving the authentication information generation factor by a receiving section of the proving device;

a step of generating the authentication information, the authentication information being generated in an authentication information generation section of the proving device by using the authentication information generation factor and the held information stored in the storage section;

a step of transmitting the authentication information to the verification device by a transmitting section of the proving device;

a step of receiving the authentication information by a receiving section of the verification device; and a step of deciding in a decision section of the verification device whether a predetermined relationship is established between the verification information and the random information which are stored in the storage section of the verification device, and the authentication information;

wherein the verification information is generated for each first divided information obtained by dividing the comparative information into a plurality of pieces, the each verification information is generated by using each first divided information;

the authentication information is generated by using the authentication information generation factor received by the receiving section of the proving device and all pieces of second divided information obtained by dividing the held information stored in the storage section of the proving device into a plurality of pieces;

the verification information is a result $C_i(s')$ of modular exponentiation whose modulus is N, base is a value g smaller than N, and exponent is the first divided information $s_i'$;

the authentication information generation factor is a result R of modular exponentiation whose modulus is N, base is the value g, and exponent is the first random information r;

the authentication information is a result R(s) of modular exponentiation whose exponent is a value obtained by summing, for all i, products of the second divided information $s_i$ and information H whose value is dependent upon i corresponding to the second divided information $s_i$ and some kind of information transmitted from the verification device, and whose base is the authentication information generation factor R, and whose modulus is N; and the step of deciding decides whether or not the authentication information R(s) is equal to a result of modular exponentiation whose base is a product of values which are, corresponding to all i, the verification information $C_i(s')$ raised to the power of the information H each corresponding to $C_i(s')$, and whose exponent is the first random information r, and whose modulus is N.

24. The authentication method according to claim 22, wherein between the step of storing the random information in the storage section of the verification device and the step of transmitting the authentication information to the verification device, the authentication method comprises:

(a) a step of proving in an interactive proof section of the verification device to the proving device, by interactive proof with the proving device, that the authentication information generation factor received by the receiving section of the proving device is generated by using the random information stored in the storage section of the verification device; and (b) a step of verifying in an interactive verification section of the verification device, by interactive proof with the verification device, that the authentication information generation factor received by the receiving section of the proving device is generated by using the random information stored in the storage section of the verification device; and the authentication method further comprises:

(c) a step of transmitting, by the transmitting section of the proving device, the authentication information generated by the authentication information generation section to the verification device when the interactive verification section of the proving device can confirm that the authentication information generation factor received by the receiving section of the proving device is generated by using the random information stored in the storage section of the verification device.

25. A non-transitory computer-readable storage medium, the storage medium storing a proving device program for causing a computer to function as a proving device according to claim 20.

26. A non-transitory computer-readable storage medium, the storage medium storing a verification device program for causing a computer to function as a verification device according to claim 21.

27. The authentication system according to claim 1,
wherein the verification information have contents depending upon contents of the comparative information, and have an information volume not depending upon an information volume of the comparative information; and
the authentication information have contents depending upon the contents of the authentication information generation factor and the held information, and have an information volume not depending upon an information volume of the held information.

28. The authentication system according to claim 7,
wherein the verification information have contents depending upon contents of the comparative information, and have an information volume not depending upon an information volume of the comparative information; and
the authentication information have contents depending upon the contents of the authentication information generation factor and the held information, and have an information volume not depending upon an information volume of the held information.

29. The authentication system according to claim 13,
wherein the verification information have contents depending upon contents of the comparative information, and have an information volume not depending upon an information volume of the comparative information; and
the authentication information have contents depending upon the contents of the authentication information generation factor and the held information, and have an information volume not depending upon an information volume of the held information.

30. The proving device according to claim 20,
wherein the authentication information have contents depending upon the contents of the authentication information generation factor and the held information, and have an information volume not depending upon an information volume of the held information.

31. The verification device according to claim 21,
wherein the verification information have contents depending upon contents of the comparative information, and have an information volume not depending upon an information volume of the comparative information.

32. The authentication method according to claim 22,
wherein the verification information have contents depending upon contents of the comparative information, and have an information volume not depending upon an information volume of the comparative information; and
the authentication information have contents depending upon the contents of the authentication information generation factor and the held information, and have an information volume not depending upon an information volume of the held information.

33. The authentication method according to claim 23,
wherein the verification information have contents depending upon contents of the comparative information, and have an information volume not depending upon an information volume of the comparative information; and
the authentication information have contents depending upon the contents of the authentication information generation factor and the held information, and have an information volume not depending upon an information volume of the held information.

* * * * *